(12) United States Patent
Takahashi

(10) Patent No.: US 7,612,919 B2
(45) Date of Patent: Nov. 3, 2009

(54) PRINTING APPARATUS AND CONTROL METHOD

(75) Inventor: Hiroyuki Takahashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 821 days.

(21) Appl. No.: 11/392,759

(22) Filed: Mar. 30, 2006

(65) Prior Publication Data

US 2006/0221358 A1    Oct. 5, 2006

(30) Foreign Application Priority Data

Mar. 31, 2005    (JP) .............................. 2005-104358

(51) Int. Cl.
*H04N 1/00* (2006.01)
*G03G 15/00* (2006.01)

(52) U.S. Cl. ........................................ 358/400; 399/46

(58) Field of Classification Search ................. 358/400, 358/1.15, 1.17, 1.16, 444, 474, 1.1, 296, 358/501, 1.13, 486; 345/502, 503, 536, 537; 399/9, 46, 76, 77, 82, 361, 410; 270/58.09, 270/37, 1.01; 400/62, 76; 705/1, 8, 9, 408

See application file for complete search history.

(56) References Cited

U.S. PATENT DOCUMENTS

| | | | |
|---|---|---|---|
| 6,727,999 B1 * | 4/2004 | Takahashi | 358/1.15 |
| 6,912,059 B1 | 6/2005 | Takahashi | 358/1.15 |
| 7,119,920 B2 | 10/2006 | Takahashi | 358/1.15 |
| 7,162,518 B2 | 1/2007 | Takahashi | 709/217 |
| 2004/0169876 A1 | 9/2004 | Takahashi | 358/1.12 |

FOREIGN PATENT DOCUMENTS

JP    2003-006035    1/2003

* cited by examiner

*Primary Examiner*—Saeid Ebrahimi Dehkordy
(74) *Attorney, Agent, or Firm*—Fitzpatrick, Cella, Harper & Scinto

(57) ABSTRACT

An image processing apparatus is provided. An input image processor or NIC inputs a job containing image data and property information of the image data. An MFP controller stores the input job in a first memory. An image processing/RIP unit processes the image data in accordance with the property information. The MFP controller stores the job processed by the image processing/RIP unit in a second memory. An output image processor outputs the job in accordance with the property information. The MFP controller sets saving of the jobs in the first and second memories and, in outputting the saved job, indicates an enable/disable state of change of the property information in accordance with the saving method and receives change of the property information.

18 Claims, 54 Drawing Sheets

FIG. 22

| Web Browser | ? □ × |

FILE  EDIT  VIEW  FAVORITE  TOOL  HELP

← RETURN ▼ | → ▼ | ✗ | ⇅ | ⌂ | 🔍 FIND |

ADDRESS  http://192.168.100.11/device.htm ▼

| TOP PAGE |
| DEVICE |
| ■ STATUS |
| ☐ INFORMATION |
| ☐ EQUIPMENT |
| ☐ NETWORK |
| ☐ CHECK COUNTER |
| JOB |
| SUBMIT |
| BOX |
| ADDRESS |
| USER MODE |

DEVICE STATUS

◎ PRINTER, READY
◎ SCANNER, READY

FEED INFORMATION

| CASSETTE 1 | A4 | NORMAL PAPER |
| CASSETTE 2 | A4 | CARDBOARD |
| CASSETTE 3 | A4R | NORMAL PAPER |
| CASSETTE 4 | A3 | NORMAL PAPER |
| PAPER DECK | A4 | NORMAL PAPER |
| MANUAL FEED TRAY | A4 | COATED PAPER |

REMAINING MEMORY CAPACITY

97%

EXPENDABLE INFORMATION

| REMAINING QUANTITY OF TONER C | ◎ |
| REMAINING QUANTITY OF TONER M | ◎ |
| REMAINING QUANTITY OF TONER Y | ◎ |
| REMAINING QUANTITY OF TONER K | ◎ |

| REMAINING QUANTITY OF STAPLES | ◎ |
| REMAINING QUANTITY OF BINDING STRIPS | ◎ |

FIG. 23

| Web Browser | | | | | | ? □ × |
|---|---|---|---|---|---|---|

FILE    EDIT    VIEW    FAVORITE    TOOL    HELP

← RETURN ▼ | → ▼ | ✗ | ⇅ | 🏠 | 🔍 FIND | 🖨

ADDRESS   http://192.168.100.11/job.htm   ▼

| | | | | | | |
|---|---|---|---|---|---|---|
| TOP PAGE | No. | STATUS | CONTROL | JOB NAME | PRIORITY | NUMBER OF PAGES | NUMBER OF COPIES |
| DEVICE | 1 | P | ⊗ ⏸ ▷ | Job aaa | HIGH | 200 | 1000 |
| JOB | 2 | W | ⊗ ⏸ ▷ | Job B1 | MEDIUM | 20 | 2000 |
| ■ PRINT JOB | 3 | W | ⊗ ⏸ ▷ | Job C124 | MEDIUM | 150 | 500 |
| □ PRINTED JOB | 4 | W | ⊗ ⏸ ▷ | Job DDD | MEDIUM | 400 | 300 |
| □ COPY JOB | 5 | W | ⊗ ⏸ ▷ | Job E333 | MEDIUM | 30 | 2500 |
| □ TRANSMISSION JOB | 6 | W | ⊗ ⏸ ▷ | Job FFF | MEDIUM | 100 | 600 |
| □ RECEPTION JOB | 7 | W | ⊗ ⏸ ▷ | Job G21 | MEDIUM | 200 | 300 |
| | 8 | R | ⊗ ⏸ ▷ | Job H23 | MEDIUM | 70 | 200 |
| SUBMIT | 9 | H | ⊗ ⏸ ▷ | Job I82 | LOW | 300 | 400 |
| BOX | 10 | H | ⊗ ⏸ ▷ | Job J77 | MEDIUM | 90 | 1000 |
| ADDRESS | 11 | H | ⊗ ⏸ | | | | |
| USER MODE | 12 | H | | | | | |

P : PRINTING    W : WAIT    R : RIP    H : HOLDING

⊗ DELETE    ⏸ PAUSE    ▷ RESUME

FIG. 24

Web Browser

FILE  EDIT  VIEW  FAVORITE  TOOL  HELP

ADDRESS: http://192.168.100.11/submit.htm

- TOP PAGE
- DEVICE
- JOB
- SUBMIT

■ MAIN
☐ PAGE SETUP
☐ FINISHING
☐ FEED
☐ PRINT QUALITY
☐ SET EXCEPTION

- BOX
- ADDRESS
- USER MODE

FILE NAME: C:¥Dir-A¥FileA.pdf    [DISPLAY]

JOB TICKET: JobTicket-A1    [SAVE] [SAVE AS...]

[DELETE]

| | |
|---|---|
| JOB PRIORITY | MEDIUM |
| SAVE JOB BEFORE RIP | YES |
| SAVE JOB AFTER RIP | NO |
| JOB SCHEDULING | PRINT |
| SEND E-MAIL | NO |
| E-MAIL ADDRESS | |
| ANNOTATION | NO |
| ANNOTATION CHARACTER STRING | |
| JOB SECURITY LEVEL | HIGH |

[PRINT]

FIG. 31

| ✓ | TYPE | DOCUMENT NAME | PAPER | PAGE | DATE / TIME |
|---|---|---|---|---|---|
|   | 📄 | DOCUMENT P | A4 | 0105 | 10 / 22  13 : 23 |
| 1 | 📄 | DOCUMENT Q | A4 | 0238 | 10 / 22  14 : 54 |
|   | 📄 | DOCUMENT R | A3 | 0028 | 10 / 29  17 : 08 |
|   | 📄 | DOCUMENT S | A4 | 0193 | 11 / 01  09 : 41 |

USER BOX / 01 : USER B     TOTAL 4

- CANCEL SELECTION
- DETAILED INFORMATION
- ERASE
- PRINT
- READ DOCUMENT
- TRANSMIT
- EDIT MENU
- MOVE / COPY
- CLOSE
- SYSTEM CONDITION / CANCEL

FIG. 38

DOCUMENT READING > DESIGNATE PRINT DATA SAVING FORM

SAVING METHOD IN SAVING PRINT DATA WILL BE DESIGNATED

PLACE IMPORTANCE ON PRINT START SPEED
WHEN "PLACE IMPORTANCE ON PRINT START SPEED" IS SELECTED, PRINT READY FILE IS READ OUT FROM MEMORY SO THAT PRINTING CAN BE DONE MORE QUICKLY

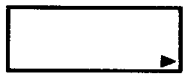
PLACE IMPORTANCE ON PRINT SETTING
WHEN FLEXIBILITY "PLACE IMPORTANCE ON PRINT SETTING FLEXIBILITY" IS SELECTED, SETTING CONDITIONS CAN BE CHANGED FOR MORE ITEMS IN REPRINT

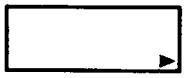
PLACE IMPORTANCE ON BOTH
WHEN "PLACE IMPORTANCE ON BOTH" IS SELECTED, BOTH OF ABOVE-DESCRIBED ADVANTAGEOUS CAN BE OBTAINED, THOUGH NECESSARY SAVING AREA BECOMES LARGE

SYSTEM CONDITION / CANCEL ▶

BEFORE TILT CORRECTION　　　AFTER TILT CORRECTION

θ

F I G. 46
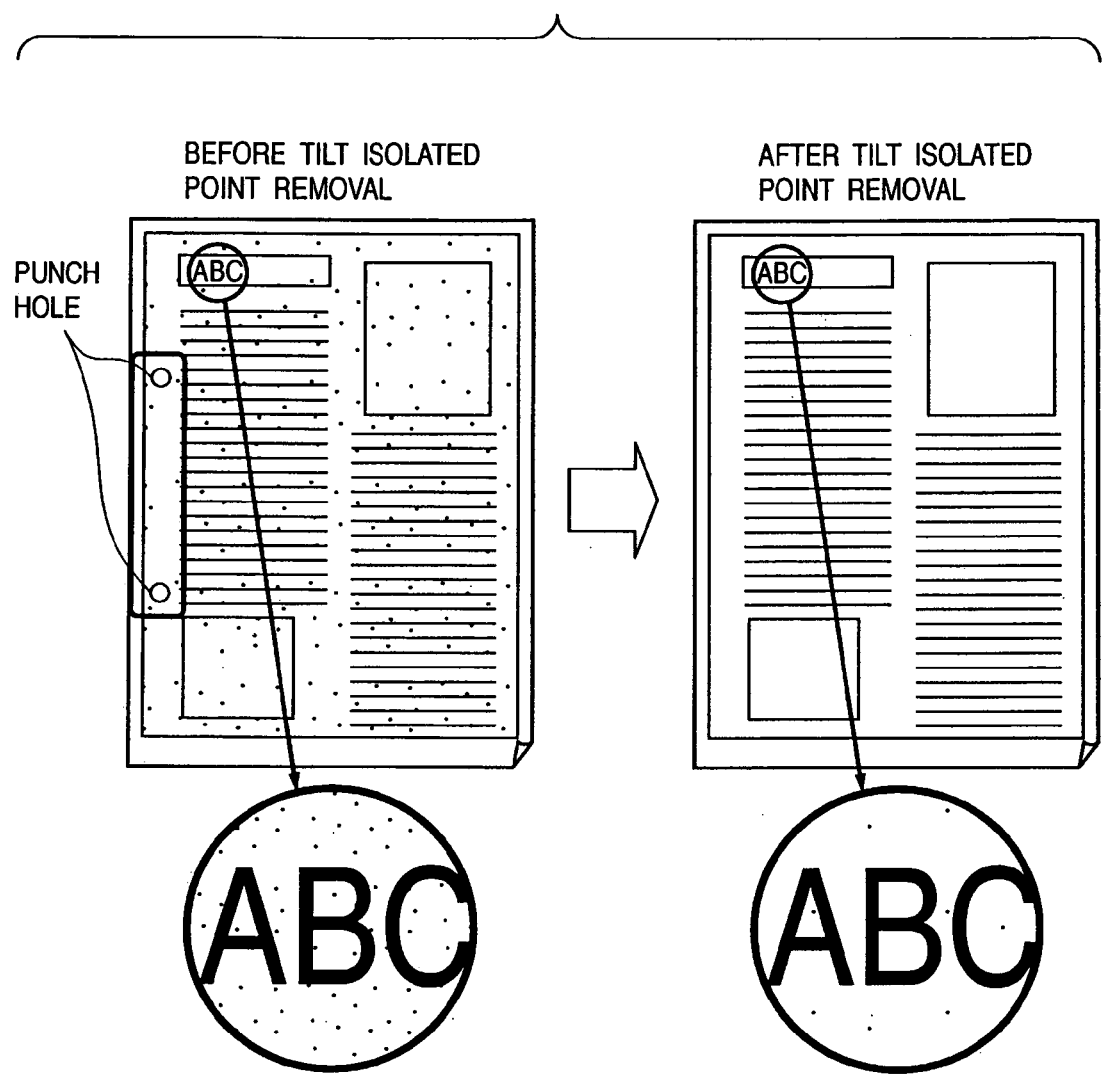

FIG. 48

| COMMON SPECIFICATION SETTING | |
|---|---|
| ■ INITIAL FUNCTION SETTING<br>▷ COPY | ▶ |
| ■ FUNCTION AFTER AUTO CLEAR<br>▷ RETURN | ▶ |
| ■ ON / OFF OF BUZZER<br>▷ OFF | ▶ |
| ■ ON / OFF OF AUTO CASSETTE SELECT<br>▷ OFF | ▶ |
| ■ DESIGNATION OF PRINT DATA SAVING FORM<br>▷ PLACE IMPORTANCE ON PRINT SETTING FLEXIBILITY | ▶ |

▼ 1/4 ▲

CLOSE

SYSTEM CONDITION / CANCEL

FIG. 49

| COMMON SPECIFICATION SETTING > DESIGNATION OF PRINT DATA SAVING FORM |
|---|

SAVING METHOD IN SAVING PRINT DATA WILL BE DESIGNATED

▢ PLACE IMPORTANCE ON PRINT START SPEED
 WHEN "PLACE IMPORTANCE ON PRINT START SPEED" IS
 SELECTED, PRINT READY FILE IS READ OUT FROM MEMORY
 SO THAT PRINTING CAN BE DONE MORE QUICKLY

▢ PLACE IMPORTANCE ON PRINT SETTING
 WHEN FLEXIBILITY "PLACE IMPORTANCE ON PRINT SETTING
 FLEXIBILITY" IS SELECTED, SETTING CONDITIONS CAN BE
 CHANGED FOR MORE ITEMS IN REPRINT

▢ PLACE IMPORTANCE ON BOTH
 WHEN "PLACE IMPORTANCE ON BOTH" IS SELECTED, BOTH
 OF ABOVE-DESCRIBED ADVANTAGEOUS CAN BE OBTAINED,
 THOUGH NECESSARY SAVING AREA BECOMES LARGE

CLOSE

SYSTEM CONDITION / CANCEL

FIG. 50

| CATEGORY | ITEM | BEFORE RIP | AFTER RIP | DESCRIPTION OF ITEM |
|---|---|---|---|---|
| LAYOUT | ZOOM | ○ | × | ZOOM IMAGE. INPUT SCALING FACTOR TO DESIGNATE ENLARGEMENT/REDUCTION RATIO |
| | DIRECTION OF PRINT | ○ | × | DESIGNATE PAPER FEED DIRECTION. SET PORTRAIT (A4) OR LANDSCAPE (A4R) |
| | MOVE | ○ | ○ | SET IMAGE POSITION WITH RESPECT TO SHEET |
| | PAGE LAYOUT | ○ | × | DESIGNATE NUMBER OF PAGES PER SHEET TO BE REDUCED AND PASTED |
| PRINT QUALITY | RESOLUTION | ○ | × | SET RESOLUTION (dpi) IN RIP |
| | HALFTONE | ○ | ○ | DESIGNATE SCREEN (e.g., SCREEN ANGLE AND ERROR DIFFUSION) |
| | TRAPPING | ○ | × | DESIGNATE ON/OFF OF TRAPPING AND TRAPPING METHOD |
| | SHARPNESS | ○ | ○ | DESIGNATE ON/OFF OF SHARPNESS AND DEGREE OF SHARPNESS |
| | COMPRESSION RATIO | ○ | × | DESIGNATE ON/OFF OF COMPRESSION AND COMPRESSION RATIO |
| | TONER SAVING | ○ | ○ | SELECT NORMAL MODE OR TONER SAVING MODE |
| COLOR ADJUSTMENT | MONOCHROME COLOR | ○ | ○ | DESIGNATE COLOR FOR MONOCHROMATIC COLOR OUTPUT |
| | COLOR ADJUSTMENT | ○ | ○ | ADJUST COLOR BALANCE OF EACH OF CMYK |
| | ONE-TOUCH ADJUSTMENT | ○ | ○ | SET TONE SUCH AS "VIVID" OR "SUBDUED" |
| | MATCHING MODE | ○ | × | SELECT TYPE OF PROFILE SUCH AS SOURCE OR PRINTER |
| | MATCHING METHOD | ○ | × | DESIGNATE RENDERING INTENT SUCH AS "MINIMUM COLOR DIFFERENCE" |
| | PROFILE | ○ | × | SELECT ACTUAL PROFILE |

FIG. 51

| CATEGORY | ITEM | | BEFORE RIP | AFTER RIP | DESCRIPTION OF ITEM |
|---|---|---|---|---|---|
| FINISHING | DISCHARGE METHOD | | ○ | ○ | DESIGNATE DISCHARGE METHOD SUCH AS SORT, COLLATE, OR GROUP |
| | STAPLE | | ○ | ○ | DESIGNATE ON/OFF OF STAPLE AND BINDING POSITION |
| | PUNCHING | | ○ | ○ | DESIGNATE ON/OFF OF PUNCHING AND PUNCH POSITION |
| | FOLDING | | ○ | ○ | DESIGNATE ON/OFF OF FOLDING AND FOLDING METHOD |
| | SADDLE STITCH BINDING | | ○ | ○ | DESIGNATE SADDLE STITCH BINDING |
| | CASE BINDING | | ○ | ○ | DESIGNATE CASE BINDING |
| | COVER/INTERLEAVE | | ○ | ○ | DESIGNATE MEDIUM FEED STAGE FOR COVER/INTERLEAVE |
| | INDEX PAPER | | ○ | ○ | DESIGNATE MEDIUM AND CREATE TAB PAPER FOR TAB PAPER INSERTION |
| | JOB SAVING | | ○ | ○ | DESIGNATE RE-SAVING OF JOB AND SAVING POINT (BEFORE RIP/AFTER RIP) |
| JOB MANAGEMENT | MODE MEMORY | | ○ | ○ | DESIGNATE SAVING OF JOB SETTING INFORMATION AND INVOKE |
| | CALL | | ○ | ○ | INVOKE PREVIOUSLY USED SET MODE |
| | JOB END NOTIFICATION | | ○ | ○ | SEND MAIL TO DESIGNATED ADDRESS AT END OF JOB |

FIG. 52

| CATEGORY | ITEM | MEMORY 16a | MEMORY 16b | DESCRIPTION OF ITEM |
|---|---|---|---|---|
| LAYOUT | CONTINUOUS PAGE SHOT | × | × | SETTING FOR READING BOOK |
| | BINDING READING | × | × | SETTING FOR READING BOUND DOCUMENTS |
| | MIXED DOCUMENT | × | × | SETTING FOR READING DOCUMENTS CONTAINING A4/A3 SHEETS MIXED |
| | CONTINUOUS READING | × | × | SETTING FOR READING SEVERAL DOCUMENT BUNDLES |
| | MOVE | ○ | × | SET IMAGE POSITION WITH RESPECT TO SHEET |
| | BINDING MARGIN | ○ | × | SETTING IN CREATING BINDING MARGIN (REDUCE + IMAGE MOVE) |
| | FRAME ERASE | × | × | SETTING FOR ELIMINATING SHADOW AROUND IMAGE |
| | AREA DESIGNATION | × | × | SETTING FOR READING DESIGNATED IMAGE AREA |
| | REDUCED LAYOUT | ○ | × | SETTING FOR LAYING OUT A PLURALITY OF PAGES ON ONE SHEET |
| | ENLARGED LAYOUT | ○ | × | SETTING FOR OUTPUTTING ONE PAGE TO A PLURALITY OF SHEETS |
| | PAGE PRINT | ○ | × | SETTING FOR PAGE NUMBERING |
| | IMAGE COMBINE | ○ | × | SETTING FOR OUTPUTTING IMAGE AND BACKGROUND OVERLAPPING EACH OTHER |
| PRINT QUALITY | RESOLUTION | × | × | SET RESOLUTION (dpi) IN RIP |
| | HALFTONE | ○ | ○ | DESIGNATE SCREEN (e.g., SCREEN ANGLE AND ERROR DIFFUSION) |
| | IMAGE CREATE | ○ | × | SET NEGATIVE/POSITIVE REVERSAL, MIRROR IMAGE, OR REPEAT |
| | SHARPNESS | ○ | ○ | DESIGNATE ON/OFF OF SHARPNESS AND DEGREE OF SHARPNESS |
| | TILT CORRECTION | ○ | × | SETTING FOR IMAGE TILT CORRECTION IN READING |
| | ISOLATED POINT REMOVAL | ○ | × | SETTING FOR REMOVING UNINTENDED DUST IN READING |
| | IMAGE AREA SEPARATION CORRECTION | ○ | × | SETTING FOR OPTIMUM IMAGE PROCESSING OF CHARACTER AND PHOTO |
| | IMAGE QUALITY ADJUSTMENT | ○ | ○ | ADJUSTMENT SUCH AS BACKGROUND ERASE AND ANTI-SETOFF |

FIG. 53

| CATEGORY | ITEM | MEMORY 16a | MEMORY 16b | DESCRIPTION OF ITEM |
|---|---|---|---|---|
| COLOR ADJUSTMENT | MONOCHROME COLOR | ○ | ○ | DESIGNATE COLOR FOR MONOCHROMATIC COLOR OUTPUT |
| | COLOR ADJUSTMENT | ○ | ○ | ADJUST COLOR BALANCE OF EACH OF CMYK |
| | ONE-TOUCH ADJUSTMENT | ○ | ○ | SET TONE SUCH AS "VIVID" OR "SUBDUED" |
| FINISHING | DISCHARGE METHOD | ○ | ○ | DESIGNATE DISCHARGE METHOD SUCH AS SORT, COLLATE, OR GROUP |
| | STAPLE | ○ | ○ | DESIGNATE ON/OFF OF STAPLE AND BINDING POSITION |
| | PUNCHING | ○ | ○ | DESIGNATE ON/OFF OF PUNCHING AND PUNCH POSITION |
| | FOLDING | ○ | ○ | DESIGNATE ON/OFF OF FOLDING AND FOLDING METHOD |
| | SADDLE STITCH BINDING | ○ | ○ | DESIGNATE SADDLE STITCH BINDING |
| | CASE BINDING | ○ | ○ | DESIGNATE CASE BINDING |
| | COVER/INTERLEAVE | ○ | ○ | DESIGNATE MEDIUM FEED STAGE FOR COVER/INTERLEAVE |
| | INDEX PAPER | ○ | ○ | DESIGNATE MEDIUM AND CREATE TAB PAPER FOR TAB PAPER INSERTION |
| JOB MANAGEMENT | JOB SAVING | ○ | ○ | DESIGNATE RE-SAVING OF JOB AND SAVING POINT (BEFORE RIP/AFTER RIP) |
| | MODE MEMORY | ○ | ○ | DESIGNATE SAVING OF JOB SETTING INFORMATION AND INVOKE |
| | CALL | ○ | ○ | INVOKE PREVIOUSLY USED SET MODE |
| | JOB END NOTIFICATION | ○ | ○ | SEND MAIL TO DESIGNATED ADDRESS AT END OF JOB |

FIG. 54

| Web Browser | ? □ × |

FILE    EDIT    VIEW    FAVORITE    TOOL    HELP

◉ RETURN ▼ | ⊙ ▼ | ✖ | ⇕ | ⌂ | 🔍 FIND | 🖨

ADDRESS | http://192.168.100.11/submit5.htm ▼

| TOP PAGE |
| DEVICE |
| JOB |
| SUBMIT |

☐ MAIN
☐ PAGE SETUP
☐ FINISHING
☐ FEED
■ PRINT QUALITY
☐ SET EXCEPTION

| BOX |
| ADDRESS |
| USER MODE |

| DEVICE NAME | MFP101 | DISPLAY |
| BOX NAME | BOX 01 : USER B | DISPLAY |
| FILE NAME | DOCUMENT Q | DISPLAY |
| JOB TICKET | JobTicket-A1 ▼ | SAVE | SAVE AS... |
| | | SAVE |

| RESOLUTION | 600×600dpi ▼ |
| HALFTONE | Error Diffusion ▼ |
| TRAPPING | NO ▼ |
| SHARPNESS | SLIGHTLY STRONG ▼ |
| COMPRESSION RATIO | 60% ▼ |
| TONER SAVING | YES ▼ |

| PRINT |

PRINTING APPARATUS AND CONTROL METHOD

FIELD OF THE INVENTION

The present invention relates to a printing apparatus and a control method thereof and, more particularly, to, e.g., processing of inputting a job having image data and its property information, processing the image data in accordance with the property information, and outputting the job in accordance with the property information.

BACKGROUND OF THE INVENTION

When image data from a computer is printed or copied by an image forming apparatus (or MFP: Multi Functional Peripheral) in an office environment, the printing is often executed only once. Even when the image to be printed is saved in the internal memory or hard disk of the apparatus, the data is erased immediately.

If a user uses a function (so-called box function) of intentionally saving, in a memory, raster data which has undergone raster image processing (RIP) to print an image later, printing can be done after changing some limited settings such as the number of copies and the post processing function.

In the print-on-demand (POD) market, a job which has been printed previously is invoked and printed again in many cases (to be referred to as "reprint" hereinafter). Hence, it is essential for efficient operation to save even printed data to prepare for reprint.

Raster data after RIP is excellent in print performance and can be printed immediately. However, changeable job properties are limited to, e.g., the number of copies and the post processing function. On the other hand, in data before RIP (e.g., PDL data described in a page description language (PDL)), any job property can be changed, though RIP is time-consuming. Both data before and after RIP can also be saved in the memory. However, when a number of large job data are saved, a hard disk with a large capacity or a large number of hard disks are necessary, resulting in an increase in cost for data saving.

In Japanese Patent Application Laid-Open No. 2003-006035, an original image file is copied and saved in a predetermined area of a storage device before image file correction processing. After correction processing, the original image file is replaced with the image file after correction processing.

SUMMARY OF THE INVENTION

It is an object of the present invention to enable setting of a data saving method before and after image processing.

It is another object of the present invention to represent property information change enable/disable state and receive change of the property information in re-outputting saved data.

In one aspect of the present invention, a printing apparatus includes an input unit configured to input a job containing image data and property information of the image data, a first memory configured to store the job input by the input unit, an image processing unit configured to process the image data of the job in accordance with the property information of the input job, a second memory configured to store the job processed by the image processing unit, an output unit configured to output the job in accordance with the property information of the processed job, a setting unit configured to set saving of the input job in the first memory and saving of the processed job in the second memory, and a control unit configured to control saving of the input job and the processed job in accordance with a saving method set by the setting unit and, in outputting the saved job, indicating an enable/disable state of change of the property information in accordance with the saving method and receiving change of the property information.

The above and other objects and features of the present invention will appear more fully hereinafter from a consideration of the following description taken in connection with the accompanying drawing wherein one example is illustrated by way of example.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 22 is a view showing an arrangement example of the device management window of the Web application;

FIG. 23 is a view showing an arrangement example of the job management window of the Web application;

FIG. 24 is a view showing an arrangement example of the job submit window of the Web application;

FIG. 31 is a view showing a display example of a user box window;

FIG. 38 is a view showing an example of a window to designate a print data saving method;

FIG. 46 is a view for explaining isolated point removal;

FIG. 48 is a view showing a display example of a common specification setting window;

FIG. 49 is a view showing an example of a window to designate a print data saving method;

FIG. 50 is a view showing a job ticket table of a PDL job;

FIG. 51 is a view showing a job ticket table of a PDL job;

FIG. 52 is a view showing a job ticket table of a scan job;

FIG. 53 is a view showing a job ticket table of a scan job; and

FIG. 54 is a view for explaining change of a job setting condition by a Web browser.

DETAILED DESCRIPTION OF THE PREFERRED EMBODIMENTS

Preferred embodiments of the present invention will be described in detail in accordance with the accompanying drawings. The present invention is not limited by the disclosure of the embodiments and all combinations of the features described in the embodiments are not always indispensable to solving means of the present invention.

First Embodiment

[Configuration of Digital Print System]

Figure 1:
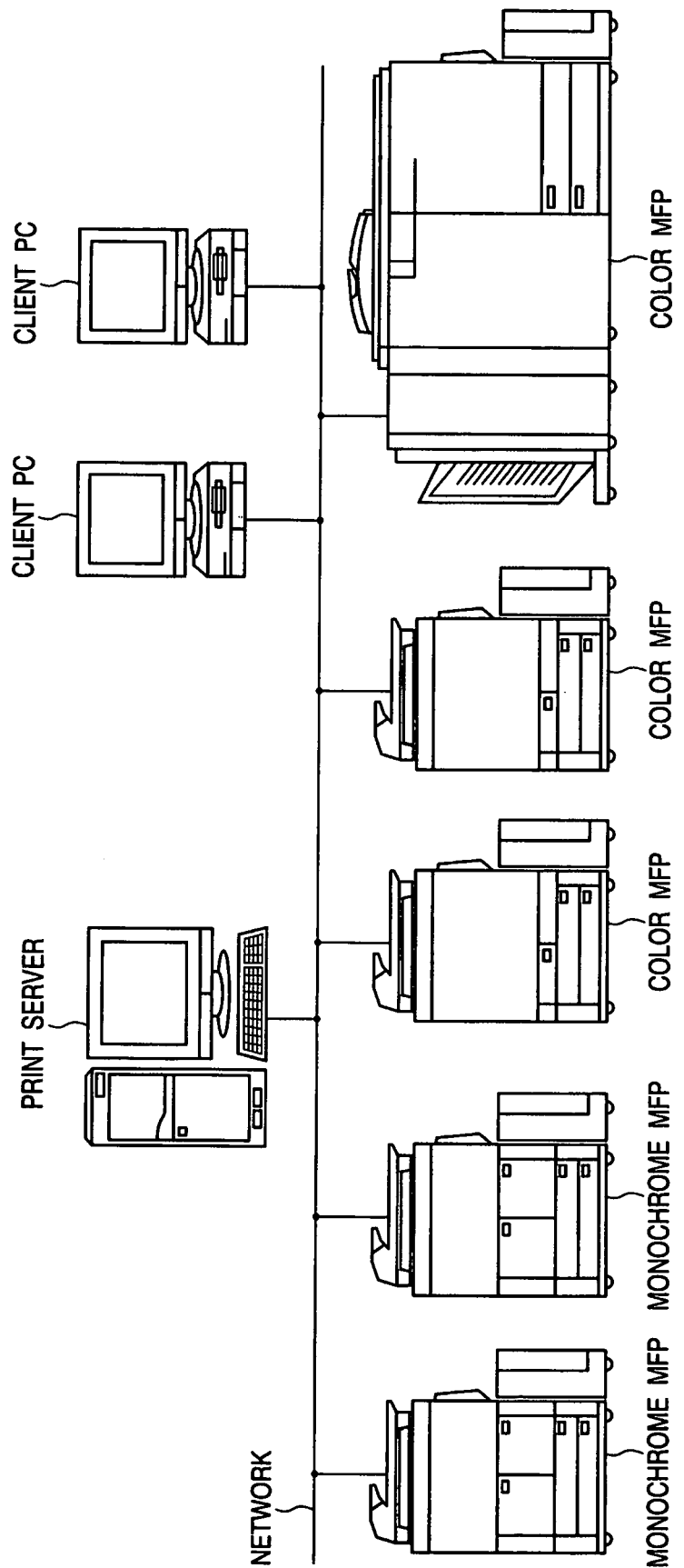
FIG. 1 is a view showing a configuration example of a digital print system.

FIG. 1 is a view showing a configuration example of a digital print system.

In the digital print system (to be simply referred to as a "system" hereinafter), one or a plurality of print servers 2, client PCs 3, monochrome MFPs 4, and color MFPs 5 and 6 are connected to a network such as a local area network (LAN).

The print server 2 has two roles. The first role is information transmission/reception to/from the outside of the system. Image information or setting information of a job to be input to the system is input to the print server 2 first. When the job is ended, the print server 2 notifies the outside of the system of information of, e.g., the status.

The second role of the print server 2 is management control in the system. The print server 2 collectively manages jobs input from the outside and those generated in the system and monitors the conditions of all devices and all jobs in the system. Suspension, setting change, print resumption, copy, move, and delete of jobs are done as needed.

The client PC 3 has a role to edit application data, instruct printing, and issue print ready files and a role to assist device management and job monitor/management in the print server 2.

The monochrome MFP 4 and color MFPs 5 and 6 are image forming apparatuses with various functions such as scan, print, and copy. The monochrome MFP 4 and color MFPs 5 and 6 have different speeds and print costs and are selectively used in accordance with the application purpose.

[Arrangement of MFP]

Figure 2:
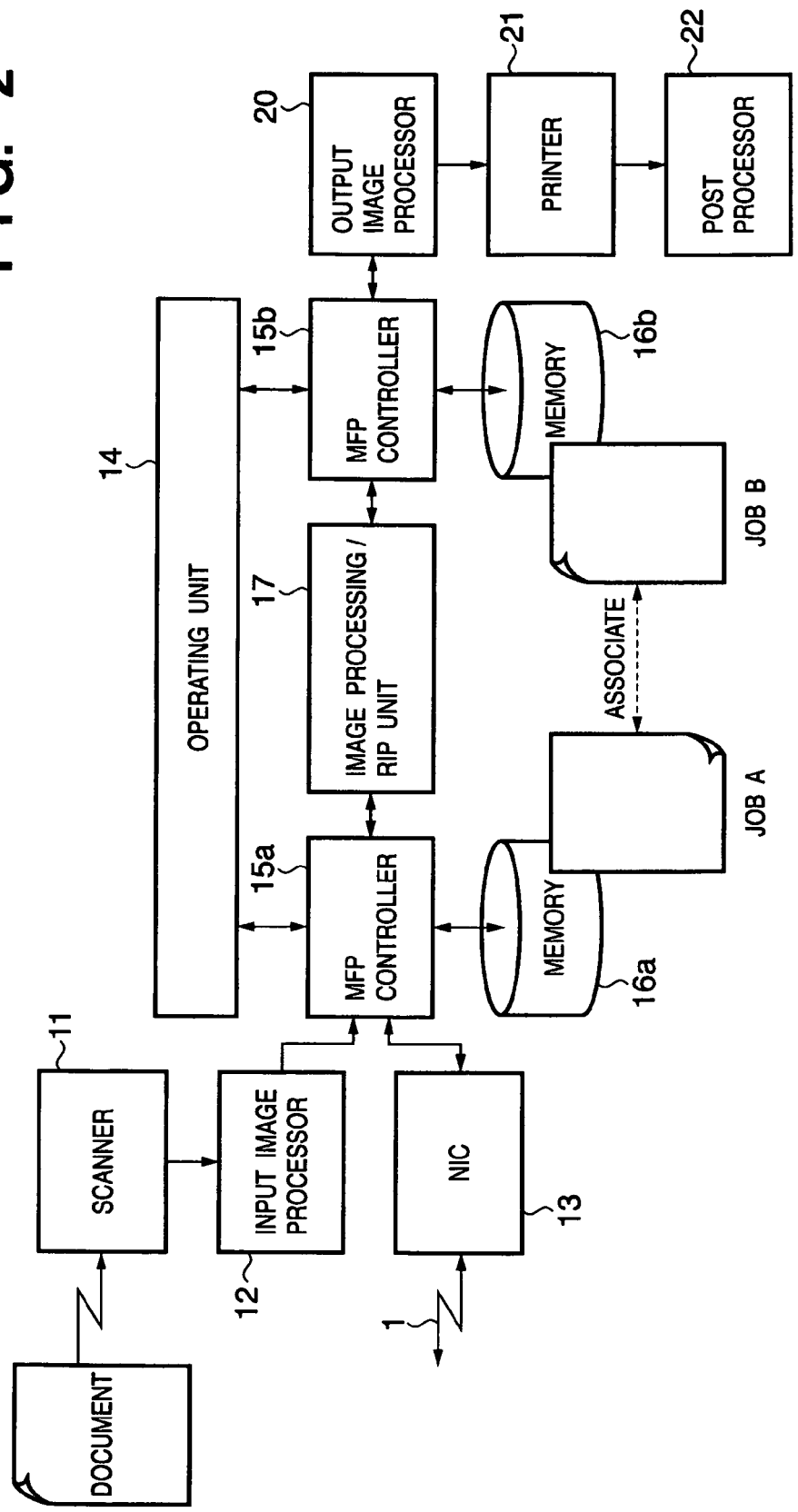
FIG. 2 is a block diagram showing the arrangement of an MFP.

FIG. 2 is a block diagram showing the arrangement of an MFP.

An input image processor 12 processes image data (to be referred to as a "scan image" hereinafter) obtained by reading, e.g., a document image by a scanner 11. A network interface card (NIC) 13 transfers image data (mainly PDL data: to be referred to as a "network image" hereinafter) input via a network 1 to an image processing/RIP unit 17 or transmits image data or device information in the MFP to an external device via the network 1.

An MFP controller 15a executes control to directly store, in a memory 16a, an image such as a scan image or network image input to the MFP.

The image processing/RIP unit 17 executes, for images in the memory, relatively time-consuming software image processing such as tilt correction and isolated point removal (dust removal) of a scan image. The image processing/RIP unit 17 also decodes PDL data input from the network 1 and generates raster data by executing RIP.

An MFP controller 15b executes control to store, in a memory 16b, image data (raster data) output from the image processing/RIP unit 17. A job A stored in the memory 16a and a job B which is identical to the job A and is stored in the memory 16b are associated with each other so that they can be invoked immediately. A job stored in the memory 16a or 16b can be invoked as needed by operating an operating unit 14 or inputting an instruction via the network 1.

An output image processor 20 executes image processing for printing for image data input from the MFP controller 15b. A printer 21 supplies printing paper sheets and sequentially prints on them images represented by image data output from the output image processor 20. A post processor 22 executes sorting or finishing of the printed printing paper sheets.

The operating unit 14 is operated by a user to select or instruct the above-described various flows and functions. When the resolution of the display device such as an LED on the operating unit 14 is high, it can be used to preview and check an image stored in the memory 16a or 16b and, if it is OK, instruct printing.

As described above, the MFP has various functions and use forms. Examples are shown below.

| Name of Function | Flow of Data |
|---|---|
| Copy | input image processor → output image processor → printer |
| Network Scan | input image processor → NIC |
| Network Print | NIC → image processing/RIP unit → output image processor → printer |
| Box Scan | input image processor → output image processor → memory |
| Box Print | memory → printer |
| Box Reception | NIC → image processing/RIP unit → output image processor → memory |
| Box Transmission | memory → NIC |
| Preview | memory → operating unit (display device) |

The MFP controllers 15a and 15b are illustrated in FIG. 2 as different components in order to separately explain their functions. However, the MFP controllers 15a and 15b are normally integrated, and they will be sometimes described below as a single MFP controller.

Similarly, the memories 16a and 16b are illustrated in FIG. 2 as different components in order to separately explain their functions. However, the memories 16a and 16b can be assigned to, e.g., one hard disk or different hard disks, and they will be sometimes simply referred to as a memory 16.

[Input Image Processor]

Figure 3:
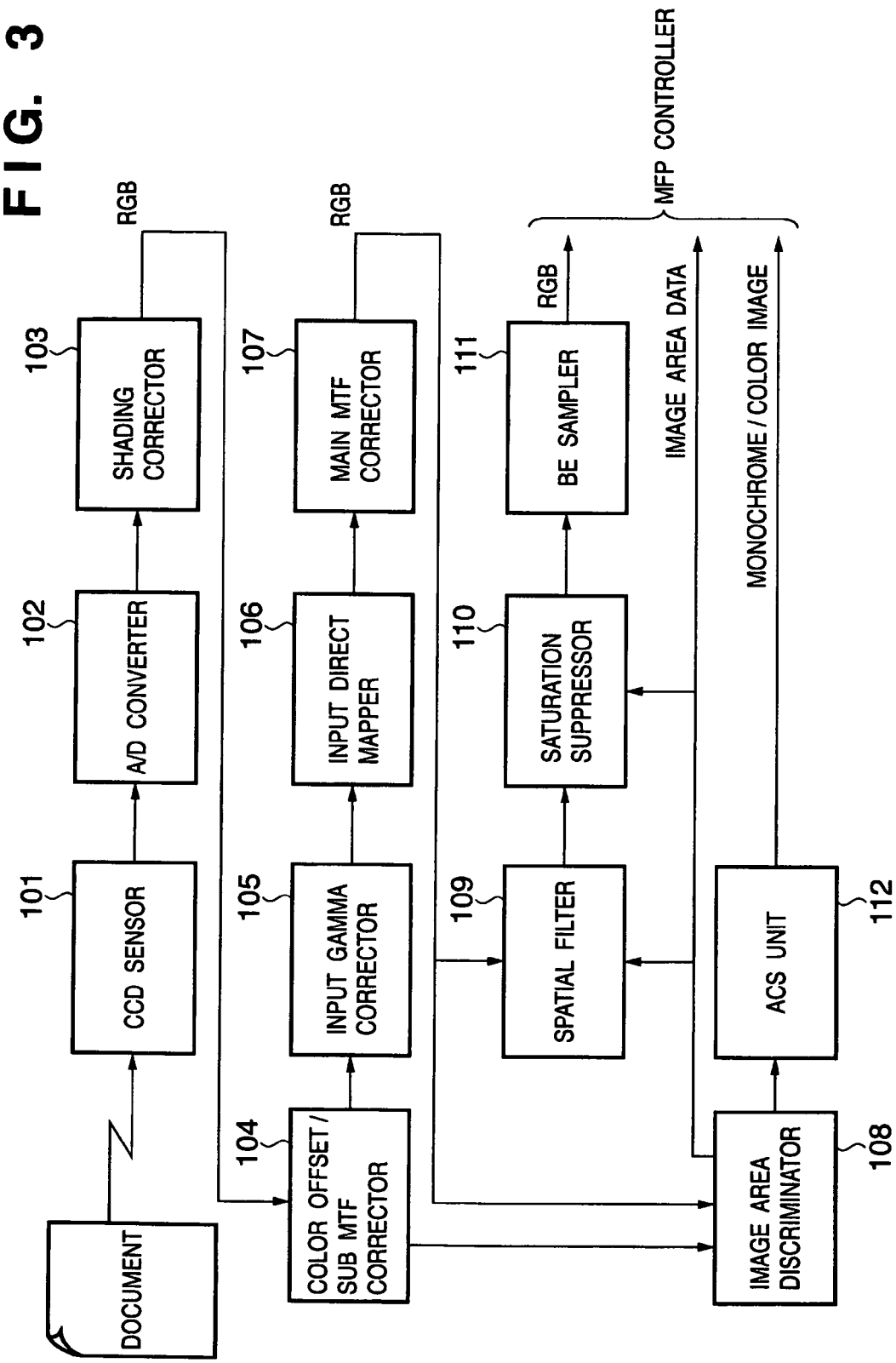
FIG. 3 is a block diagram showing an arrangement example of a scanner and input image processor.

FIG. 3 is a block diagram showing an arrangement example of the scanner 11 and input image processor 12.

An RGB 3-line CCD sensor 101 converts reflected light from a document into an electrical signal. An A/D converter 102 receives RGB signals output from the CCD sensor 101, executes gain adjustment and offset adjustment, and converts each chrominance signal into 8-bit digital image data. A shading corrector 103 corrects, for each chrominance signal, the sensitivity variation between the elements of the CCD sensor 101 and the light amount variation of the lamp to illuminate the document. This correction is done by using RGB data obtained by causing the CCD sensor 101 to read a reference white plate arranged near a document read table (not shown).

Since the line sensors of the CCD sensor 101 are arranged at a predetermined interval, the chrominance signals have a spatial shift in the sub-scanning direction. A color offset/sub MTF corrector 104 corrects the spatial shift between the chrominance signals output from the A/D converter 102 by using a line delay circuit. The color offset/sub MTF corrector 104 also executes sub MTF (Modulation Transfer Function) correction to correct a shift generated from, e.g., the nonuniformity of the CCD sensor 101. Especially, the color offset/sub MTF corrector 104 corrects a decrease in contrast and defocus of an image, which are generated by a narrow black/white interval.

An input gamma corrector 105 is a one-dimensional lookup table (1DLUT) which corrects each chrominance signal output from the color offset/sub MTF corrector 104 so that the exposure and luminance have a linear relationship. An input direct mapper 106 is a three-dimensional LUT (3DLUT) which converts the color space of the chrominance signals output from the input gamma corrector 105 into the color space of the device to unify the color spaces of the image signals. That is, the read color space determined by the spectral characteristic of the RGB filter of the CCD sensor 101 is converted into a standard color space such as sRGB. At this time, many other characteristics such as the sensitivity characteristic of the CCD sensor 101 and the spectral characteristic of the illumination lamp are also absorbed.

A main MTF corrector 107 executes main-scanning MTF correction of the chrominance signals output from the input direct mapper 106 by setting the weighted mean between a pixel of interest and two pixels adjacent to it in the main scanning direction to the value of the pixel of interest.

An image area discriminator 108 includes a character discriminator and an achromatic color discriminator. The character discriminator discriminates pixels of a character area or line art outline area from the chrominance signals output from the main MTF corrector 107 and outputs the result as image area data ZA. The achromatic color discriminator converts an image signal of, e.g., an sRGB space into image data of a luminance/color difference space such as CIELAB or YUV, detects a low saturation area, black character area, or color character area, and outputs the result as image area data ZB. The image area data ZA and ZB will be collectively referred to as "image area data" hereinafter.

A spatial filter 109 executes luminance component filtering of the chrominance signals output from the main MTF corrector 107 by using the image area data. More specifically, edge enhancement is executed for a character area, and smoothing or weak edge enhancement is executed for a photo area by using different sharpness filters.

A saturation suppressor 110 suppresses the saturation of an area that is determined as a low saturation area of the chrominance signals output from the spatial filter 109 on the basis of the image area data. Especially, the color difference of a black character area is set to zero to express the area by monochrome K.

An ACS (Auto Color Select) unit 112 counts the number of pixels of a low saturation area on the basis of the image area data and determines whether the image represented by the image signal is a monochrome image or color image.

To detect the background of an image, a BE (Background Erase) sampler 111 creates a luminance histogram by discretely sampling pixels of a designated rectangular area for the chrominance signals output from the saturation suppressor 110. The luminance histogram is used to erase the background in printing.

The image area data output from the image area discriminator 108, the determination result output from the ACS unit 112, and the chrominance signals and luminance histogram output from the BE sampler 111 are sent to the MFP controller.

[NIC]

Figure 4:
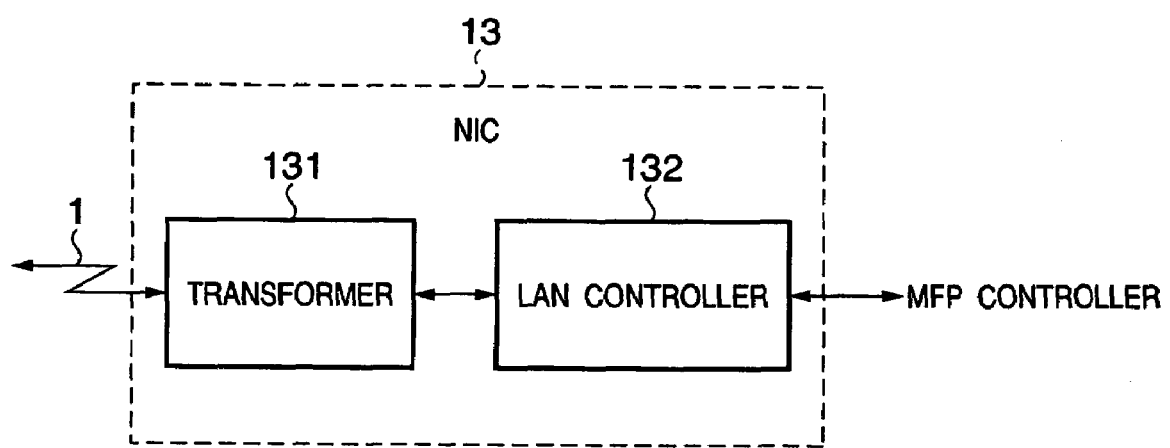
FIG. 4 is a block diagram showing an arrangement example of an NIC.

FIG. 4 is a block diagram showing an arrangement example of the NIC 13.

The NIC 13 has the function of an interface to the network 1 and receives/transmits information from/to an external device by connecting a network cable of, e.g., 10Base-T, 100Base-TX, or 1000Base-TX standard.

To receive data from an external device, a signal that has undergone isolation and balanced-to-unbalanced transform by a transformer 131 is input to a LAN controller 132. The LAN controller 132 stores the input signal in a first internal buffer (not shown). Whether the packet stored in the first buffer is a packet to be received is determined on the basis of the header of the packet. If the packet is to be received, data is extracted from the packet and sent to the MFP controller through a second buffer (not shown).

To transmit data received from the MFP controller to an external device, the LAN controller 132 puts received data in a packet, adds a transmission destination and sender address, and transmits the data to the network 1 through the transformer 131.

[MFP Controller 15a]

Figure 5:
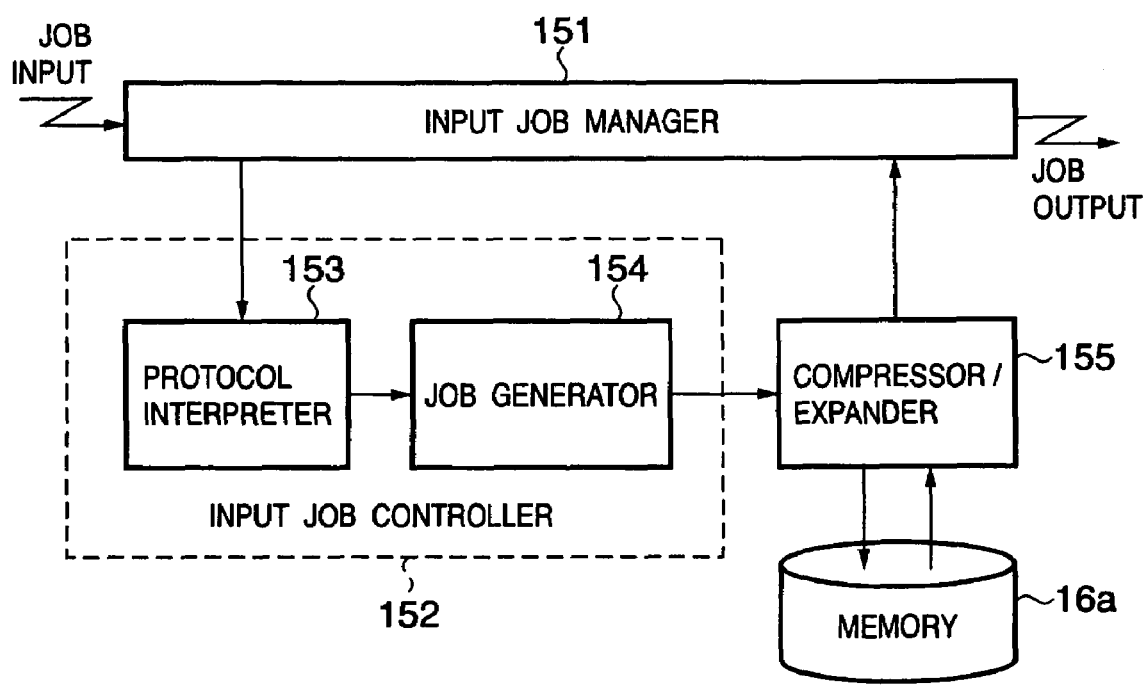
FIG. 5 is a block diagram showing an arrangement example of an MFP controller.

FIG. 5 is a block diagram showing an arrangement example of the MFP controller 15a.

An input job manager 151 manages input jobs and controls the job read/write from/in the memory 16a and the order of job processing. The input job manager 151 also executes control corresponding to a device to input a job.

An input job controller 152 includes a protocol interpreter 153 and a job generator 154. A series of operation requests input from the input job manager 151 to the input job controller 152 is received as an instruction signal called a command (protocol). The protocol interpreter 153 interprets the outline of the operation requests and converts them into operation procedures understandable in the MFP. The job generator 154 generates various jobs such as a print job, scan job, PDL rendering job, and fax reception job. Each generated job contains a scenario (script) representing works including processing contents in the MFP and the sending destination. Each job flows in the MFP in accordance with the scenario.

A compressor/expander 155 compresses a job as needed and stores it in the memory 16a. When a compressed job is read out, the compressor/expander 155 expands it. A job read out from the memory 16a is output from the input job manager 151.

[MFP Controller 15b]

Figure 6:
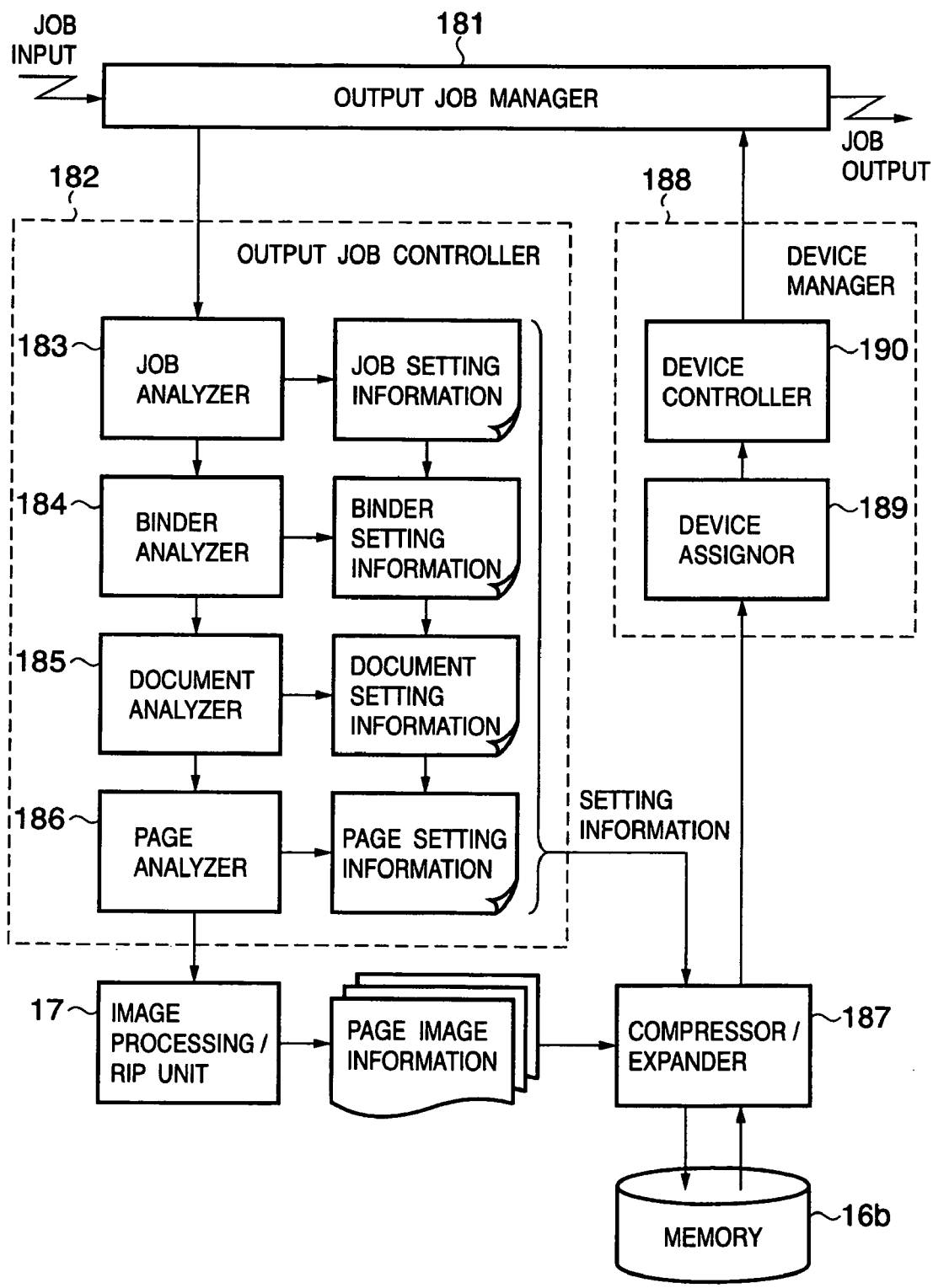
FIG. 6 is a block diagram showing an arrangement example of another MFP controller.

FIG. 6 is a block diagram showing an arrangement example of the MFP controller 15b.

An output job manager 181 manages jobs read out from the memories 16a and 16b and controls the job read/write from/in the memory 16b and the order of job processing.

An output job controller 182 includes a job analyzer 183, binder analyzer 184, document analyzer 185, and page analyzer 186. The output job controller 182 creates setting information (so-called job ticket) and image information of each job.

The job analyzer 183 analyzes details of setting information about an entire job, including the name of the document to be printed, the number of copies, designation of a discharge tray serving as an output destination, and the binder order of a job containing a plurality of binders, and creates job setting information. The binder analyzer 184 analyzes details of setting information about an entire binder, including setting of the binding method, staple position, and the document order of a binder containing a plurality of documents, and creates binder information.

The document analyzer 185 analyzes details of setting information about an entire document, including the page order of a document containing a plurality of pages, designation of double-sided printing, and attachment of covers and mounts, and creates document setting information. The page analyzer 186 analyzes details of setting information about an entire page, including the image resolution and the image orientation (landscape/portrait), and creates page setting information. When PDL data is input, the page analyzer 186 invokes the image processing/RIP unit 17 to execute rendering.

To generate image information of a scan image, image processing for the scan image is executed. To generate image information of PDL data, the image processing/RIP unit 17 is invoked to execute rendering, thereby generating page image information. The page image information is compressed by a compressor/expander 187 and stored in the memory 16b in association with the scenario and setting information.

A device manager 188 includes a device assignor 189 and a device controller 190. Page image information read out from the memory 16b in together with the associated scenario and setting information is expanded by the compressor/expander 187. The scenario, setting information, and page image information are input to the device manager 188 as one set. When assigning a device on the basis of the scenario, the device assignor 189 arbitrates device conflict that occurs in simultaneous processing of a plurality of jobs. The device controller 190 schedules a device to be used, e.g., the printer 21 or post processor 22, and its use timing.

[Memory]

Three data storage schemes will be defined.

The first scheme is a temporary storage scheme. Stored data is lost when, e.g., the job is ended, the usage of the memory 16 (or both the memory and hard disk) exceeds a predetermined value, or the device is powered off. That is, this storage scheme is effective during a limited period and will be referred to as a "hold job".

In the second scheme, the user can freely store data in the hard disk in the MFP and erase the stored data or set the retention period or security password according to his/her own will. This scheme will be referred to as a "box job".

In the third scheme, setting information (job ticket) and image information are stored together in a removable medium or file server outside the MFP. This scheme will be referred to as an "archive job".

Figure 7:
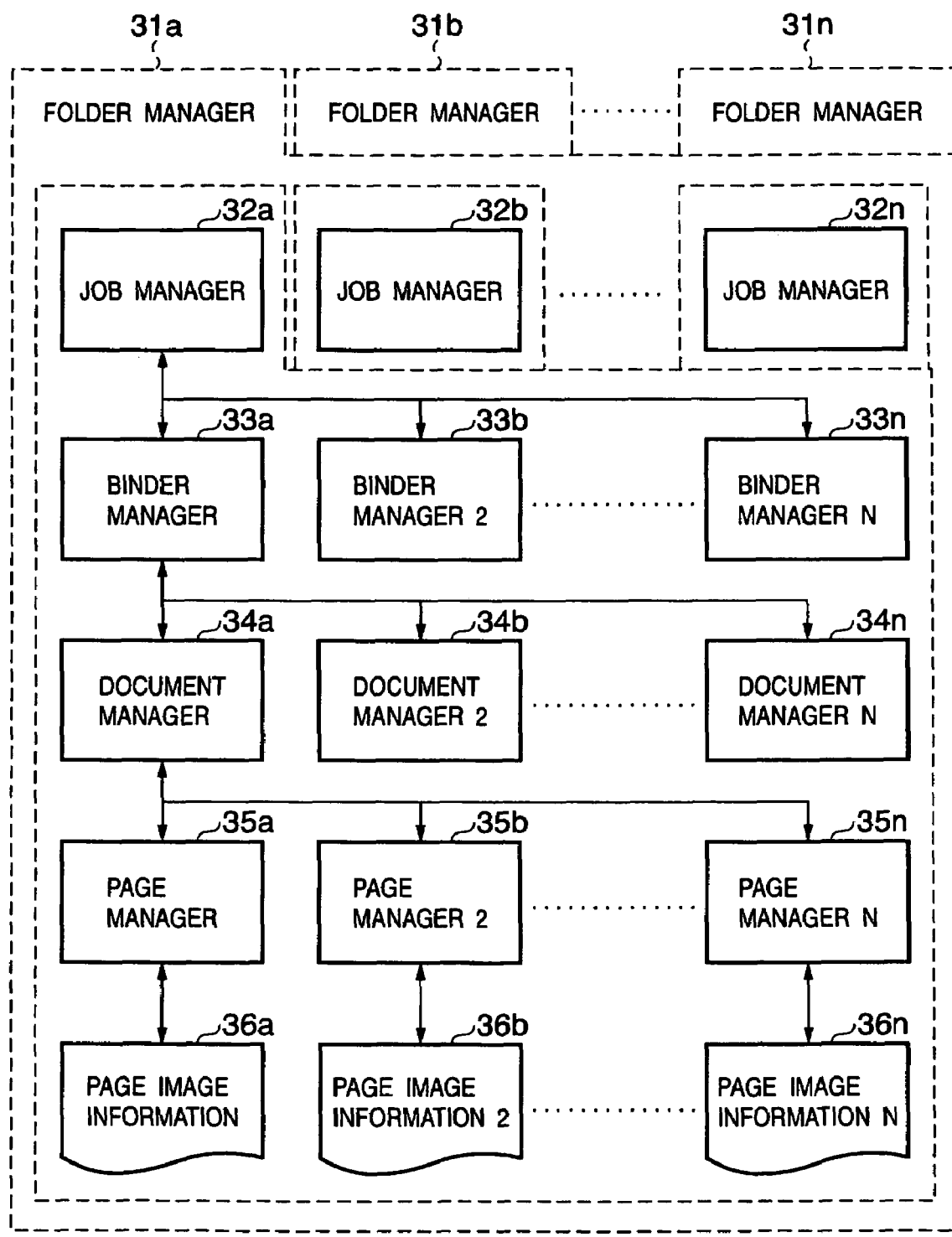
FIG. 7 is a view showing the management structure of a memory.

FIG. 7 is a view showing the management structure of the memory 16. In all the above-described storage schemes, management can be done by almost the same scheme to be described below.

The memory 16 has one or a plurality of folder managers 31 to store setting information about folder management. The folder manager 31 has one or a plurality of job managers 32 to store job setting information. The job manager 32 has one or a plurality of binder managers 33 to store binder setting information. The binder manager 33 has one or a plurality of document managers 34 to store document setting information. The document manager 34 has one or a plurality of page managers 35 to store page setting information. The page manager 35 stores page image information 36 of each page.

Each of the job setting information, binder setting information, document setting information, and page setting information is setting information (job ticket) shown in FIG. 6. Pieces of information of various property values (parameters) necessary for job processing are recorded in each setting information. Each page image information 36 stored in the page manager 35 indicates, e.g., image data of one page read by the scanner 11, image data of one page obtained by rasterizing PDL data received from the outside of the device, or image data of one page received by the facsimile apparatus. The image data can be either image data compressed by the compressor/expander 155 or 187 or uncompressed image data.

[Image Processing/RIP Unit]

Figure 8:
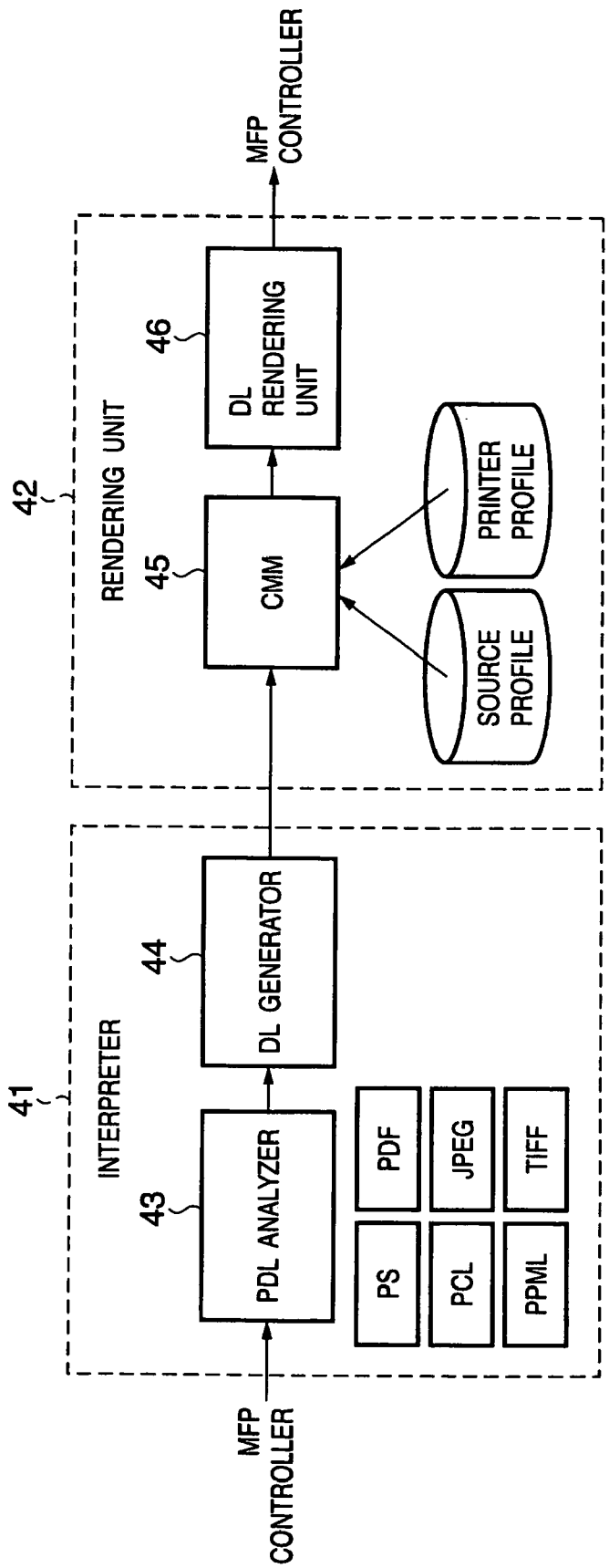
FIG. 8 is a block diagram showing an arrangement example of an image processing/RIP unit.

FIG. 8 is a block diagram showing an arrangement example of the image processing/RIP unit 17. RIP (Raster Image Processing) is processing of rasterizing each object information as a raster image on the memory 16 to simultaneously reproduce, as one page, vector information of, e.g., characters, line arts, and graphics described by a description language such as PDL (page description language), or bitmap information of, e.g., colors, patterns, and photos. This unit was often installed in devices as hardware previously but are often implemented by software currently because of the increase in processing speed of CPUs.

The image processing/RIP unit 17 generally includes two parts, i.e., an interpreter 41 and a rendering unit 42. The interpreter 41 includes a PDL analyzer 43 to analyze PDL data and a display list (DL) generator 44 to generate an intermediate file called a display list from the analyzed PDL data.

The PDL analyzer 43 analyzes various kinds of input PDL data. Famous PDL data formats are Postscript® available from Adobe and PCL (Printer Control Language) available from HP. These data are described by printer control codes to create an image of each page and include not only simple character codes but also graphics drawing codes and photo image codes. PDF (Portable Document Format), i.e., a document file format developed by Adobe is also widely used in various industries. PDF which is directly input to the MFP without being rewritten to PDL data (without using a driver) is also processed by the PDL analyzer 43. The PDL analyzer 43 also copes with a VDP (Variable Data Print) format called PPML (Personalized Print Markup Language) and image compression formats such as JPEG (Joint Photographic Experts Group) and TIFF (Tagged Image File Format).

The rendering unit 42 includes a color matching module (CMM) 45 to execute color matching for the display list and a DL rendering unit 46 which renders the display list to bitmap data (raster image).

The CMM 45 can receive various image data such as grayscale, RGB, and CMYK data. Any other color space is temporarily converted into the CMYK space by CRD (Color Rendering Dictionary) and subjected to color matching. The CMM 45 adjusts the colors by using an ICC profile.

The ICC profile includes a source profile and a printer profile. The source profile temporarily converts RGB (or CMYK) data into a normalized CIELAB space and converts the L*a*b* data into a CMYK space suitable for the target printer.

The source profile includes an RGB profile and a CMYK profile. When the input image is an RGB image (e.g., application software available from Microsoft or a JPEG or TIFF image), the RGB profile is selected. For a CMYK image (e.g., some data of Photoshop® or Illustrator® available from Adobe), the CMYK profile is selected. The printer profile is created in accordance with the color characteristic of each printer. For an RGB image, "Perceptual" or "Saturation" is preferably selected. For a CMYK image, "Colorimetric" is preferably selected.

The ICC profile generally has a LUT format. When RGB (or CMYK) data is input, the source profile uniquely outputs L*a*b* data. The printer profile uniquely outputs CMYK data that matches the printer in correspondence with input L*a*b* data. RGB data that requires no color matching is converted into CMYK data by default color conversion and then output. CMYK data that requires no color matching is output without any processing.

[Output Image Processor]

Figure 9:
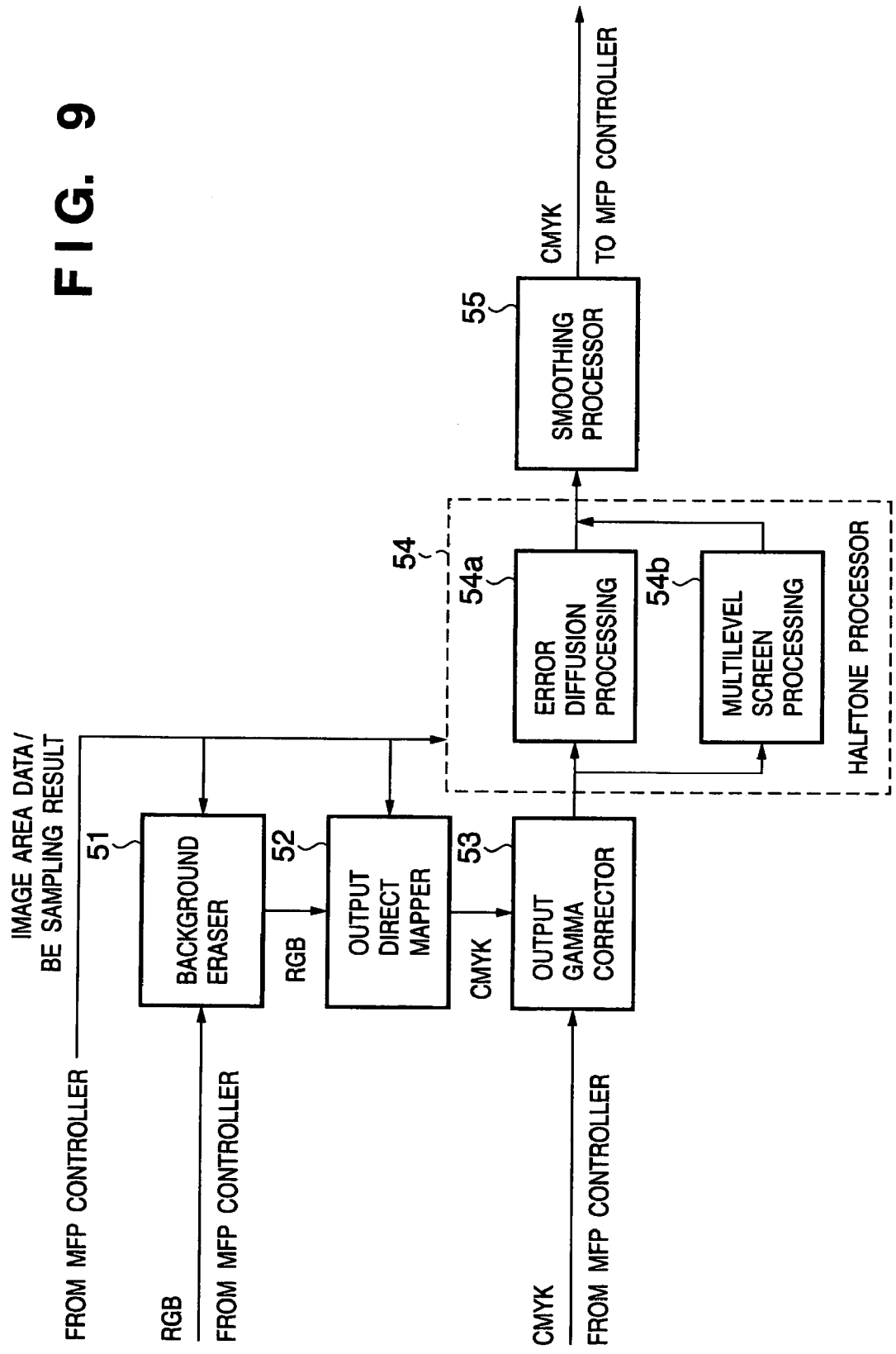
FIG. 9 is a block diagram showing an arrangement example of an output image processor.

FIG. 9 is a block diagram showing an arrangement example of the output image processor 20.

Image data input to the output image processor (color system) 20 can roughly be classified into RGB data that handles output data from the input image processor 12 by, e.g., copy operation, and CMYK data that handles output data from the image processing/RIP unit 17 by, e.g., network print operation. RGB data is input to a background eraser 51. CMYK data is input to an output gamma corrector 53.

Referring to FIG. 9, the background eraser 51 executes nonlinear conversion for RGB image data read by the scanner 11 to remove the background of the image on the basis of the sampling result of the BE sampler 111.

An output direct mapper 52 converts the RGB image data output from the background eraser 51 into CMYK image data. In this conversion, the RGB values are input to a 3DLUT, and the output value is set to a cyan (C) component. Magenta (M), yellow (Y), and black (K) components are also created by the 3DLUT. Different 3DLUTs are used for a character area and a photo area on the basis of image area data output from the input image processor 12.

The output gamma corrector 53 corrects the density of an output image corresponding to the printer 21. The output gamma corrector 53 maintains the linearity of gray levels of the output image, which changes in every image formation, by using a 1DLUT for each of CMYK data. Generally, a color calibration result is reflected on the 1DLUT.

A halftone processor 54 can selectively apply different kinds of pseudo halftoning processing in accordance with the MFP function. Generally, in, e.g., copy operation, error diffusion pseudo halftoning processing 54a that hardly generates any moiré is used. In the print operation, multilevel screen pseudo half toning processing 54b that uses, e.g., a dither matrix considering the reproducibility of characters and thin lines is often used.

In the error diffusion processing 54a, a pixel of interest and neighboring pixels are weighted by using an error diffusion filter. An error generated by pseudo halftoning processing of the pixel of interest is distributed to the neighboring pixels, thereby maintaining the prescribed number of gray levels. On the other hand, the multilevel screen processing 54b sets the threshold value of a dither matrix to multilevel values and digitally expresses the halftone. CMYK data is independently converted, and the low screen ruling and high screen ruling are switched on the basis of image area data.

A smoothing processor 55 detects an edge portion of each of the CMYK data by pattern matching and converts the data into a more smoothly reproducible pattern, thereby reducing jaggies.

[Operating Unit]

Figure 10:
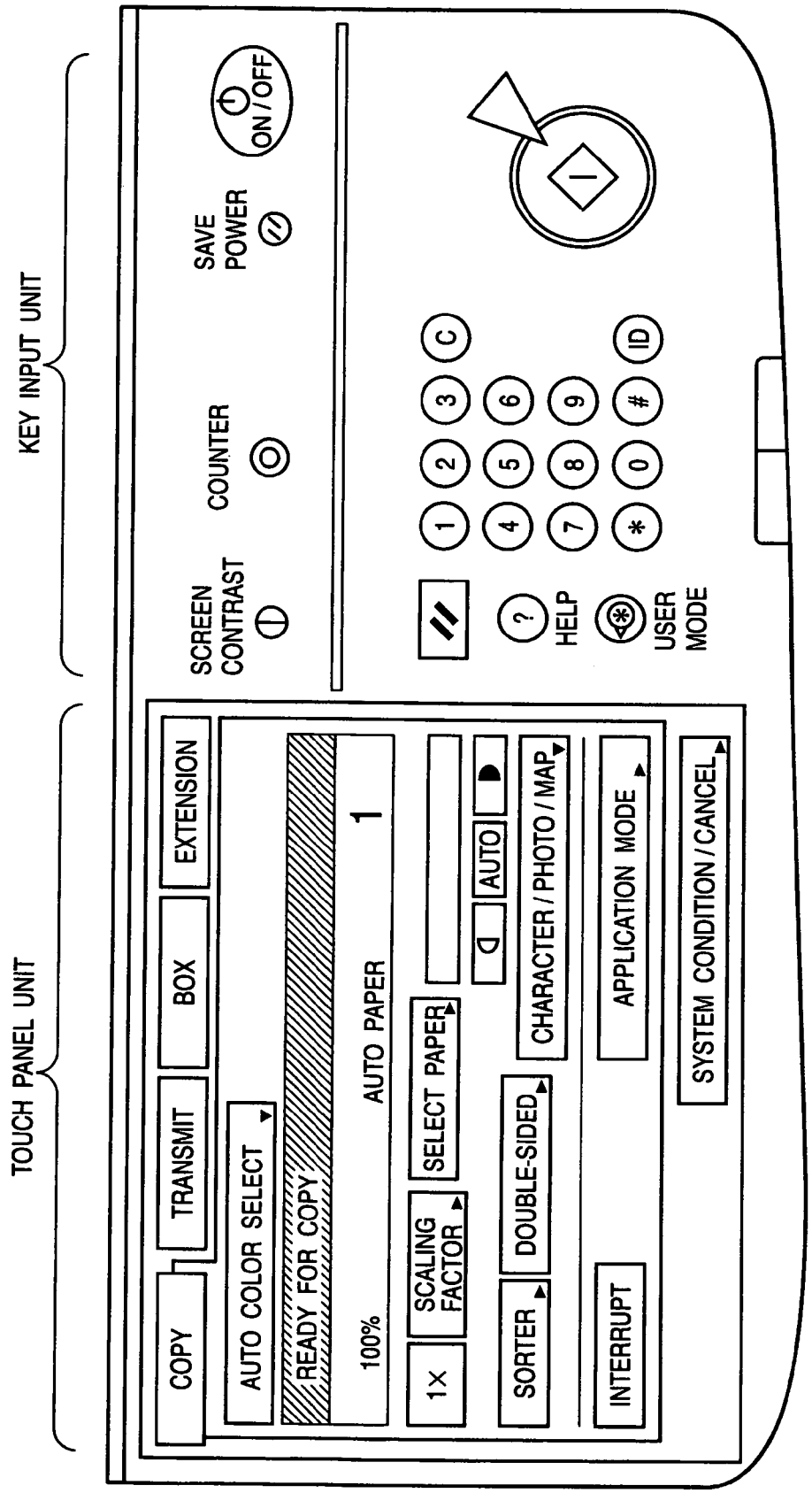
FIG. 10 is a view showing an arrangement example of an operating unit.

FIG. 10 is a view showing an arrangement example of the operating unit 14. The operating unit 14 includes a key input unit whose details are illustrated in FIG. 11 and a touch panel unit whose details are illustrated in FIG. 12.

Figure 11:
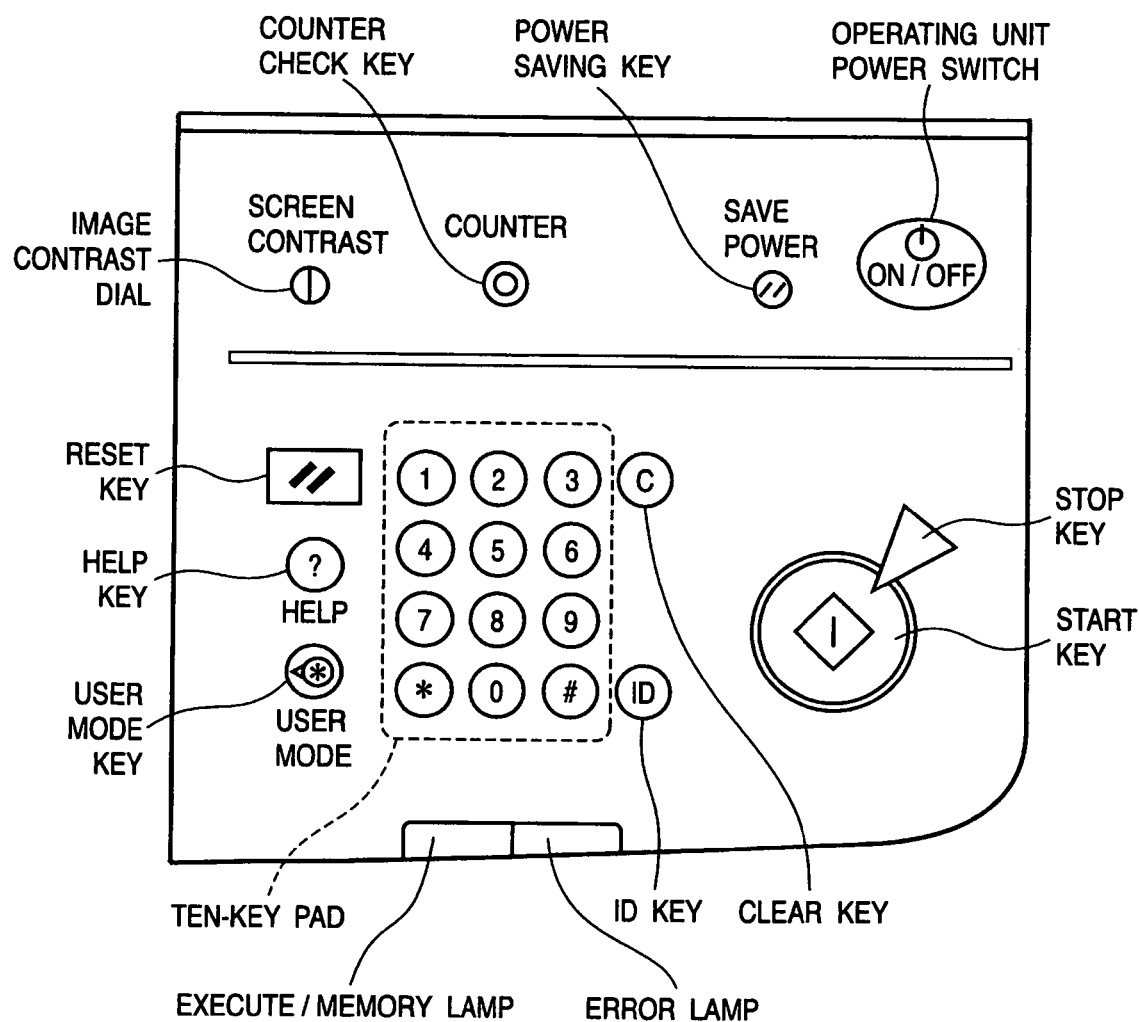
FIG. 11 is a view showing details of the key input unit of the operating unit.
Figure 12:
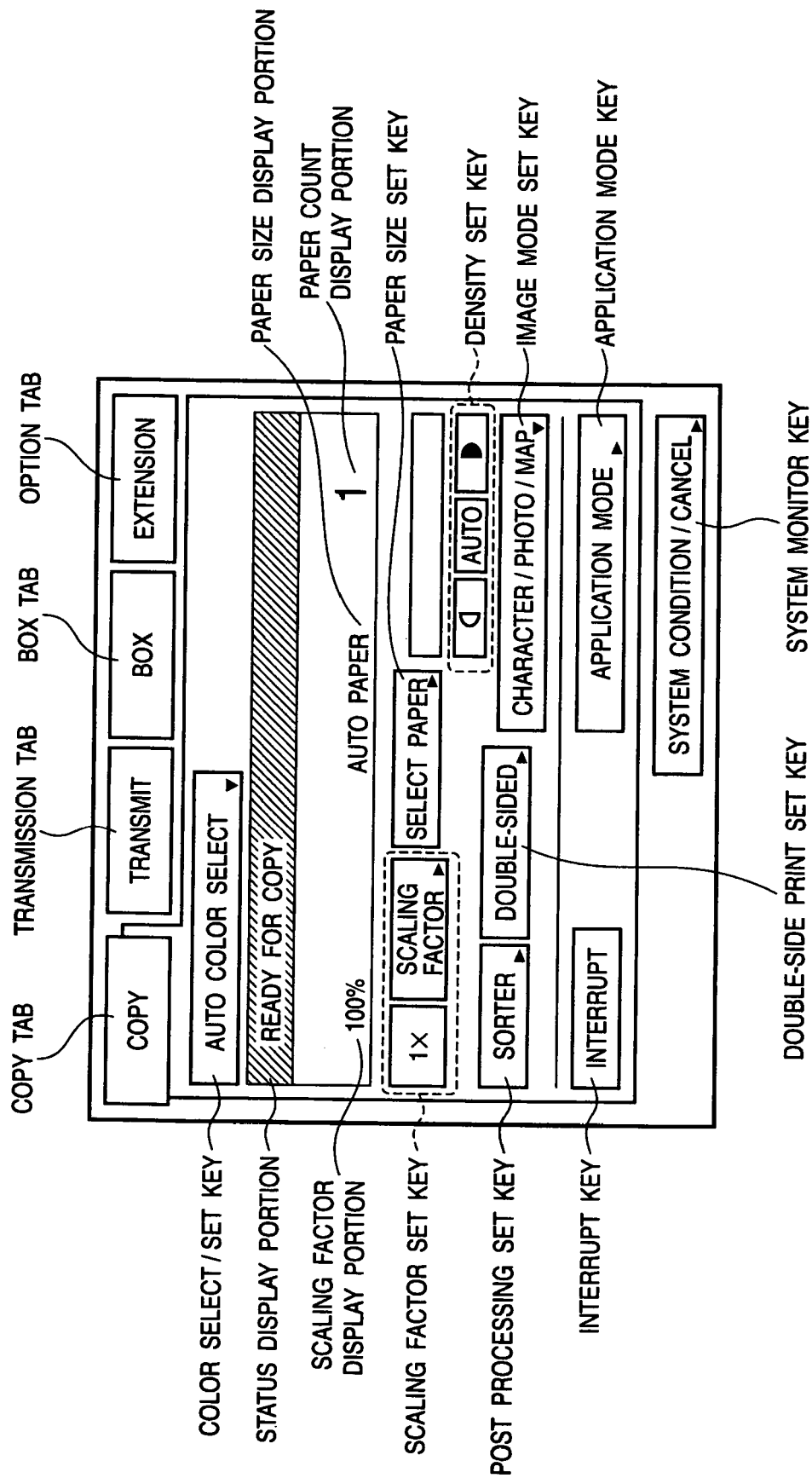
FIG. 12 is a view showing details of the touch panel unit of the operating unit.

The key input unit shown in FIG. 11 is a portion to do steady operation setting. An operating unit power switch switches between a wait mode (normal operation state) and a sleep mode and can be controlled when the main power switch for power supply to the entire system is ON. In the sleep mode, the main controller is waiting for an interrupt in preparation for network print or facsimile. The main controller suppresses power consumption of the device by stopping execution of, e.g., the control program.

A power saving key is used to lower the temperature of the fixing unit in the wait mode. When the temperature of the fixing mode decreases, the power consumption of the device can be suppressed although time is taken until a printable state is set. The temperature of the fixing unit can also be lowered by adjusting the power saving rate.

A start key is used to instruct the start of copy or transmission. A stop key is used to interrupt the operation.

A ten-key pad includes keys to input various kinds of set values. A clear key is used to clear the values. An ID key is used to input a preset password to authenticate the user of the MFP. A reset key is used to cancel various kinds of settings and restore the default state. A help key is used to display a guidance or help. A user mode key is used to change the display to a system setting window of each user.

A counter check key is used to display the number of output pages stored in a software counter which is provided in the MFP to count, e.g., the number of printed pages. When this key is operated, the number of output pages can be displayed in accordance with an operation mode such as copy, print, scan, and fax, a color mode such as color and monochrome, or a paper size such as large and small.

A screen contrast dial is used to control the brightness of backlight of the liquid crystal display of the touch panel unit and adjust the screen visibility. An execute/memory lamp blinks during job execution or access to the memory 16. An error lamp blinks when job execution is impossible or for a serviceman call to indicate an error or an operator call to indicate jam or expendable out.

The touch panel display includes an LCD (Liquid Crystal Display) and a transparent electrode bonded on it. The operating unit is programmed to detect contact of a user's finger on the transparent electrode corresponding to a key and display another operation window. FIG. 12 shows the initial window in the wait mode. Various operation windows are displayed in accordance with the setting operation.

A copy tab is a tab key to move to the operation window of the copy operation. A transmission tab is a tab key to move to an operation window to instruct a sending operation such as fax or e-mail sending. A box tab is a tab key to move to a window to input/output a job to/from a box (a memory to store jobs for each user). An option tab is a tab key to set an extension such as scanner setting. A system monitor key is used to display the state or condition of the MFP. When a tab key or system monitor key is pressed, the mode changes to a corresponding operation mode.

A color select/set key is used to select color copy, monochrome copy, or auto select in advance. A scaling factor set key is used to move to a window to set a scaling factor for 1× and zoom. A post processing set key is used to move to a window to set ON/OFF, the number, and the positions of staples or punch holes. A double-sided print set key is used to move to a window to select one-sided or double-sided printing. A paper size set key is used to move to a window to select the feed stage, paper size, and medium type. An image mode set key is used to select an image mode such as character mode or photo mode suitable for a document image. A density set key is used to increase or decrease the density of an output image.

A status indicator simply indicates a state such as a wait state, warm-up, jam, or error. A scaling factor indicator indicates the scaling factor set by the scaling factor set key. A paper size indicator indicates the paper size or mode set by the paper size set key. A paper count indicator indicates the count set by the ten-key pad and the number of the current page that is being printed.

An interrupt key is used to cause a job to interrupt the copy operation. An application mode key is used to move to a window to set various image processes and layout such as continuous shot, cover/interleave, reduced layout, and image move.

[Printer]

Figure 13:
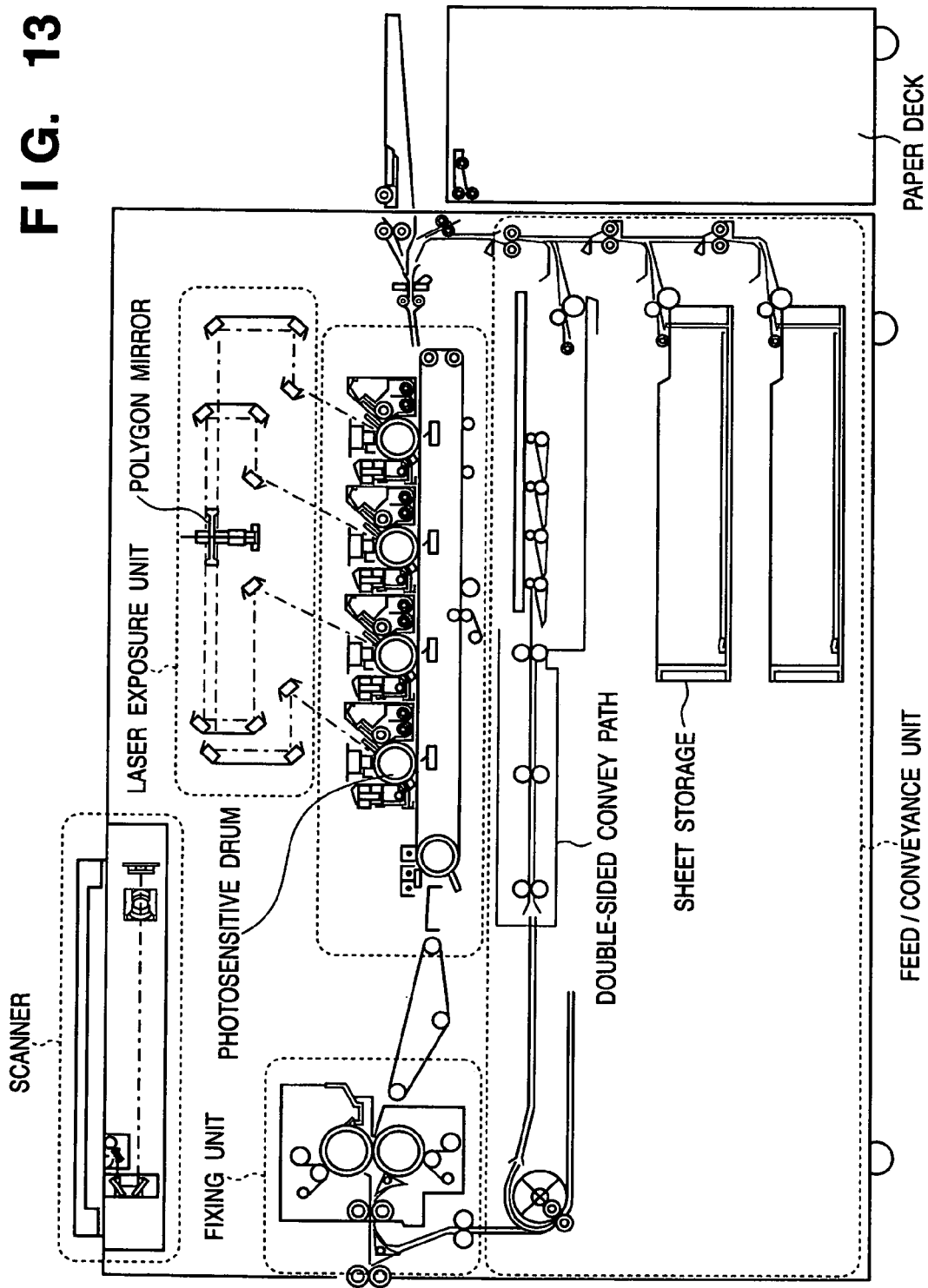
FIG. 13 is a view for explaining an arrangement example of a 4-drum (4D) color printer.

FIG. 13 is a view for explaining an arrangement example of the 4-drum (4D) color printer 21.

The 4D color printer 21 includes the scanner 11, laser exposure unit, photosensitive drum, image forming unit, fixing unit, feed/conveyance unit, and a printer controller (not shown) to control them.

The scanner 11 illuminates a document placed on the document table, optically reads the document image, and converts the image into an electrical signal to create image data.

The laser exposure unit sends a light beam such as a laser beam modulated in accordance with the image data to a rotary polyhedral mirror (polygon mirror) rotating at a uniform angular velocity and irradiates the photosensitive drum with scan light, i.e., reflected light from the rotary polyhedral mirror.

The image forming unit rotates the photosensitive drum, causes a charger to charge the photosensitive drum, develops, with toner, a latent image formed on the photosensitive drum by the laser exposure unit, and transfers the toner image to a sheet. The image forming unit also reclaims a very small amount of toner remaining on the photosensitive drum without being transferred. Image formation is implemented by preparing four developing units (developing stations) of the above-described series of electrophotographic processes. The four developing units are arranged in the order of cyan (C), magenta (M), yellow (Y), and black (K). Magenta, yellow, and black image forming operations are sequentially executed after the elapse of a predetermined time from the start of image formation of the cyan station. With this timing control, a full-color toner image without color misregistration is transferred to a sheet.

The fixing unit is formed by combining rollers and belts and incorporates a heat source such as a halogen heater. The toner on the sheet with the toner image being transferred by the image forming unit is fused and fixed on the sheet by heat and pressure.

The feed/conveyance unit has at least one sheet storage represented by a sheet cassette or paper deck. The feed/conveyance unit separates one of a plurality of sheets stored in the sheet storage and conveys the sheet to the image forming unit and fixing unit in accordance with an instruction from the printer controller. A toner image of each color is transferred to the conveyed sheet by the above-described developing unit so that a full-color toner image is finally formed on the sheet. To form images on both surfaces of the sheet, the sheet that has passed through the fixing unit is guided to a double-sided convey path to convey the sheet to the image forming unit again.

The printer controller communicates with the MFP controller to control the entire MFP and executes control in accordance with an instruction from the MFP controller. The printer controller also controls the entire device such that it can smoothly operate in harmony while managing the states of the above-described scanner, laser exposure unit, image forming unit, fixing unit, and feed/conveyance unit.

The outline of the operations of the units from a device power-OFF state to an operable state will be described next.

When the device is powered on, the printer controller instructs the scanner, laser exposure unit, image forming unit, fixing unit, and feed/conveyance unit to start a preparing operation and waits for the start of communication with the MFP controller that manages the entire MFP. When the communication with the MFP controller is established, the printer controller and MFP controller exchange the device specifications. When the preparing operation of each unit is ended, and the image forming operation is enabled, the printer controller notifies the MFP controller of the operable state.

The printer controller notifies the MFP controller of the device state of each unit. An example will be described. For the feed/conveyance unit, the printer controller detects the size of sheets stored in the sheet storage, the remaining quantity of sheets (load), and the operation state of the driving unit (whether the unit is operable or failed) and notifies the MFP controller of these pieces of information. For the image forming unit, the printer controller notifies the MFP controller of the remaining toner amount in the toner cartridge.

The outline of the operations of the units from the operable state to the execution and end of the series of print operations will be described next.

The MFP controller sends an operation start command to the printer controller. Upon receiving the operation start command, the printer controller instructs the laser exposure unit, image forming unit, feed/conveyance unit, and fixing unit to start the print operation. The laser exposure unit starts rotating a motor (polygon motor) to drive the polygon mirror. The image forming unit rotates and charges the photosensitive drum. The fixing unit turns on the heater to raise the fixing temperature so that the toner can be fixed on a sheet. The feed/conveyance unit sets a driving motor in a conveyable state.

When the units end preparation for the operation, the printer controller notifies the MFP controller of the completion of preparation. Upon receiving the preparation completion notification, the MFP controller instructs the print operation for each page. For a print job of, e.g., 20 copies each containing 10 pages, the MFP controller instructs the print operation of 200 pages. Upon receiving the print operation instruction, the printer controller instructs the feed/conveyance unit to feed paper.

If sheets can be fed, the feed/conveyance unit feeds and conveys one sheet. When the sheet reaches a predetermined position, the feed/conveyance unit notifies the printer controller of it. If no sheets are stored in the sheet storage, the feed/conveyance unit notifies the printer controller of the feed disable state. The feed/conveyance unit may have, on the convey path, an overlap feed sensor to detect conveyance of overlapping sheets (overlap feeding) or a thickness sensor to detect the thickness of a sheet. When such a sensor detects the overlap feeding or error, the feed/conveyance unit interrupts the feed/conveyance operation and notifies the printer controller of the error. Upon receiving the error notification, the printer controller notifies the MFP controller of, e.g., the reason for the operation interrupt and the position of the sheet remaining in the device.

Upon receiving a notification representing that the sheet is normally conveyed and has reached a predetermined position, the printer controller instructs the image forming unit to start image formation in accordance with the notification. With this timing control, a toner image is transferred onto the sheet. On the other hand, the fixing unit monitors the fixing temperature and controls it to an appropriate temperature. If the amount of heat absorbed by the sheet is large, the fixing temperature may decrease. In this case, the fixing unit notifies the printer controller of the decrease in fixing temperature. Upon receiving this notification, the printer controller increases the sheet conveyance interval not to decrease the fixing temperature any more. If the temperature of the fixing unit does not return, the printer controller temporarily interrupts the operation. After the fixing temperature returns to an appropriate temperature, the operation is resumed.

When all sheets are discharged, the printer controller instructs the units to stop the operation. Upon receiving an operation stop notification from each unit, the printer controller notifies the MFP controller of the end of operation.

[Scanner]

Figure 14:
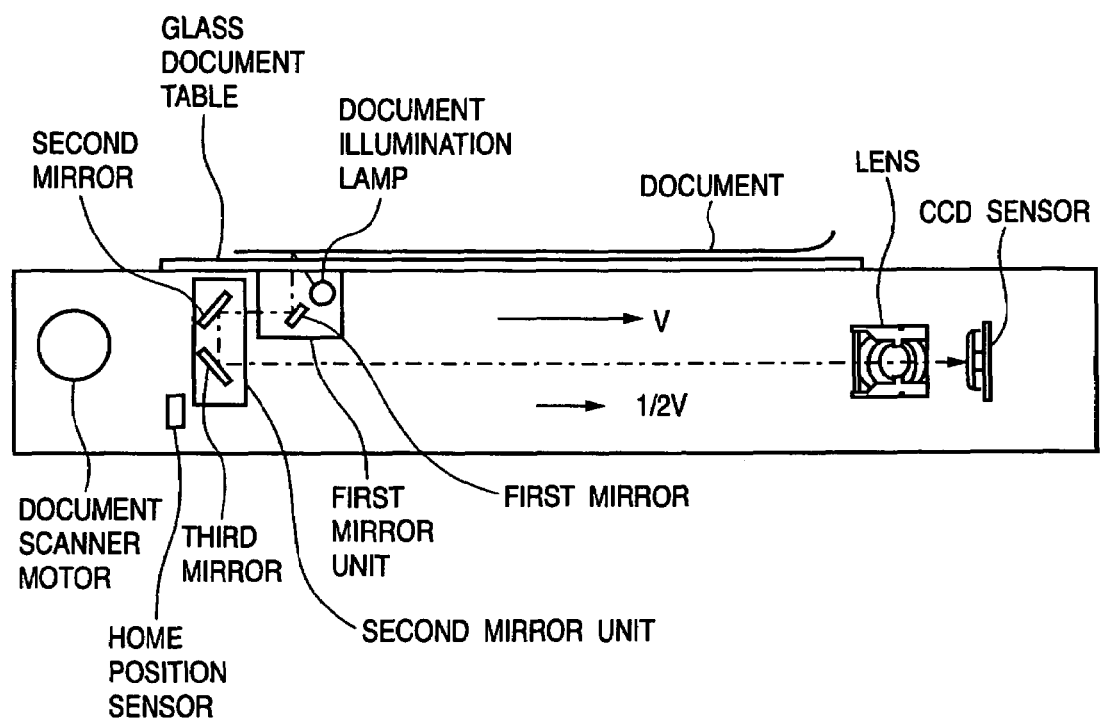
FIG. 14 is a view showing an arrangement example of the scanner.

FIG. 14 is a view showing an arrangement example of the scanner 11.

A document to be read is placed on the glass document table. When the start key of the operating unit 14 or the "OK" key of the scanner driver is pressed, a scan operation is started.

When the scan operation starts, first and second mirror units temporarily return to the home position where a home position sensor is located. The document illumination lamp in the first mirror unit is turned on. Reflected light from the document illuminated with the document illumination lamp forms an image on the CCD sensor 101 via a lens through a first mirror in the first mirror unit and second and third mirrors in the second mirror unit so that an optical signal is input to the CCD sensor 101.

The first and second mirror units are driven by the same scanner motor. By applying a running block, the first mirror unit having the first mirror and document illumination lamp moves at a velocity V, and the second mirror unit having the second and third mirrors moves at a half velocity V/2 so that the entire surface of the document is scanned.

[ADF]

Figure 15:
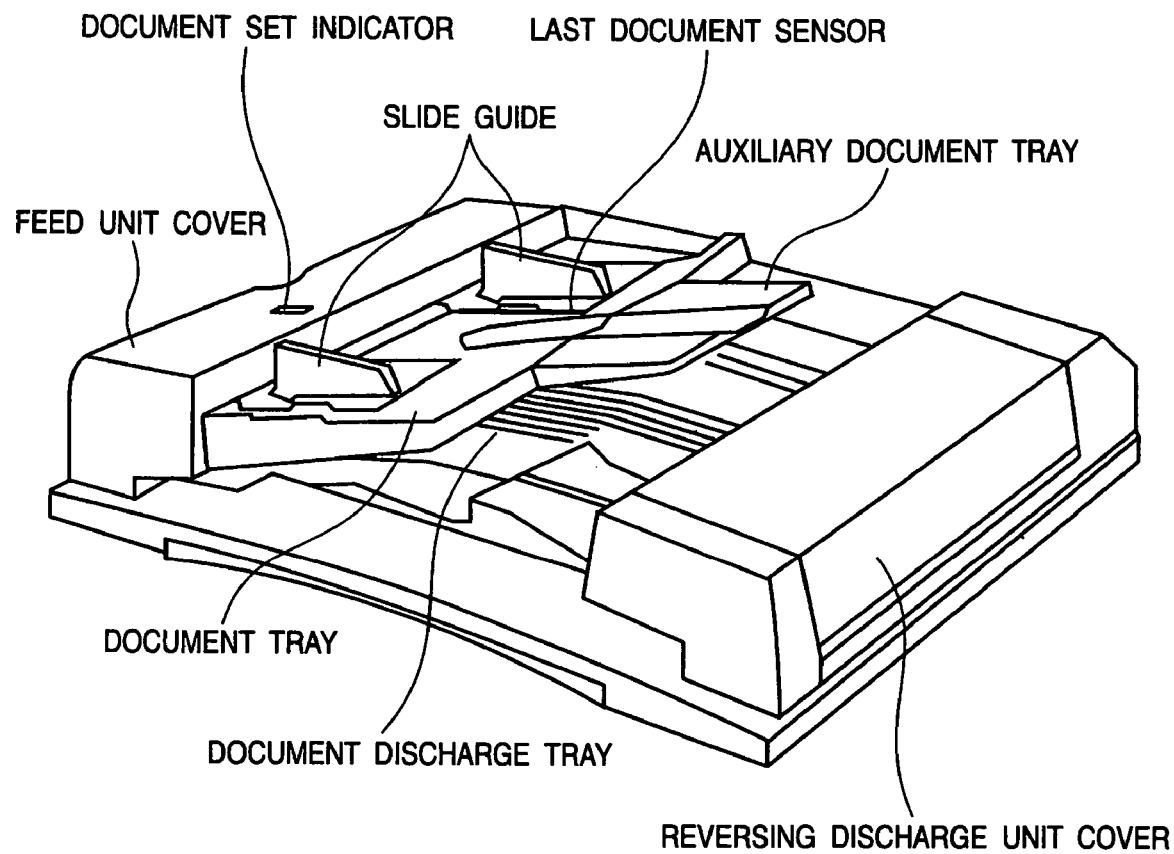
FIG. 15 is a view showing an arrangement example of an automatic document feeder (ADF)
Figure 16:
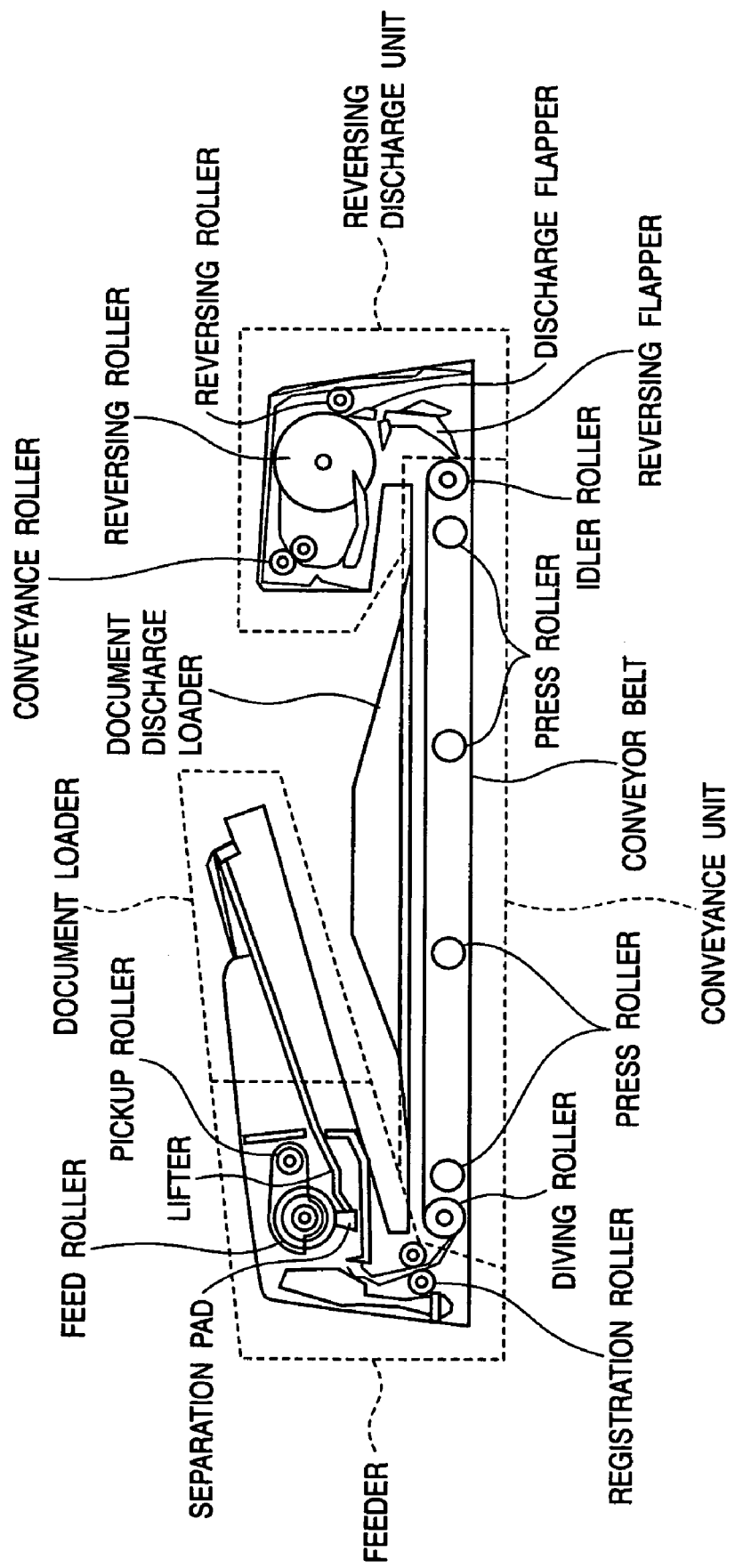
FIG. 16 is a view showing an arrangement example of the automatic document feeder (ADF)

FIGS. 15 and 16 are views showing an arrangement example of an automatic document feeder (ADF).

A document that is set on the load surface of the document tray of the document loader is detected by a document sensor. The document sensor is arranged between a pickup roller and a feed roller (both will be described later).

A feeder separates the uppermost sheet from a bundle of documents by a friction-separation scheme and conveys the document to registration rollers (feed). In feeding the document, the pickup roller moves downward onto the bundle of documents. Simultaneously, the intermediate plate moves upward to press the bundle of documents against the feed roller, and a pre-feed operation starts. The feed roller and pickup roller are rotated clockwise (CW) by a motor serving as a driving source, thereby conveying the document. The second and subsequent documents dragged by the uppermost document are stopped by a scraper and held in the document loader. Separation of a document is detected by a separation sensor arranged downstream the feed roller.

Then, the document is guided to the registration roller pair through a guide. The registration roller pair is at rest when the leading edge of the document reaches it. A loop is formed as the document is conveyed by the feed roller so that a document skew is corrected. The registration rollers rotate to convey the document to a document conveyor.

In the document conveyor, a conveyor belt is looped over a driving roller and an idler roller. The conveyor belt is pressed against the platen (document table) by press rollers and driven. The document is inserted between the conveyor belt and the platen and moved on the platen by the friction force of the conveyor belt.

The document that has entered the document conveyor is conveyed by the conveyor belt to a predetermined position of the platen and stopped. The document image is read by a document reader. When reading is ended, the document is conveyed to the right of FIG. 16 and guided to a reversing discharge unit. If a succeeding document is present, it is conveyed by the conveyor belt to a predetermined position of the platen and stopped, and the document image is read by the document reader, like the preceding document. During execution of the reading operation of the succeeding document, the previous document is reversed by the reversing discharge unit that operates independently and discharged to a document discharge loader. The above-described operation is continuously executed until all documents to be read are processed.

The reversing discharge unit includes a reversing roller and conveyance roller pair serving as a conveyance means and a motor (not shown) serving as the driving source of the rollers. The motor can rotate in the forward and reverse directions. The reversing discharge unit can operate independently of the document conveyor which is driven by a separate motor.

When the document is entering from the conveyor belt to the reversing discharge unit, a reversing flapper which is arranged near the entrance of the reversing discharge unit to regulate the path of the sheet is set in a posture shown in FIG. 16 by a solenoid (not shown). Hence, the document is guided to the reversing roller. The document is sandwiched between a reversing roller rotating counterclockwise (CCW) and an opposing reversing roller and conveyed to the conveyance roller pair. When the trailing edge of the document leaves the reversing flapper, the reversing flapper rotates clockwise. The reversing roller rotates in the reverse direction, i.e., clockwise so that switchback conveyance of the document starts. In this way, the document is guided to the lower left portion of FIG. 16 and discharged to the document discharge tray of the document discharge loader.

[Post Processor]

Figure 17:
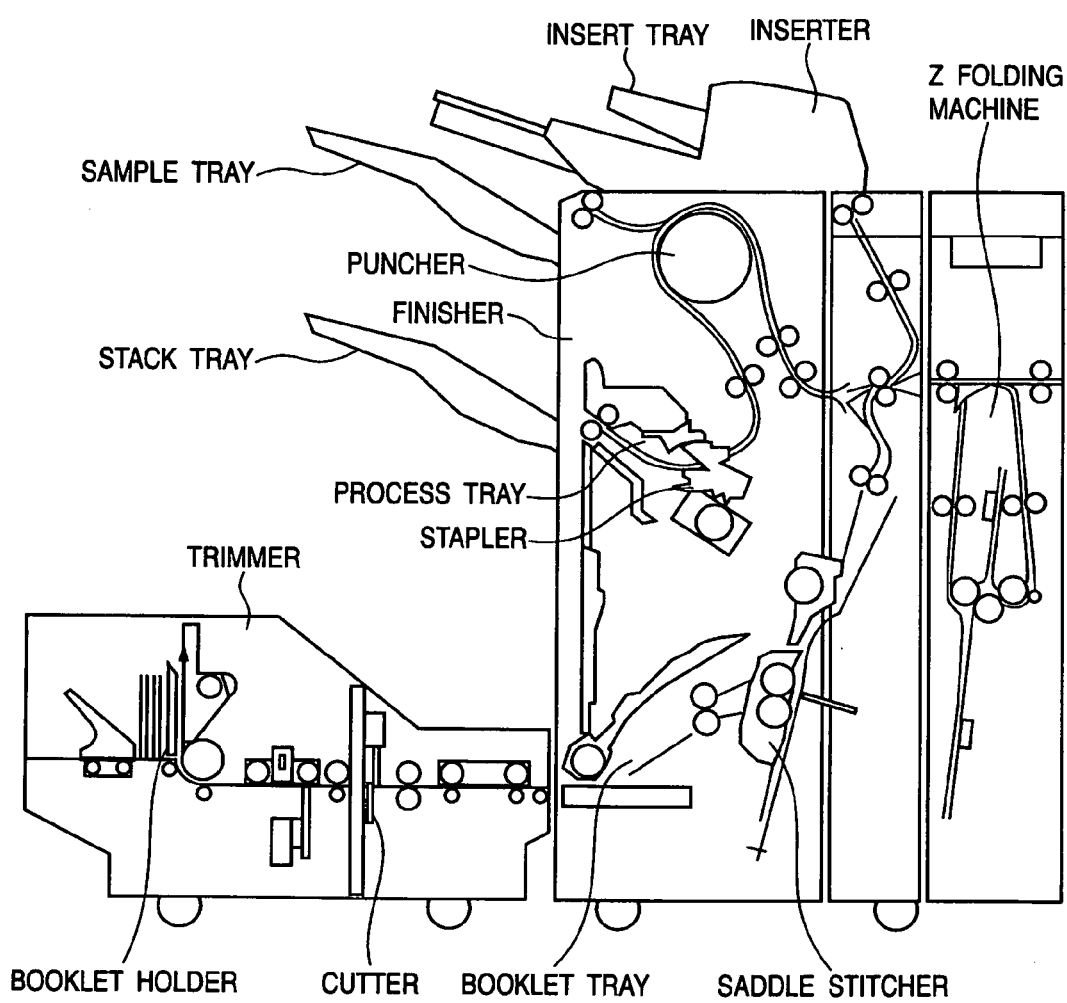
FIG. 17 is a view showing an arrangement example of a post processor (inline finisher)

FIG. 17 is a view showing an arrangement example of the post processor 22 (inline finisher).

When an inline finisher is connected, a sheet discharged from the fixing unit of the printer 21 enters the inline finisher. The inline finisher has a sample tray and a stack tray and switches the discharge destination tray in accordance with the job type or the number of sheets to be discharged.

Sorting can be done by two sorting schemes: a bin sort scheme which distributes sheets to a plurality of bins and a shift sort scheme which distributes output sheets for each job by an electronic sorting function and an operation of shifting a bin (or tray) in the back and forth directions.

The electronic sorting function is called "collate". When the MFP controller has a large-capacity memory 16, the electronic sorting function is supported by using the so-called collate function of changing the buffered page order and discharge order by using the memory as a buffer.

A grouping function sorts sheets for each page, unlike the sorting function that distributes sheets for each job.

If a staple mode is set for a job to be output, sheets are discharged to the stack tray. The sheets are sequentially stored in a process tray in the finisher before discharge to the stack tray and bound by a stapler on the process tray. Then, the bundle of sheets is discharged to the stack tray.

In addition, a Z folding machine to fold a sheet into a Z-shape and a puncher to form two (or three) holes for filing. Each processing is executed in accordance with the job type.

In, e.g., a job for which the user sets Z folding by operating the operating unit 14, folding by the Z folding machine is executed for each sheet of the job. Then, control is performed to make the sheet pass through the inline finisher and discharge it to the discharge tray such as the stack tray or sample tray. In, e.g., a job for which punching is set, punching by the puncher is executed for each sheet of the job. Then, control is performed to make the sheet pass through the inline finisher and discharge it to the discharge tray.

A saddle stitcher executes processing (bookbinding) of binding sheets at two points of the central portion, inserting the sheets between rollers to fold them at the center to make a booklet such as a pamphlet. The sheets bound by the saddle stitcher are discharged to a booklet tray. The execution enable/disable state of sheet processing such as bookbinding by the saddle stitcher is also based on sheet processing setting that is done by the user for the job to be output, as described above.

An inserter sends sheets set in an insert tray to one of the discharge trays such as the stack tray and sample tray without letting the sheets pass through the printer 21. With this structure, the sheets set in the inserter can be inserted between sheets sent to the inline finisher (sheets printed by the printer 21). The sheets are set in the insert tray in a face-up state and sequentially fed from the uppermost one by a pickup roller. Hence, the sheets from the inserter are directly conveyed to the stack tray or sample tray and discharged in a face-down state. To send a sheet to the saddle stitcher, the sheet is temporarily sent to the puncher side and then switched back to the saddle stitcher such that all sheets face in the same direction. The execution enable/disable state of sheet insert processing by the inserter is also based on sheet processing setting that is done by the user for the job to be output, as described above.

A trimmer (cutting machine) receives a booklet formed by the saddle stitcher (saddle-stitched booklet). Rollers feed the booklet by only a predetermined length, and a cutter cuts the booklet by only a predetermined length. Hence, even when the edge lengths of a plurality of pages of the booklet are uneven, the edges are cut to an even length. The booklet is stored in a booklet holder. The execution enable/disable state of cutting processing by the trimmer is also based on sheet processing setting that is done by the user for the job to be output, as described above.

[Setting Window of Printer Driver]

Figure 18:
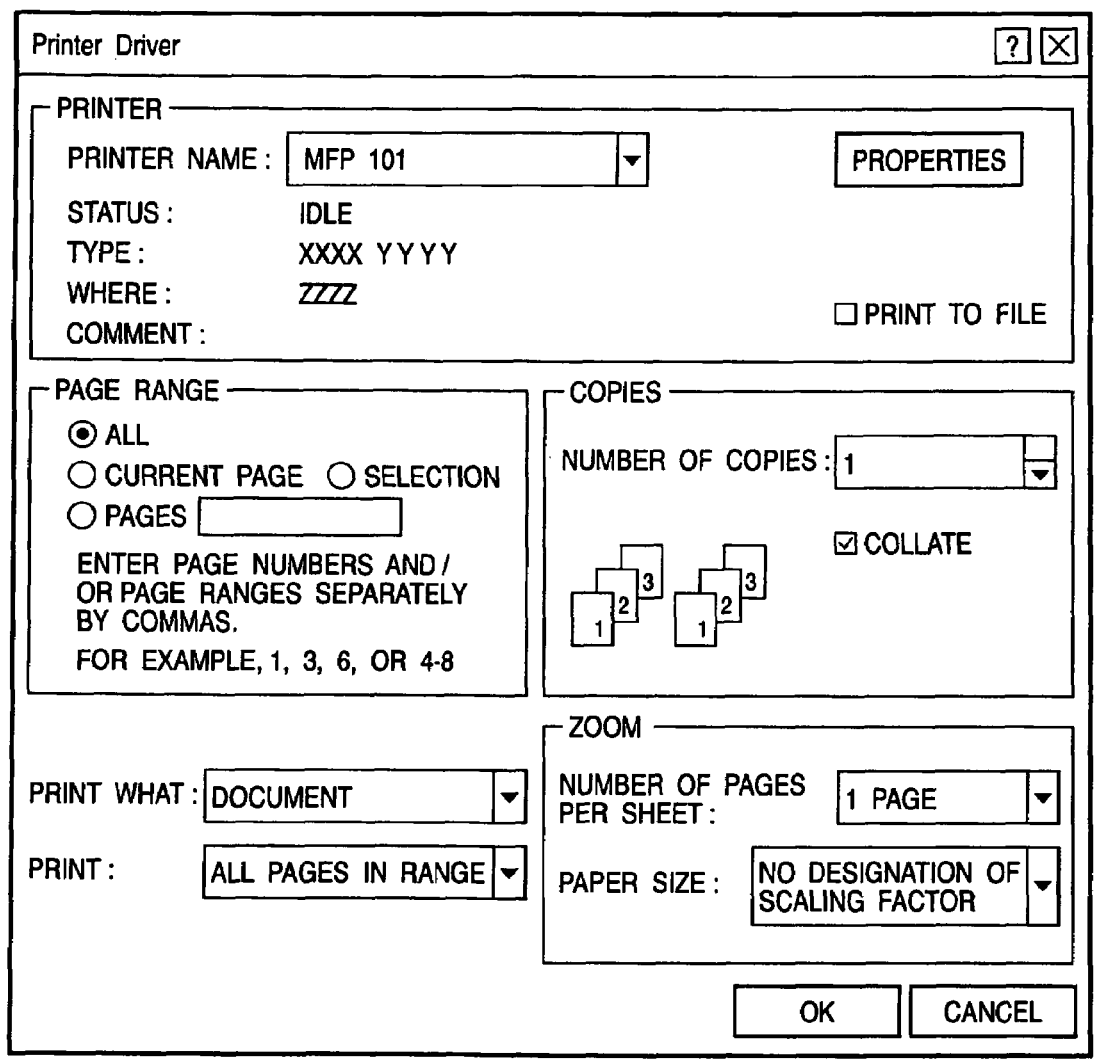
FIG. 18 is a view showing an arrangement example of the setting window of a printer driver.

FIG. 18 is a view showing an arrangement example of the setting window of a printer driver. The printer driver is used as a means for outputting a trial proof or a final printed product from an application that runs on the client PC 3 to a printer device such as an MFP.

The printer driver setting window is displayed generally when the user of the client PC 3, who wants to output print data to, e.g., an MFP selects the print menu of the application.

First, the user selects a printer device to be used from a "Printer Name" pull-down list box in the Printer section of the setting window. With this selection, the state of the selected printer device is displayed in a "Status" field. The type of the printer driver is displayed in a "Type" field. Information representing the installation location of the printer device is displayed in a "Where" field. A comment of the administrator of the printer device is displayed in a "Comment" field. To output print data not to the printer device but as a file, a "Print to File" box is turned on.

Print pages are designated by selecting a "All", "Current Page", "Selection", or "Pages" radio button. When "Pages" is selected, the numbers of pages to be printed are input to the edit box.

The property of the document to be printed is selected in a "Print What" pull-down list box. "All pages in Range", "Odd-Numbered Pages", or "Even-Numbered Pages" is selected in a "Print" pull-down list box.

The number of copies is input to a "Number of Copies" spin box in the Copies section. To print multiple copies not for each page but for each complete copy, a "Collate" check box is turned on.

N-up printing (printing with a plurality of pages being laid out on one print surface) can be designated in a "Pages per Sheet" pull-down list box in the Zoom section. The printing paper size (scaling factor) for the page size can be designated in a "Scale to Paper Size" pull-down list box.

When setting in the setting window of the printer driver is ended, the user clicks on an "OK" button to output the print data to a file or a printer device such as an MFP. To cancel output, a "Cancel" button is clicked on.

When a "Properties" button in the Printer section is clicked on, more detailed print properties can be set.

Figure 19:
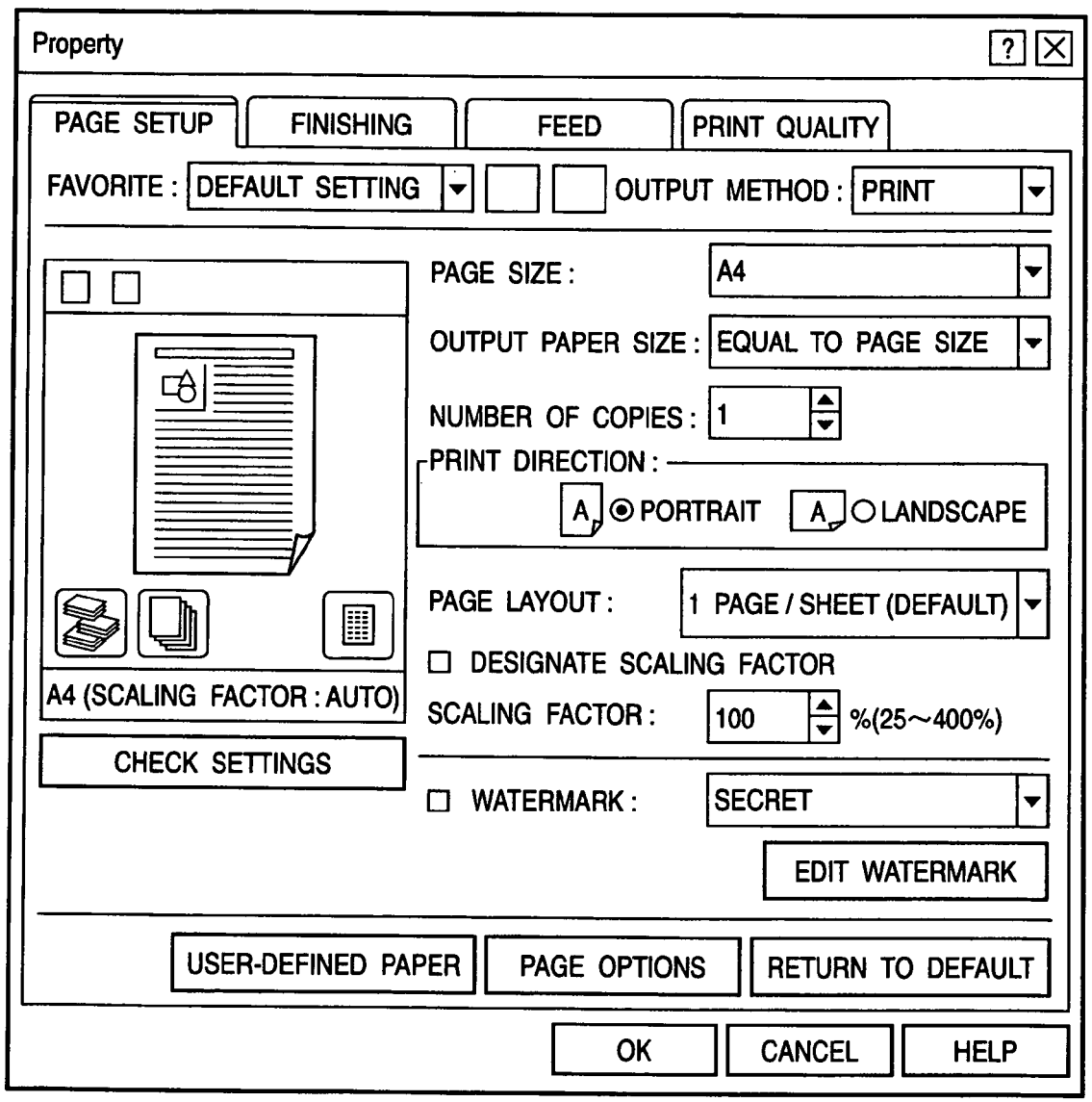
FIG. 19 is a view showing an arrangement example of a property setting window related to page setting processing of the printer driver.

FIG. 19 is a view showing an arrangement example of a property setting window related to page setting processing of the printer driver. This window is displayed as a default window when the "Properties" button is clicked on or by selecting a "Page Setup" tab of the property setting window.

The user can select, in a "Favorite" pull-down list box, an appropriate page setting from page settings registered in advance. In addition, the user can add a favorite page setting or edit a registered page setting by using two buttons located on the right side of the pull-down list box.

The contents set in the property setting window can be displayed as a list by clicking on the "Check Setting" button. The contents set in the property setting window are reflected on the page image on a "Check Setting" button.

In an "Output Method" pull-down list box, an output method can be designated from normal printing and secure printing by the printer device, saving in the memory of the printer device, and editing and preview by the printer device.

In "Page Size" and "Output Size" pull-down list boxes, the page size of the print target and the output sheet size of the printer device can be selected. The number of copies to be printed is input to a "Number of Copies" spin box. The orientation of a sheet output from the printer device can be selected from "Portrait" and "Landscape" by "Orientation" radio buttons.

In a "Page Layout" pull-down list box, N-up printing can be designated. When a "Scaling" check box is turned on, the scaling factor represented in percent can be input to a "Scaling" spin box.

When a "Watermark" check box is turned on, predetermined watermark types can be selected in a pull-down list box. When an "Edit Watermark" button is clicked on, a watermark type can be added or edited.

When a "User-Defined Paper" button is clicked on, a user-defined sheet can be defined. When a "Page Option" button is clicked on, more detailed page options can be set. When a "Return to Default" button is clicked on, the setting in the property setting window can be returned to the default setting.

Figure 20:
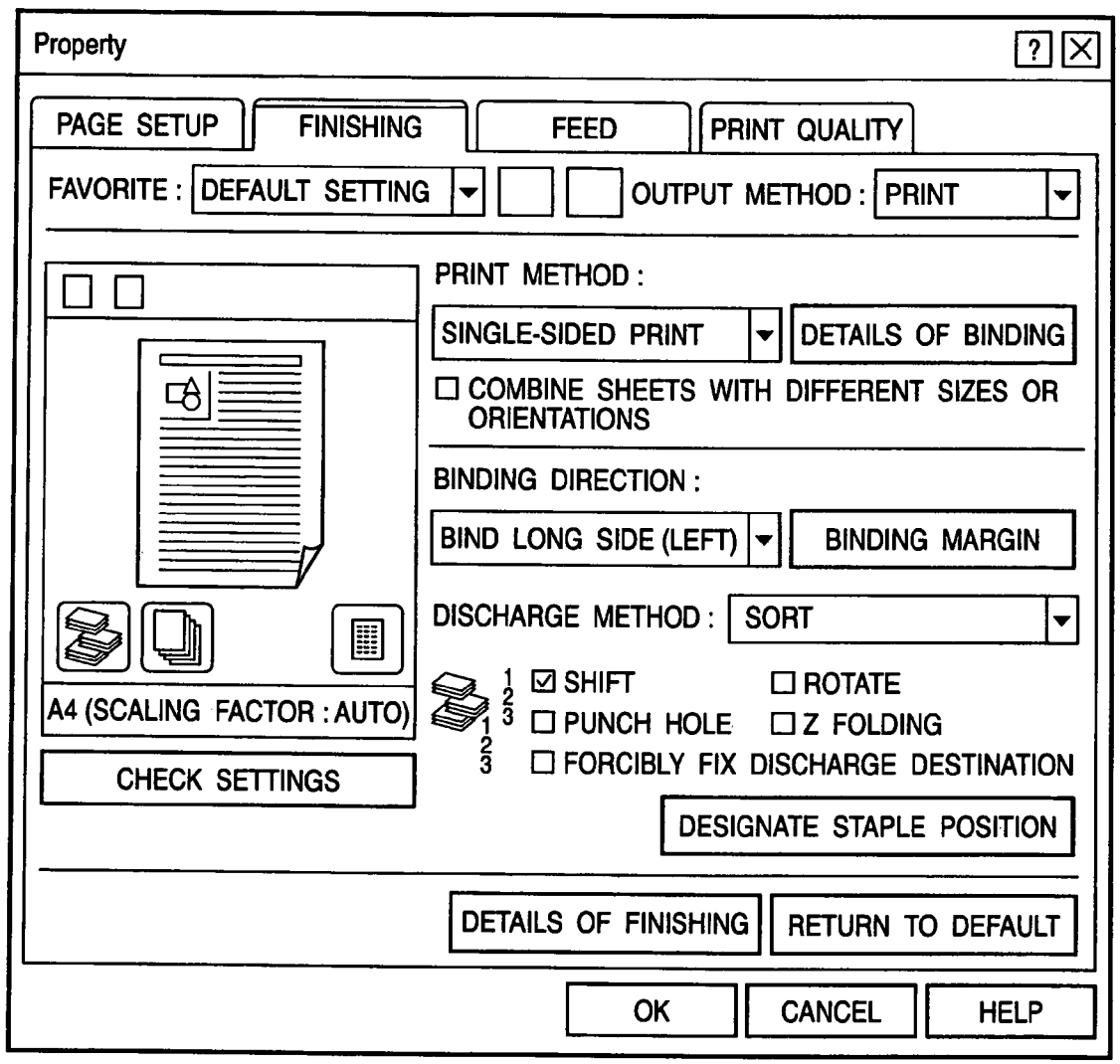
FIG. 20 is a view showing an arrangement example of a property setting window related to finishing of the printer driver.

FIG. 20 is a view showing an arrangement example of a property setting window related to finishing of the printer driver. This window is displayed by selecting the "Finish" tab of the property setting window. The functions of a "Check Setting" button, "Output Method" pull-down list box, and "Return to Default" button are the same as described above, and a detailed description thereof will be omitted.

The user can select, in a "Favorite" pull-down list box, an appropriate finishing setting from finishing settings registered in advance. In addition, the user can add a favorite finishing setting or edit a registered finishing setting by using two buttons located on the right side of the pull-down list box.

In a "Printing Method" pull-down list box, a printing method such as "Single-Sided Printing", "Double-Sided Printing", or "Bookbinding Printing" can be designated. When "Bookbinding Printing" is designated, the bookbinding printing method, page open direction, and binding margin width are designated by clicking the "Details of Bookbinding" button.

To combine sheets with different sizes or directions, a "Combine Sheets with Different Sizes or Directions" check box is turned on to designate the sheet combining method, aligning method, and binding margin width.

"Single-Sided Printing" or "Double-Sided Printing" is designated in a "Printing Method" pull-down list box. If the "Combine Sheets with Different Sizes or Directions" check box is not turned on, the binding direction is selected from "Bind Long Side (Left)", "Bind Long Side (Right)", "Bind Short Side (Up)", and "Bind Short Side (Down)" in a "Binding Direction" pull-down list box. In addition, the binding margin width is designated by clicking on a "Binding Margin" button.

In a "Discharge Method" pull-down list box, a discharge method is selected from "Sort", "Group", and "Staple". In addition, a finishing method is designated by a "Shift", "Rotate", "Punch", or "Z Folding" check box. When "Staple" is designated, a staple position is designated by clicking on a "Designate Staple Position" button. To forcibly fix the discharge destination, a "Forcibly Fix Discharge Destination" check box is turned on.

When a "Details of Finishing" button is clicked on, a more detailed finishing method can be set.

[Setting Window of Web Browser]

A Web application to manage a device or job can be used when printing or document copy is done from an application that runs on the client PC 3 to a printer device such as an MFP. The Web application can be installed in either a device having a Web server function or a server that executes a Web server. A Web application installed in a device manages only the device and jobs issued to the device. On the other hand, a Web application installed in a server can manage all devices controlled by the server and all jobs issued to the devices. Any client PC 3 or server having the Web browser can display the display window of the Web application.

Figure 21:
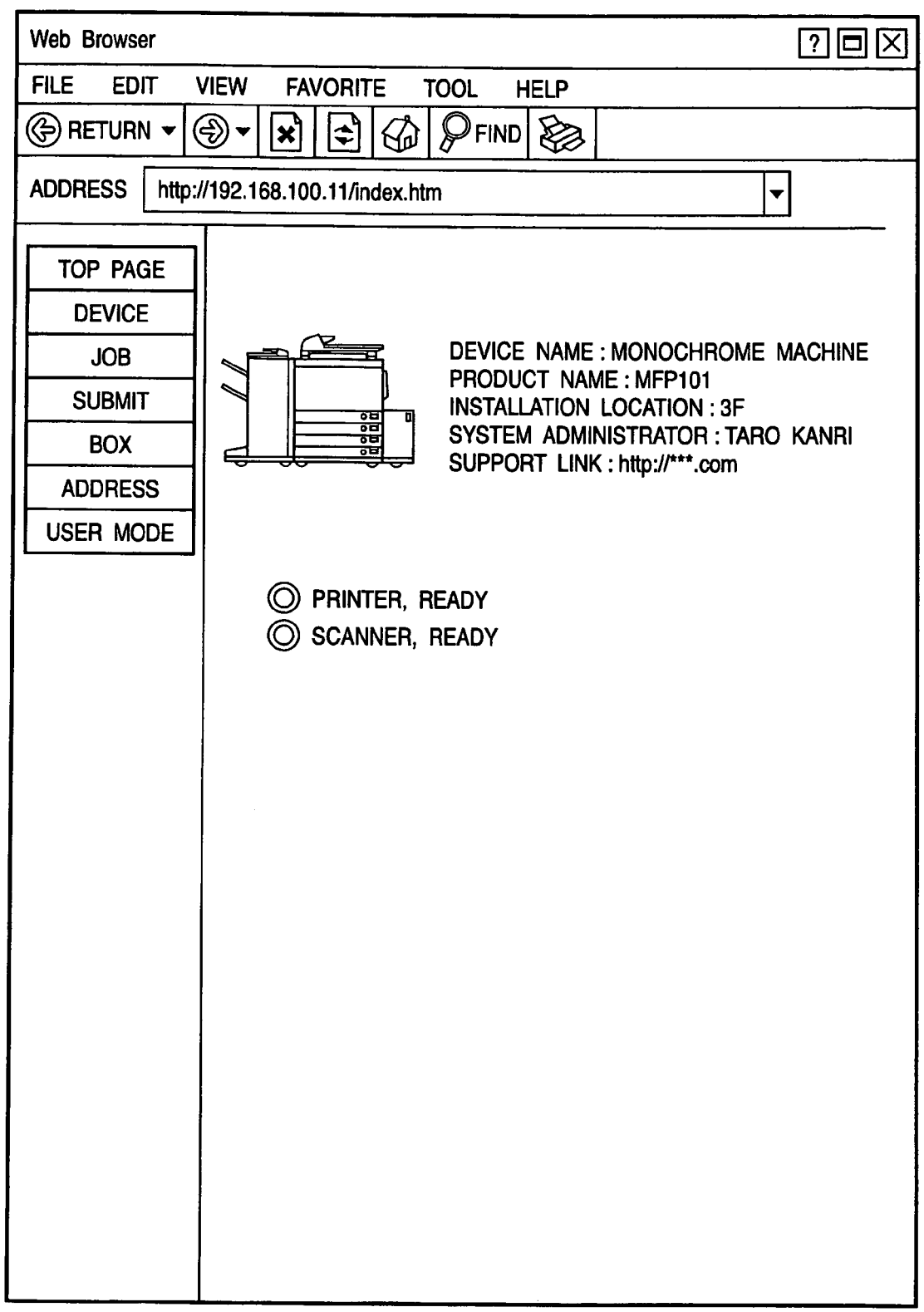
FIG. 21 is a view showing an arrangement example of the top window of a Web application.

FIG. 21 is a view showing an arrangement example of the top window of the Web application.

The top window of the Web application is displayed when the user inputs the IP address of the server or device with the Web application being installed in it to the address bar of the Web browser or clicks on a "Top" button in the left frame of the window. In the example shown in FIG. 21, an IP address "192.168.100.11" is input to the address bar. A server name may be input in place of the IP address if DNS (Domain Name Service) is supported in the environment.

"Top Page", "Device", "Job", "Submit", "Box", "Address, and "User Mode" buttons are arranged in the left frame of the top window so that jump to each page is possible. Pieces of information such as an illustration of the device's outline, device name, product name, installation location, system administrator, and support link are displayed in the right frame of the top window. Together with signal lamps indicating the printer state and scanner state, character strings representing the states are displayed.

FIG. 22 is a view showing an arrangement example of the device management window of the Web application. This window is displayed by, e.g., clicking on the "Device" button in the left frame of the top window.

"Status", "Information", "Equipment", "Network", and "Check Counter" submenus are present under the "Device" button in the left frame of the device management window. FIG. 22 shows a window displayed when the "Status" menu is selected.

Various kinds of information fields such as a device status, feed information, expendable information, device outline, and remaining memory capacity are displayed in the right frame of the device management window. The device status and device outline are the same as described above, and a detailed description thereof will be omitted.

In the feed information field, the remaining quantity, size, and type of sheets stored in each feed stage such as a cassette, paper deck, or manual feed tray are displayed as an icon and character strings. In the expendable information field, the remaining quantities of CMYK toners, the remaining quantities of staples, and the remaining quantities of binding strips are displayed by a signal lamp and an indicator. In the remaining memory capacity field, the remaining capacity of the memory 16 such as a hard disk is displayed as a pie chart indicator.

The user can grasp the status of the printer device before or after printing by referring to the device management window.

FIG. 23 is a view showing an arrangement example of the job management window of the Web application. This window is displayed by, e.g., clicking on the "Job" button in the left frame of the top window.

"Print Job", "Printed Job", "Copy Job", "Transmission Job", and "Reception Job" submenus are present under the "Job" button in the left frame of the job management window. FIG. 23 shows a window displayed when the "Print Job" menu is selected.

A list of jobs before printing which are issued to a target printer device is displayed in the right frame of the job management window. In the example shown in FIG. 23, an identification number (No.) column, status column, control column, job name column, priority column, number-of-pages column, and number-of-copies column are displayed.

The status column indicates the status of each job such as printing (P), wait (W), RIP (R), and holding (H). In the control column, delete (X), pause (II), and resume (rightward triangle) buttons are arranged so that delete, pause, and resumption of each job can be instructed. The job name column indicates the name of each job. The priority column indicates the priority order of each job such as high, medium, and low. The number-of-pages column indicates the number of pages of each job. The number-of-copies column indicates the number of copies of each job.

FIG. 24 is a view showing an arrangement example of the job submit window of the Web application. This window is displayed by, e.g., clicking on the "Submit" button in the left frame of the top window.

"Main", "Page Setup", "Finish", "Feed", "Print Quality", and "Set Exception" submenus are present under the "Submit" button in the left frame of the submit window. FIG. 24 shows a window displayed when the "Main" menu is selected.

In the right frame of the job submit window of the Web browser, the property of a job to be newly issued to the target device is set.

The name of a file as the contents of the job to be newly issued can be input to a "File Name" text box. The designated file can be previewed by clicking on a "Display" button.

In a "Job Ticket" pull-down list box, a job ticket to be associated with the job to be newly issued can be selected from job tickets saved in advance. The selected job ticket can be saved by overwrite by a "Save" button, saved in another job ticket name by a "Save As" button, or deleted by a "Delete" button.

In a "Job Priority" pull-down list box, the priority of the job is set to high, medium, or low. In a "Save Job Before RIP" pull-down list box, whether to save the job before RIP, which is issued to the device, in the memory 16 such as a hard disk is designated. In a "Save Job After RIP" pull-down list box, whether to save the job after RIP, which is issued to the device, in the memory 16 such as a hard disk is designated. In a "Job Scheduling" pull-down list box, whether to print the issued job directly, hold it before RIP, or hold it after RIP is designated.

In a "Send E-Mail" pull-down list box, whether to send e-mail to notify the user of the end of printing of the job issued to be device is designated. To send a notification, the e-mail address of the destination is input to an "E-Mail Address" text box. In an "Annotation" pull-down list box, whether to attach an annotation to the contents of the job issued to the device as a watermark is designated. To attach an annotation, a character string is input to an "Annotation Character String" text box. In a "Job Security Level" pull-down list box, the security level of the job is designated as, e.g., high or low.

When setting of all the "Page Setup", "Finish", "Feed", "Print Quality", and "Set Exception" menus except the "Main" menu is ended, a new job can be issued by clicking on a "Print" button.

[Setting Window of Scanner Driver]

Figure 25:
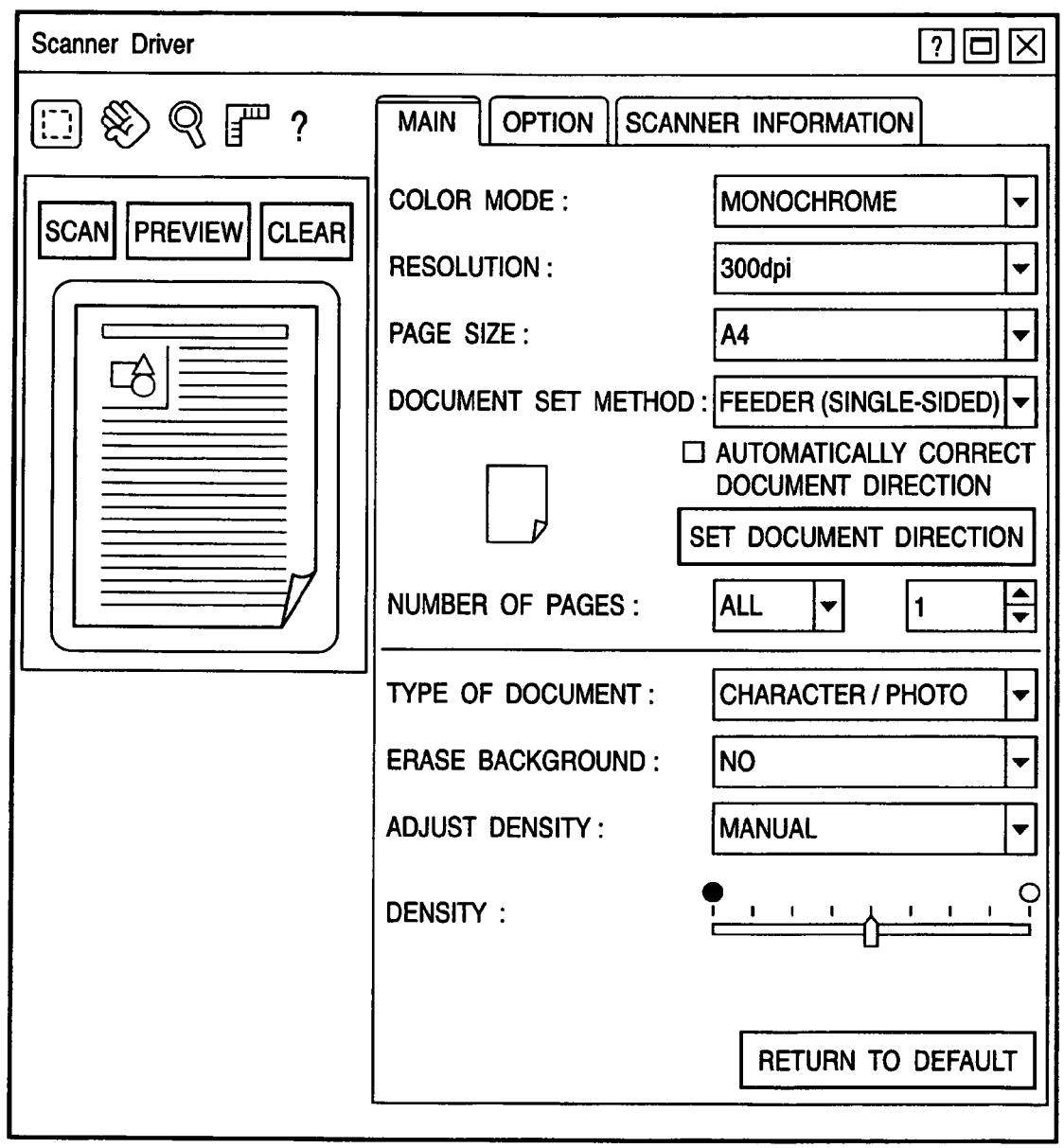
FIG. 25 is a view showing an arrangement example of a setting window related to main processing of a scanner driver.

FIG. 25 is a view showing an arrangement example of a setting window (to be referred to as a "main setting window" hereinafter) related to main processing of a scanner driver. The scanner driver is used to input a document image to a scan application that runs on the client PC 3 or prepress server 2.

When the user of the client PC 3 is to cause a scanner (not shown) or the scanner 11 of an MFP to scan a document and input the scan image to the client PC 3 or prepress server 2, the main setting window is displayed generally as a default window upon selecting the scan menu of the application or by selecting a "Main" tab.

Tool icons that indicate "Select Area", "Move Image", "Zoom", "Ruler", and "Help" are arranged on the tool bar at the upper left portion of the main setting window so that various kinds of processing in the scanner driver are executed.

A "Scan" button arranged under the tool bar is used to cause the scan device to scan a document and input the scan image to the application. A "Preview" button is used to preview the scan image before causing the scan device to scan the document. A "Clear" button is used to clear the preview image.

In a "Color Mode" pull-down list box, the color mode in scanning is switched between "Monochrome", "Grayscale", "Full Color", and "Automatic Color Select". In a "Resolution" pull-down list box, the resolution in scanning is designated in dpi.

A "Document Size" pull-down list box, the size of the document to be scanned is selected. When "Auto" is selected, the document size is automatically recognized. When "Mixed Document" is selected, documents which have different sizes and are set on the feeder can be scanned at once.

In a "Document Set Method" pull-down list box, a document set method is selected from "Document Table", "Feeder (Single Side)", and "Feeder (Double Side)". When "Feeder (Single Side)" or "Feeder (Double Side)" is selected, and the direction of the scanned document is to be automatically determined to rotate and erect the scan image in the window, an "Automatically Correct Document Direction" check box is turned on. When the "Automatically Correct Document Direction" check box is not turned on, the document direction can be designated by clicking on a "Set Document Direction" button. In this case, the direction of the document is indicated by an icon on the left side of the "Set Document Direction" button.

In a "Number Of Pages" pull-down list box, scanning of all pages or the number of pages to be scanned is designated. To designate the number of pages, the number of pages to be scanned is input to the adjacent spin box.

In a "Type Of Document" pull-down list box, the type of the document to be scanned is selected from "Character", "Photo", and "Character/Photo". In an "Erase Background" pull-down list box, whether to use a fine adjustment function of excluding the background color from the scan image is selected in scanning a yellowed document or a document with a color background such as a catalog.

In an "Adjust Density" pull-down list box, an image density adjustment method in scanning the document is selected from "Auto" and "Manual". When "Manual" is selected, the image density is adjusted by using a "Density" slider.

When a "Return To Default" button is clicked, the above-described settings by the main setting window can be returned to default.

Figure 26:
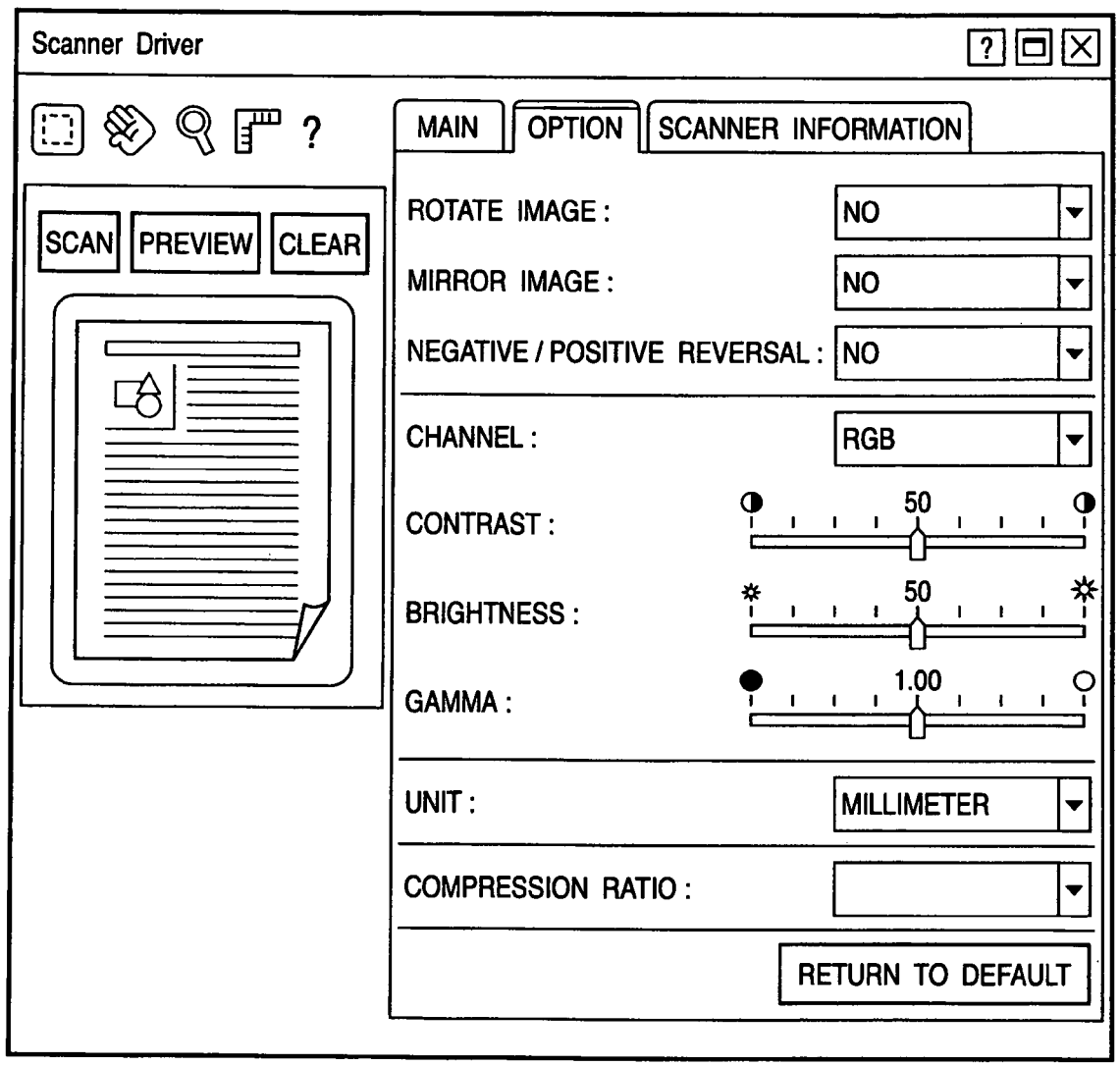
FIG. 26 is a view showing an arrangement example of a setting window related to optional processing of the scanner driver.

FIG. 26 is a view showing an arrangement example of a setting window (to be referred to as an "option setting window" hereinafter) related to optional processing of the scanner driver. This window is displayed by selecting an "Option" tab. The tool bar at the upper left portion of the window and the functions of the "Scan", "Preview", "Clear", and "Return To Default" buttons are the same as those described above, and a detailed description thereof will be omitted.

In a "Rotate Image" pull-down list box, the rotation angle of the scan image is selected from, e.g., "0", "Right 90°", "Left 90°", and "180°". When a scan image is displayed in the preview area, and the rotation angle is changed in this state, the preview image rotates in accordance with the rotation angle. When preview or scan is executed after selecting the rotation angle, a scan image rotated by the rotation angle is obtained.

In a "Mirror Image" pull-down list box, whether to invert the scan image in the horizontal direction is selected. When a scan image is displayed in the preview area, and "Yes" is selected in this state, the preview image is inverted in the horizontal direction. When preview or scan is executed after selecting "Yes", a scan image inverted in the horizontal direction is obtained.

In a "negative/positive reverse" pull-down list box, whether to negative/positive-reverse the color of the scan image is selected. When a scan image is displayed in the preview area, and "Yes" is selected in this state, the preview image is negative/positive-reversed. When preview or scan is executed after selecting "Yes", a negative/positive-reversed scan image is obtained.

In a "Channel" pull-down list box, colors to adjust the brightness, contrast, and gamma in full-color scanning are selected from "RGB", "Red", "Green", and "Blue". For the selected "RGB", "Red", "Green", or "Blue" channel, the contrast is adjusted by a "contrast" slider, the brightness is adjusted by a "brightness" slider, and the gamma is adjusted by a "gamma" slider. When a scan image is displayed in the preview area, and these settings are changed in this state, the changes are reflected on the preview image. When preview or scan is executed after adjustment, a scan image corresponding to the settings is obtained.

In a "Unit" pull-down list box, the unit of length to be used to designate the scan range is selected from "Millimeter", "Inch", and "Pixel".

In a "Compression Ratio" pull-down list box, a compression ratio to be used to JPEG-compress a color scan image on the scan device side is designated to "High Compression" "Normal", or "Low Compression". When the compression ratio is increased, the memory capacity used by the scan device can be reduced, though the image quality is poor. When the compression ratio is decreased, the memory capacity used by the scan device increases, though a high-quality scan image can be obtained.

When setting of at least the main setting window (FIG. 25) is ended, a document is set on the document table or feeder of the scan device, and the "Preview" button is clicked on, the user can preview the scan image before actual scan of the document. The user selects a scan area by using the "Select Area", "Move Image", "Zoom", and "Ruler" icons on the tool bar on the basis of the preview image. In addition, the user can change the scan conditions or adjust the scan image in the option setting window (FIG. 26).

When scan condition change or scan image adjustment is ended, the user clicks on the "Scan" button to actually scan the document and input the scan image to the application.

[Job Issue]

Figure 27:
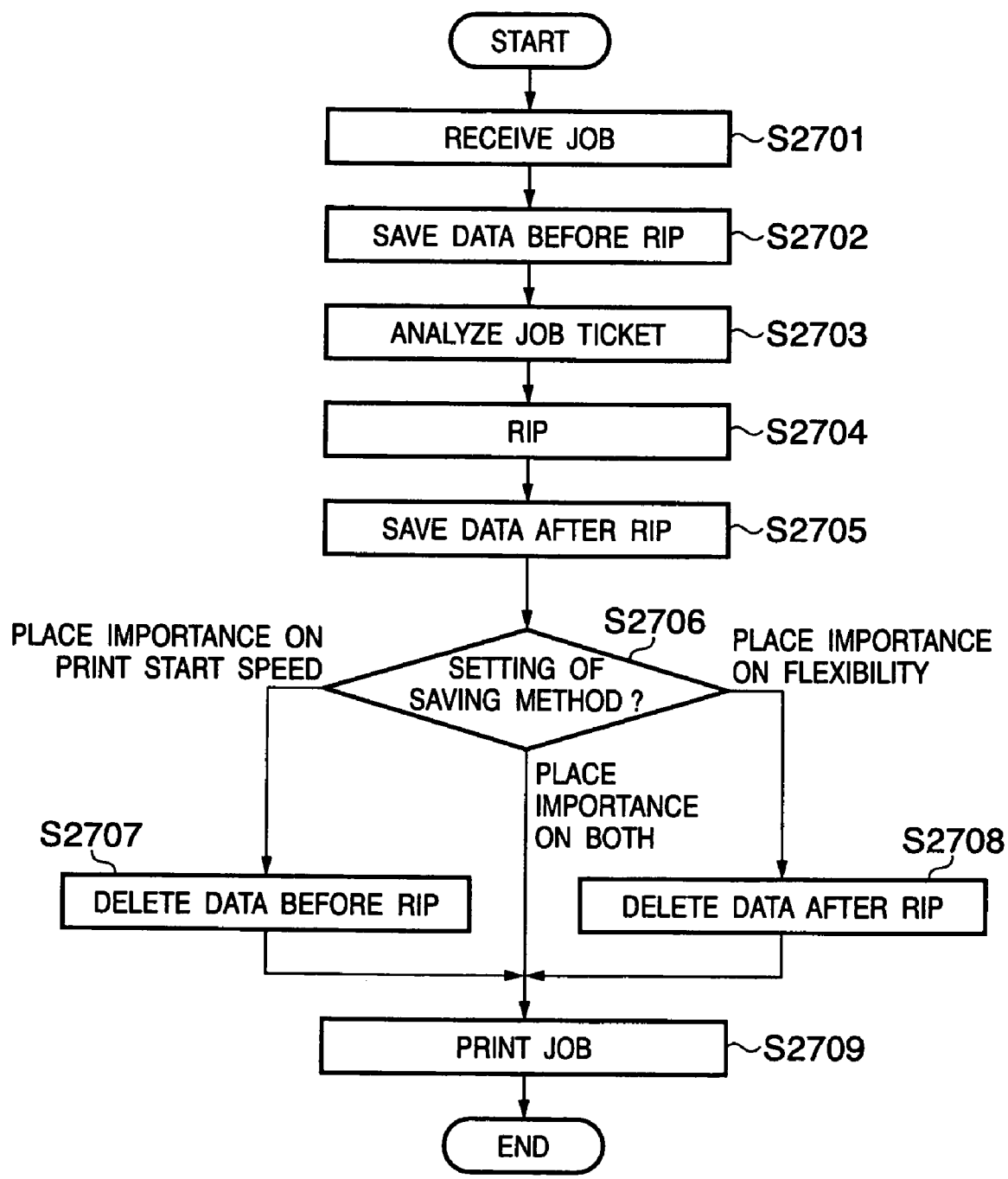
FIG. 27 is a flowchart showing an example of processing of job issue.

FIG. 27 is a flowchart showing an example of processing of job issue. This processing is executed by the MFP controller when a job is issued by a driver or submit tool that runs on the client PC 3.

The MFP controller receives a job (S2701) and saves, in the memory 16a, a set of PDL data and property information (job ticket) before RIP (S2702). In addition, the MFP controller causes the output job controller 182 to analyze the job ticket (S2703), sets property information necessary for RIP as a RIP parameter, and starts RIP processing (S2704). After the end of RIP, data after RIP is stored in the memory 16b and associated with the data before RIP, which is stored in the memory 16a (S2705).

Assume that "Save (or Wait)", "Process and Save", or "Save and Print" is selected in an "Output Method" pull-down list box 2901 of the page setting window shown in FIG. 19. In this case, a popup window 2902 shown in FIG. 28 is displayed on the client PC 3 so that a saving method can be designated.

Choices are "(1) Place Importance on Print Start Speed", "(2) Place Importance on Print Setting Flexibility", and "(3) Place Importance on Both". Instruction (1) is selected to save only data after RIP in the MFP. Since a print ready file is read out from the memory 16, only limited setting information such as the number of copies and post processing function can be changed. However, printing can be executed quickly. Instruction (2) is selected to save only data before RIP in the MFP. Although RIP must be executed again, and the output performance is poor, the setting conditions (property information) of a larger number of items can be changed in reprint. Instruction (3) is selected to save both data before RIP and data after RIP in the MFP. Depending on the change contents of setting conditions, printing can be done with satisfactory performance, and processing can cope with a flexible change of the job ticket. However, since the required memory area becomes large, other data input after that may be squeezed.

In this way, the user can select saving of data before RIP, data after RIP, or both data at the time of issuing a job.

Figure 28:
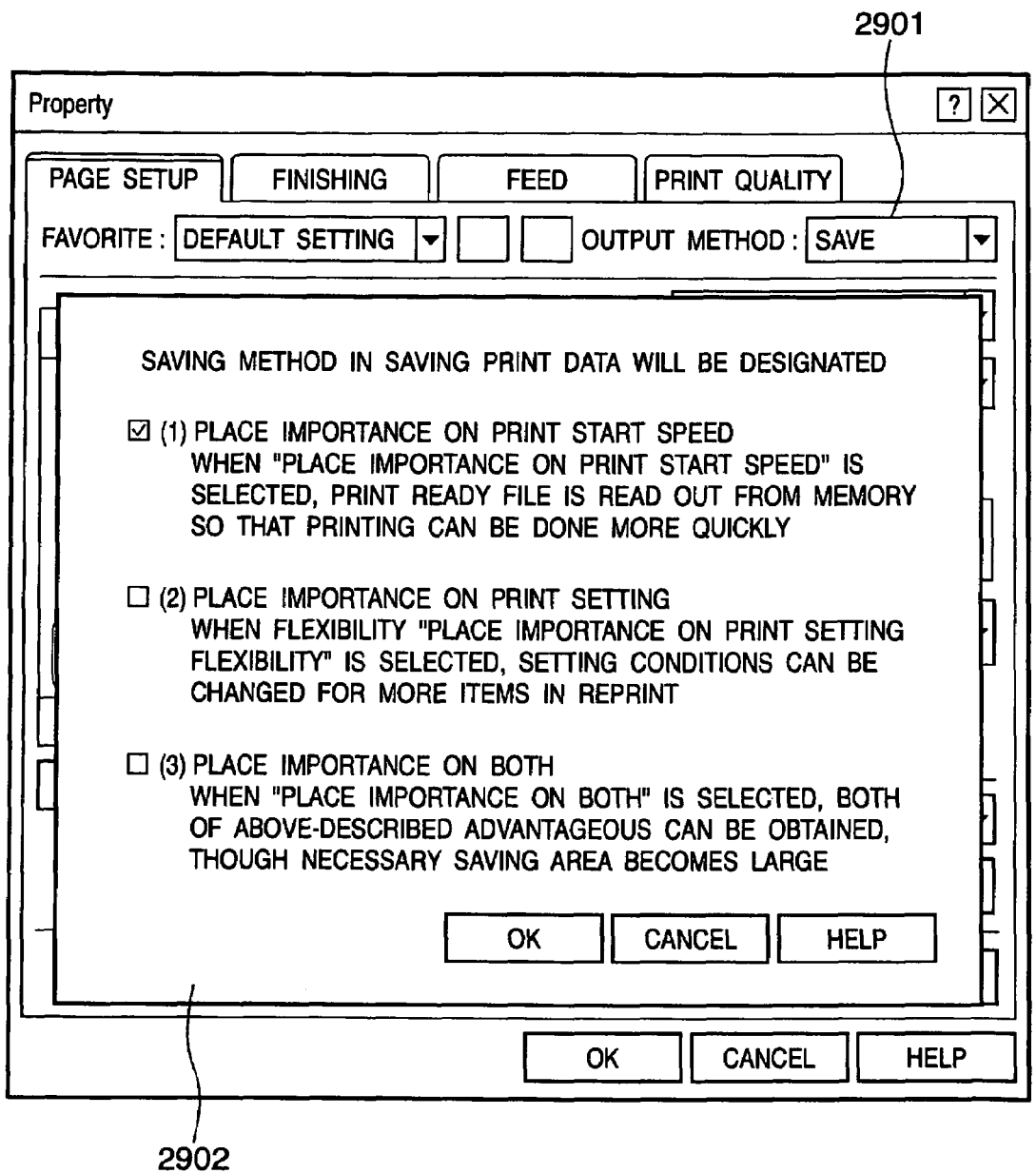
FIG. 28 is a view showing an example of a window to designate a print data saving method.

Referring back to FIG. 27, the MFP controller branches the processing on the basis of the saving method selected in the selection window shown in FIG. 28 (S2706). When "(1) Place Importance on Print Start Speed" is selected, data before RIP, which is stored in the memory 16a, is deleted (S2707). When "(2) Place Importance on Print Setting Flexibility" is selected, data after RIP, which is stored in the memory 16b, is deleted (S2708). When "(3) Place Importance on Both" is selected, data is not deleted. The job is printed as needed (S2709), and the job processing is temporarily ended. The saving method selected in the selection window shown in FIG. 28 is stored in a predetermined area of the memory 16 in association with the job stored in the memory 16.

Figure 29:
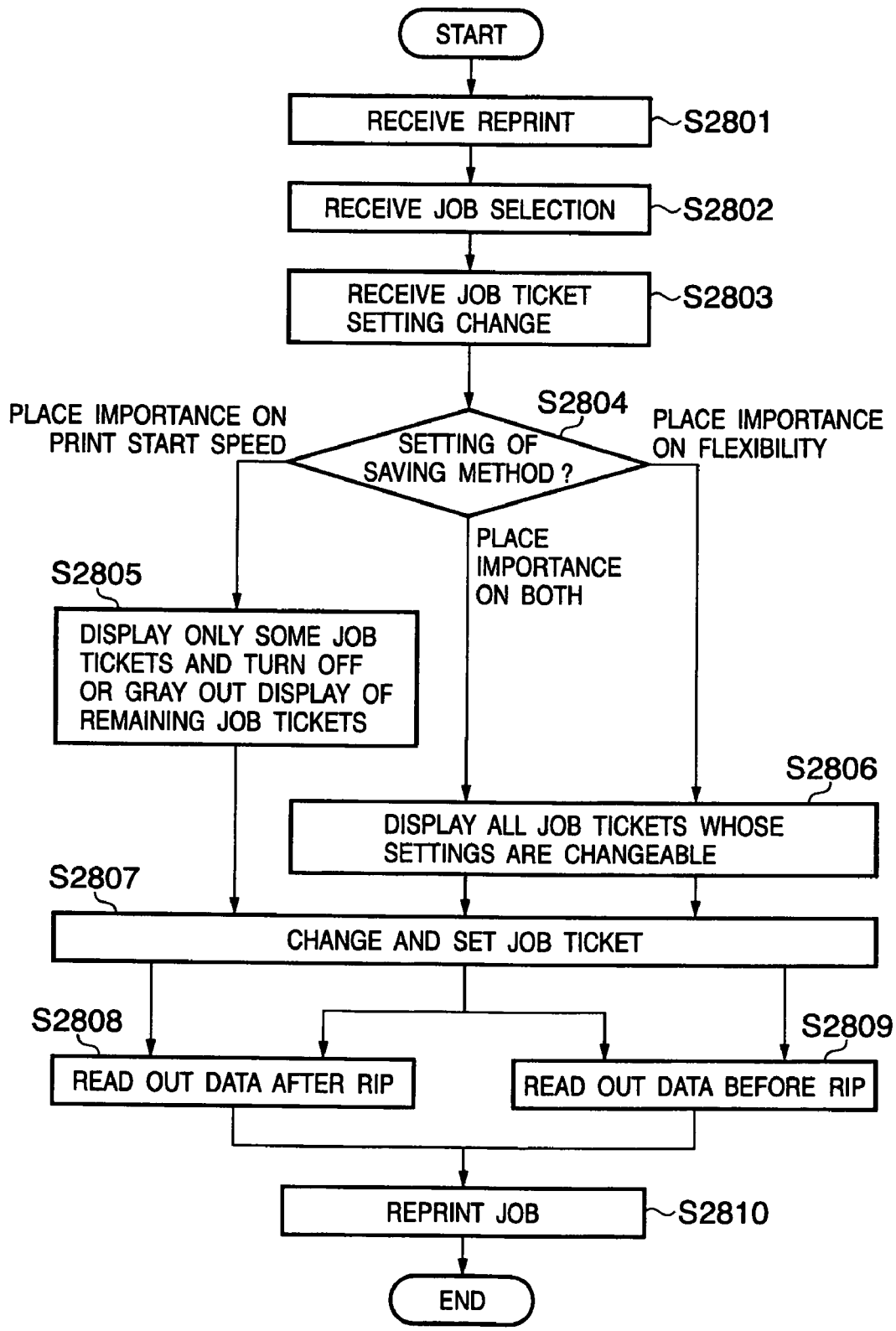
FIG. 29 is a flowchart showing an example of processing of reprinting a job saved in a memory.

FIG. 29 is a flowchart showing an example of processing of reprinting the job saved in the memory 16. This processing is executed by the MFP controller when reprint is instructed.

The MFP controller receives the reprint instruction (S2801). The reprint instruction is executed as, e.g., box print which invokes and prints a job stored in a box.

Figure 30:
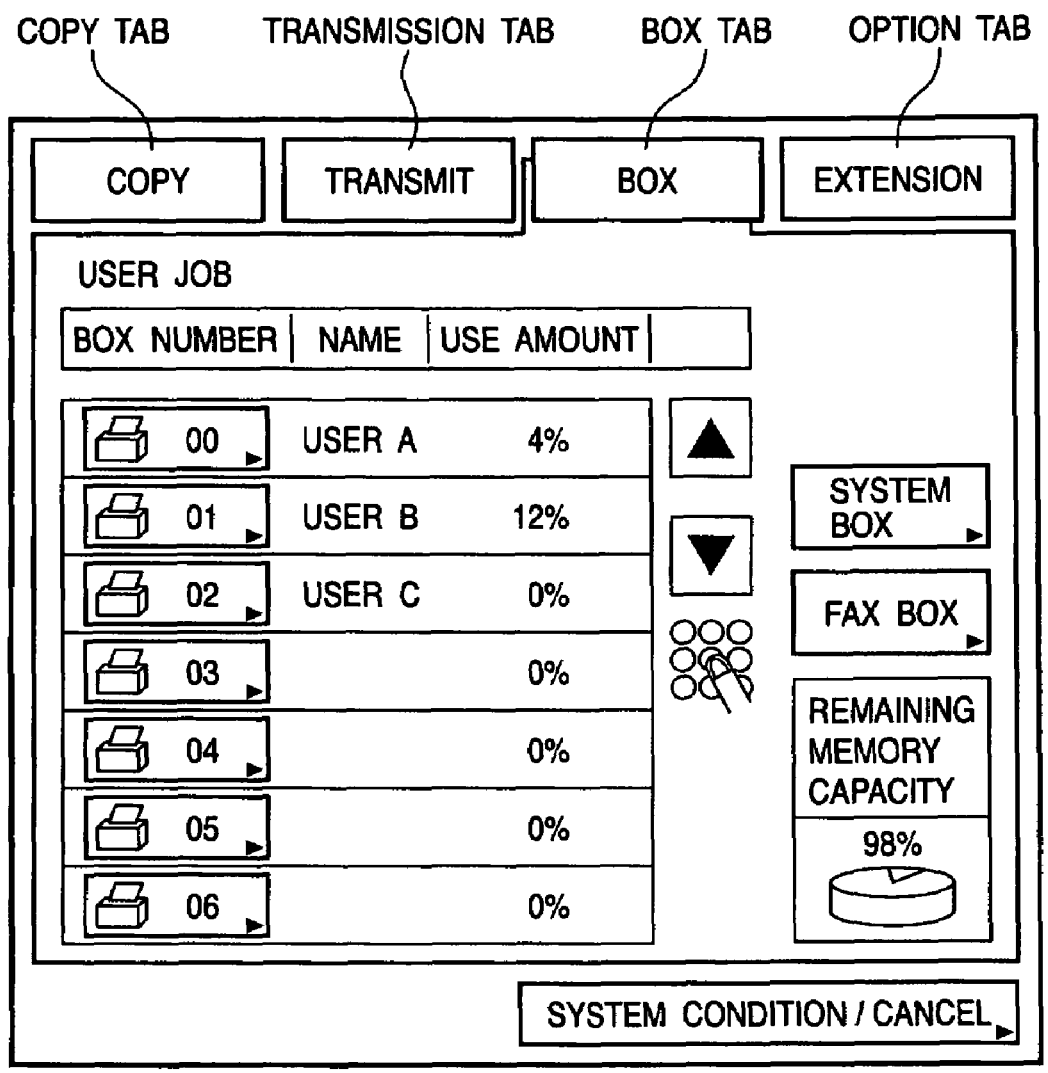
FIG. 30 is a view showing an example of a window to activate box print.

FIG. 30 is a view showing an example of a window to activate box print. This window is displayed by clicking the box tab of the operation window shown in FIG. 12. For example, a user B issues a job to the MFP and prints the job. At the same time, the job is stored in box 01 (the box of the user B) shown in FIG. 30. When box 01 is selected later, a user box window shown in FIG. 31 is displayed. The user B selects, e.g., a document Q.

An example wherein the document Q is PDL data will be described below.

Figure 32:
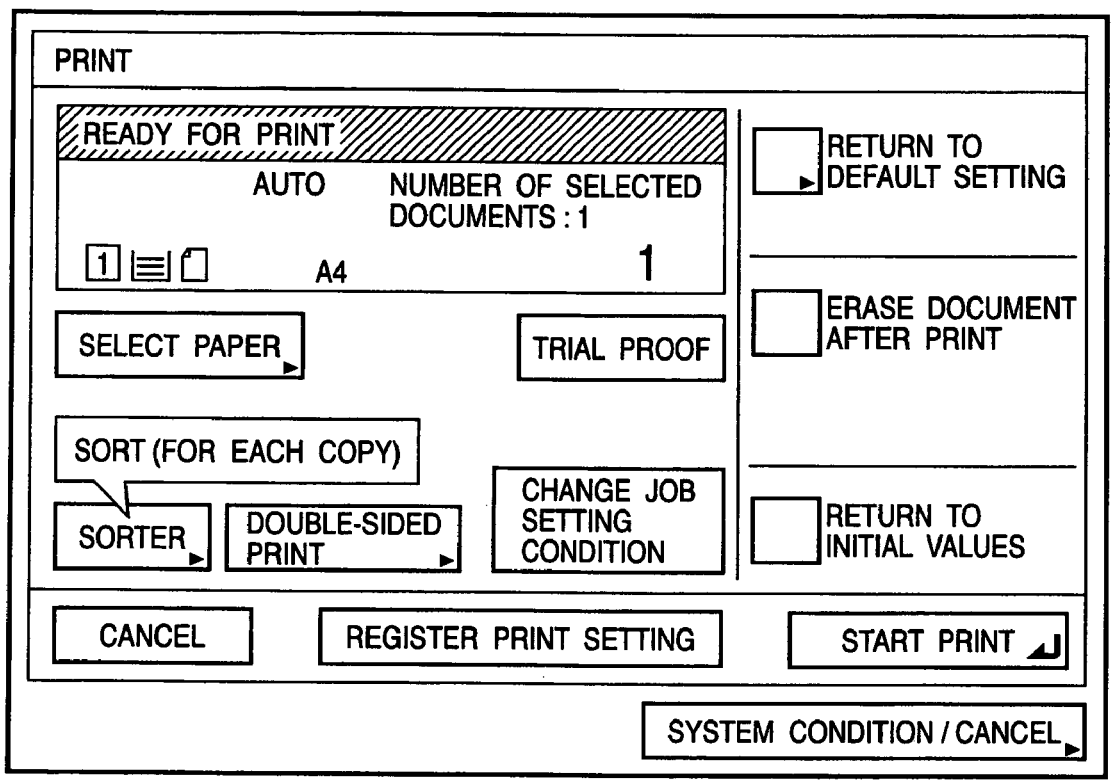
FIG. 32 is a view showing a display example of a print window.

The MFP controller receives document selection (job selection) through the user box window (S2802) and displays a print window shown in FIG. 32 on the operating unit 14. When the user B presses a "Change Job Setting Conditions" button, the MFP controller receives the job ticket setting change (S2803) and displays a setting change window shown in FIG. 33 or 34. The user B can change the contents of the job ticket by using the job ticket setting change window.

Job setting information also includes functions such as "Select Paper", "Sorter", "Double-Sided Printing", and "Trial Proof" shown in FIG. 32. Other pieces of setting information are put into groups and displayed in setting change windows shown in FIGS. 33 and 34 so that setting (job ticket) of one job can be changed. The setting change windows shown in FIGS. 33 and 34 can alternately be displayed by "Δ" and "∇" buttons at the lower left portion. When a "Close" button is pressed, the setting change window is closed, and the print window shown in FIG. 32 is displayed.

Figure 33:
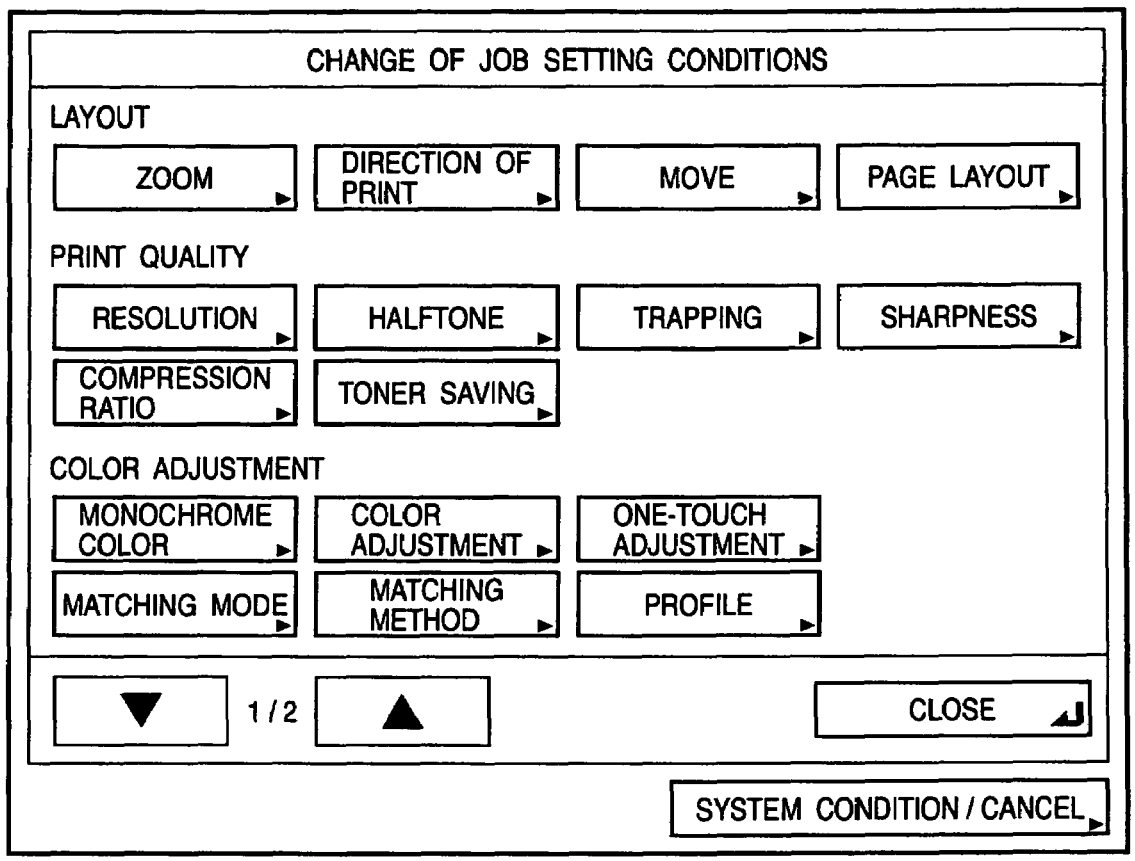
FIG. 33 is a view showing a display example of a setting change window.
Figure 34:
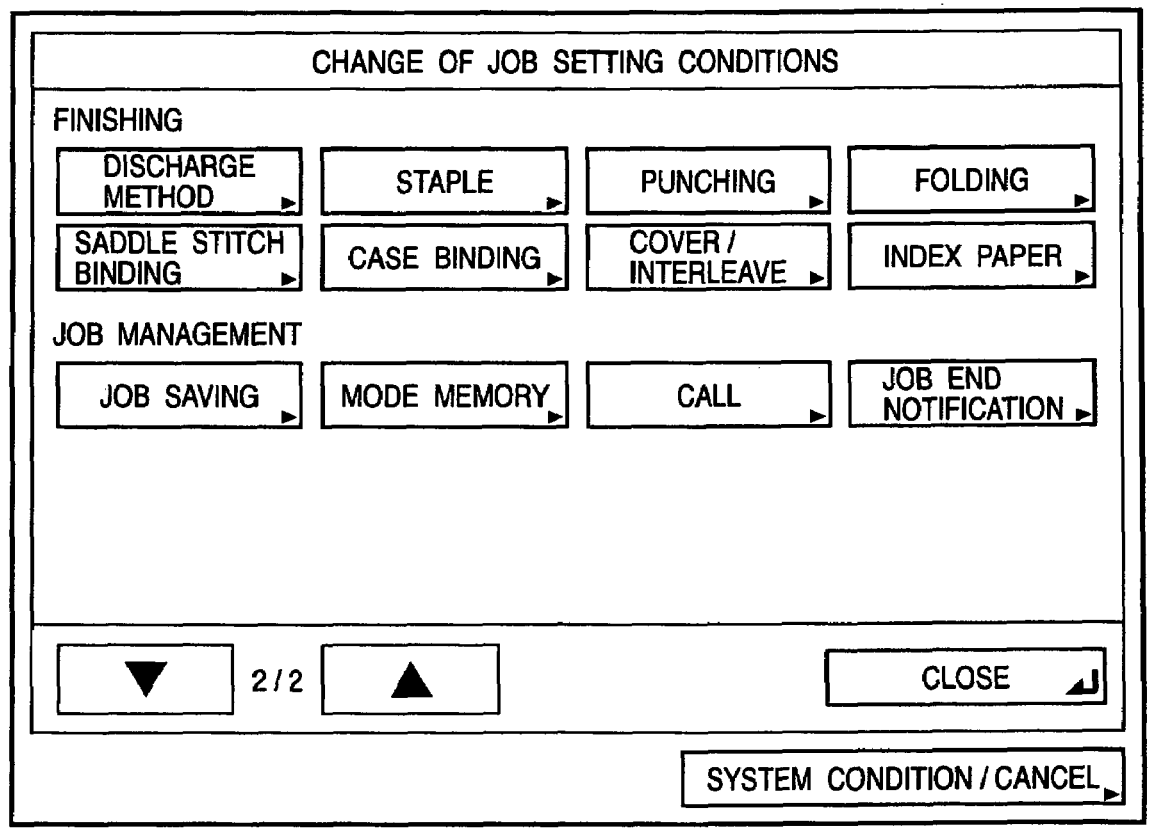
FIG. 34 is a view showing a display example of the setting change window.

Display of the job ticket setting change window shown in FIG. 33 changes in accordance with the storage method in the memory 16 depending on the saving method selected from "(1) Place Importance on Print Start Speed", "(2) Place Importance on Print Setting Flexibility", and "(3) Place Importance on Both" in FIG. 28. The reason is as follows. The job storage location is determined to the memory 16a or 16b depending on the selected saving method. When (1) is selected, only a job B (FIG. 2) is present. When (2) is selected, only a job A (FIG. 2) is present. When (3) is selected, both the jobs A and B are present.

The MFP controller selects an optimum one of the jobs A and B associated with each other in advance and reprints the job. At this time, the job ticket to be used by the image processing/RIP unit 17 shown in FIG. 2 can be changed or re-set for the job A. However, the job ticket of the job B can be neither changed nor re-set.

Figure 35:
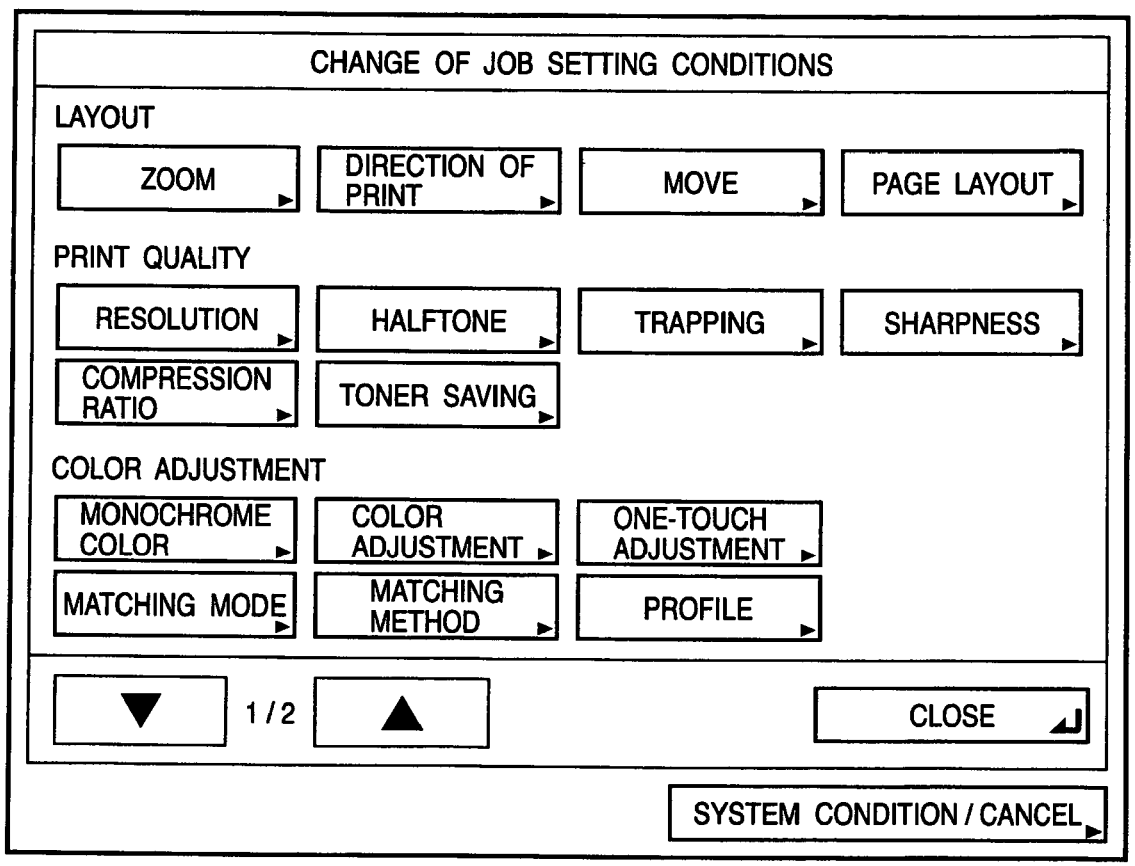
FIG. 35 is a view showing a display example of the setting change window.
Figure 36:
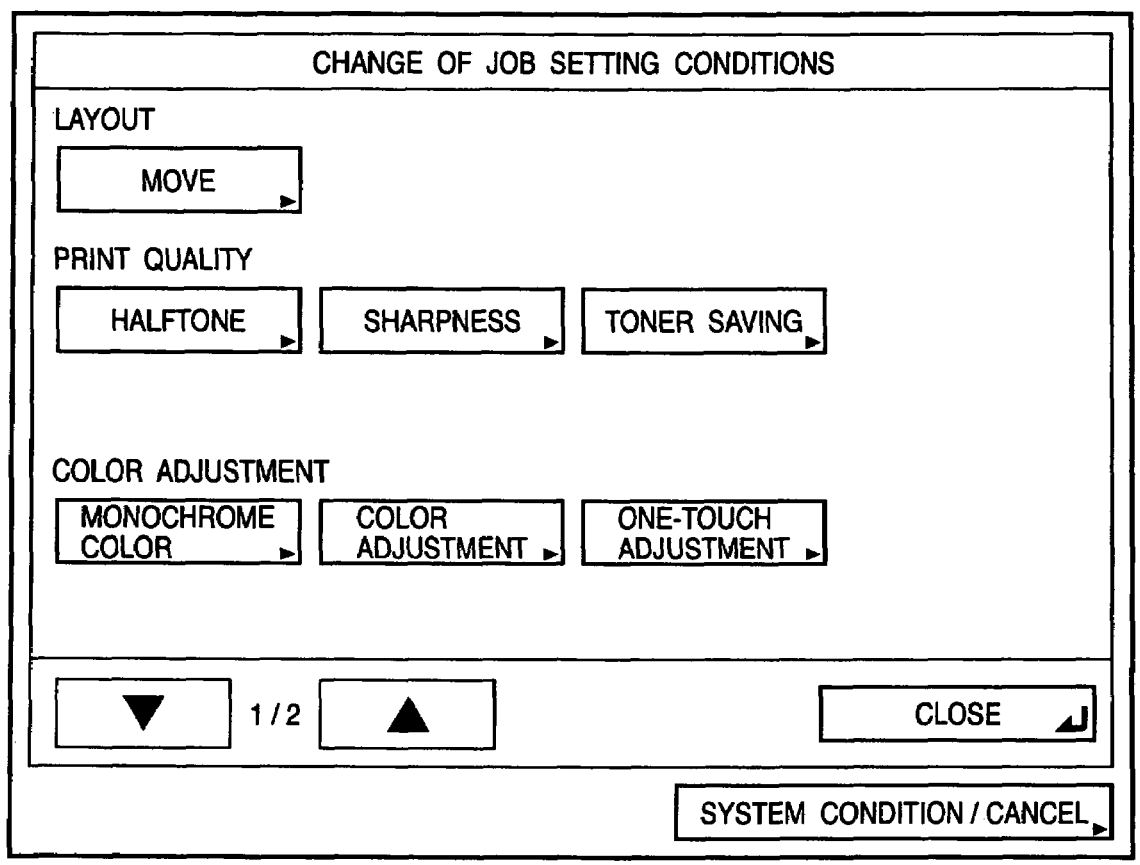
FIG. 36 is a view showing a display example of the setting change window.

That is, of processes displayed in the job ticket setting change window shown in FIG. 33, processing of the image processing/RIP unit 17 cannot be executed for a job saved in accordance with "(1) Place Importance on Print Start Speed". Processing of the image processing/RIP unit 17 includes "Zoom", "Print Direction", and "Page Layout" of the layout, "Resolution", "Trapping", and "Compression Ratio" of the print quality, and "Matching Mode", "Matching Method", and "Profile" of color adjustment. When these processes are displayed in the setting change window, the user may be confused. Hence, the MFP controller reads out, from a predetermined area of the memory 16, the saving method setting in storing the job in the memory 16 and discriminates the saving method (S2804). If (1) is selected, display of the buttons of the above-described processes is grayed out to notify the user that the processes cannot be selected, as shown in FIG. 35. Alternatively, display of the buttons is turned off, as shown in FIG. 36 (S2805). That is, the user is indirectly notified that only the data after RIP is saved.

If "(2) Place Importance on Print Setting Flexibility" or "(3) Place Importance on Both" is selected, the MFP controller displays all buttons to indicate that settings corresponding to all job tickets can be changed (S2806), as shown in FIG. 33. That is, the user is indirectly notified that the data before RIP is also saved.

The MFP controller receives job ticket setting change (S2807). The job ticket setting change window is closed. When a "Start Print" button of the print window shown in FIG. 32 is pressed, the job A or B is read out from the memory 16 (S2808 or S2809) and reprinted (S2810). At this time, if the job B is present in the memory 16b, it is preferentially read out. However, if the job B cannot be used due to a job ticket setting change, or only the job A is present, the job A is read out from the memory 16a.

As described above, the user can select the saving method of data before and after RIP at the time job issue. At the time of reprint, the user can know the enable/disable state of job ticket setting change and which one of the data before and after RIP is saved.

Second Embodiment

Image processing according to the second embodiment of the present invention will be described below. The same reference numerals as in the first embodiment denote essentially the same components in the second embodiment, and a detailed description thereof will be omitted.

In the first embodiment, a job of PDL data received from the network 1 is re-printed. In the second embodiment, an example wherein a job of a scan image is reprinted will be described.

Figure 37:
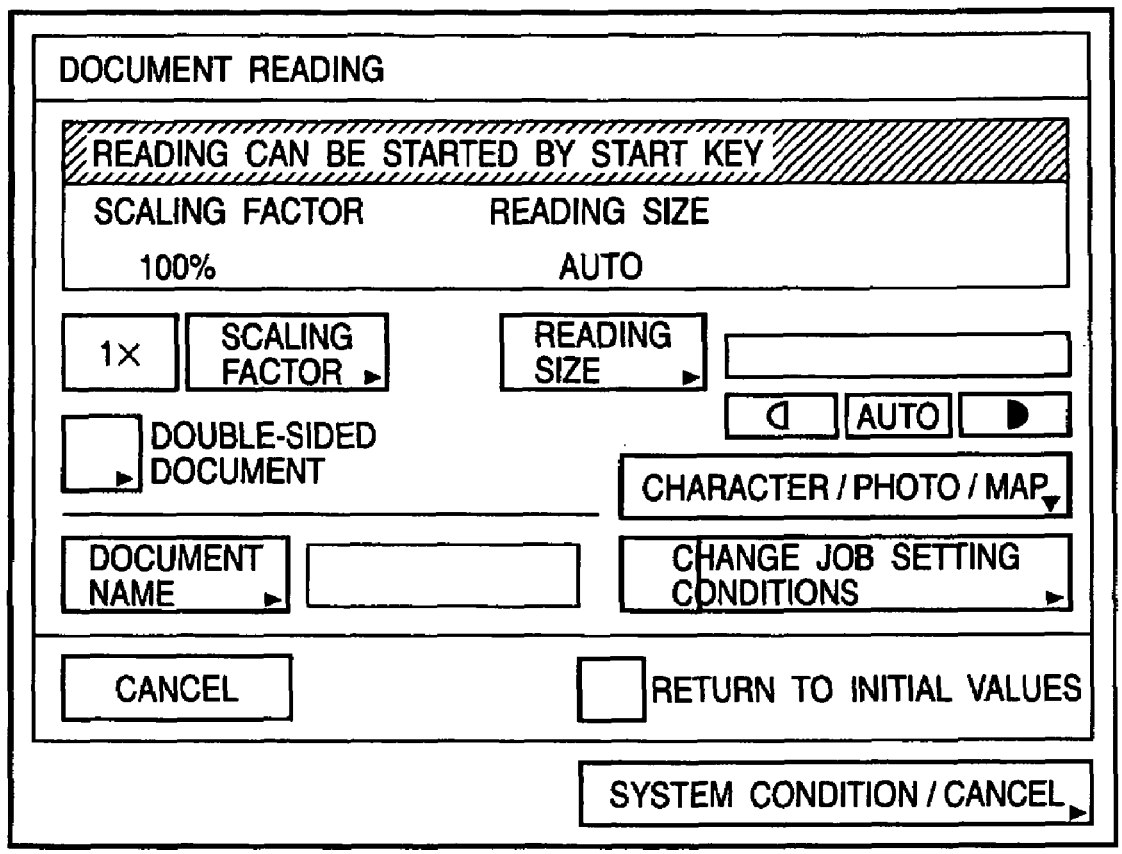
FIG. 37 is a view showing an example of a box scan setting window.
Figure 39:
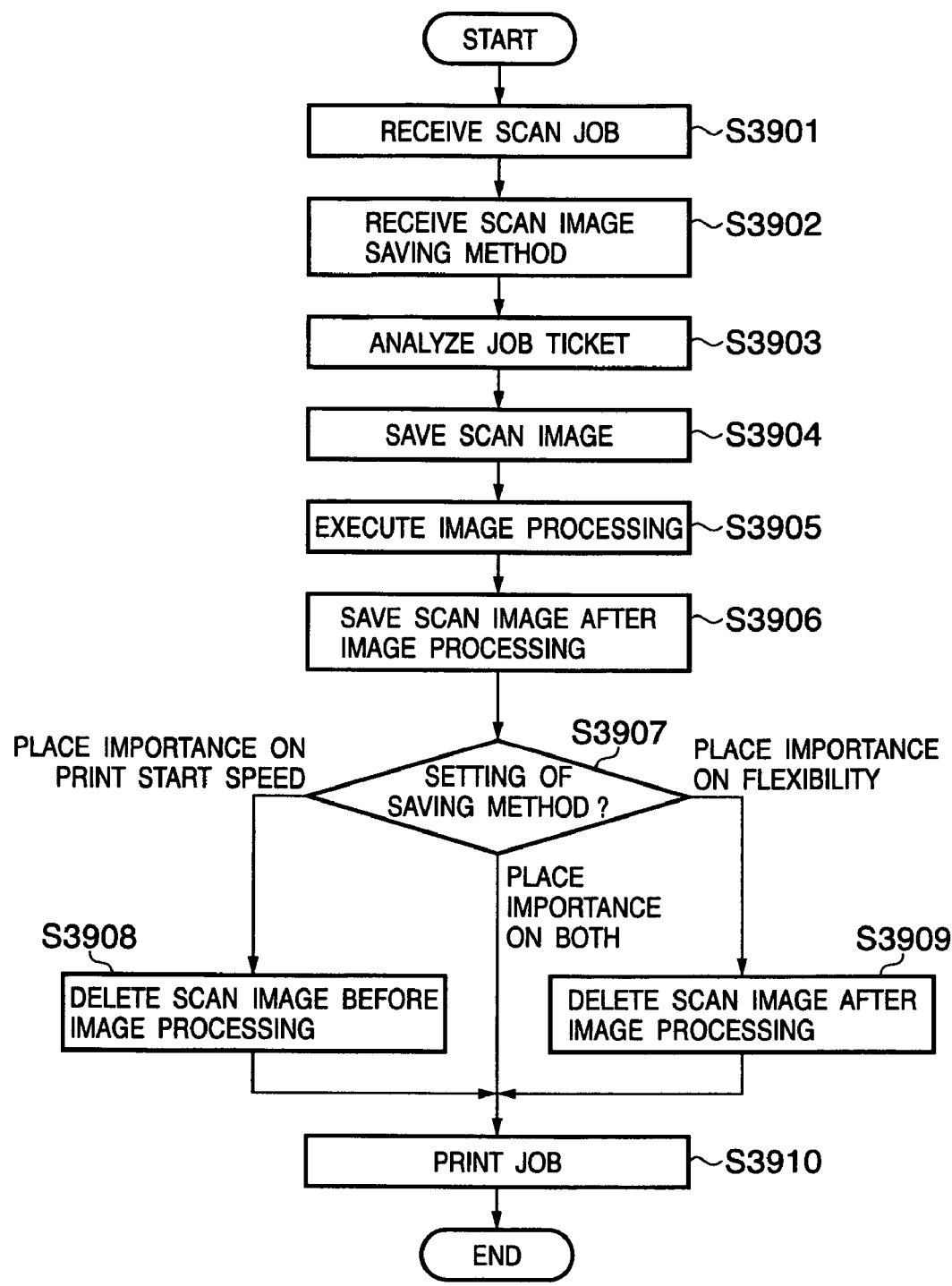
FIG. 39 is a flowchart showing an example of box scan processing.

FIG. 37 is a view showing an example of a box scan setting window. This window is displayed by pressing a "Read Document" button in the user box window shown in FIG. 31. FIG. 39 is a flowchart showing an example of box scan processing. This processing is executed by an MFP controller.

The user sets; e.g., the scaling factor and reading size in scanning and the double-sided document or single-sided document, inputs a document name as needed, and presses a start key shown in FIG. 11. If no document name is input, the MFP controller determines the document name.

The MFP controller receives a scan job (S3901), displays the selection window shown in FIG. 38, and receives a scan image saving method (S3902). Choices are "(1) Place Importance on Print Start Speed", "(2) Place Importance on Print Setting Flexibility", and "(3) Place Importance on Both", as in the first embodiment. The selected saving method is stored in a predetermined area of a memory 16 in association with the scan job.

When the saving method is selected, the MFP controller analyzes the job ticket (S3903). After that, the MFP controller starts continuously reading documents set on the ADF or sequentially reading documents set on the glass document table and stores the scan image in a memory 16a (S3904). In accordance with the settings of the job ticket, processing of an image processing/RIP unit 17 (time-consuming software processing such as tilt correction and isolated point removal (dust removal) of an image) is executed (S3905). The processed scan image is stored in a memory 16b (S3906).

The MFP controller discriminates the selected saving method (S3907). When "(1) Place Importance on Print Start Speed" is selected, the scan image before image processing, which is stored in the memory 16a, is deleted (S3908). When "(2) Place Importance on Print Setting Flexibility" is selected, the scan image after image processing, which is stored in the memory 16b, is deleted (S3909). When "(3) Place Importance on Both" is selected, the scan image is not deleted.

The MFP controller prints the scan image in accordance with the job ticket settings (S3910). The processing in steps S3904 to S3910 is repeated a number of times equal to the number of documents, as a matter of course.

Processing of reprinting a scan image obtained by box scan will be described next.

Figure 40:
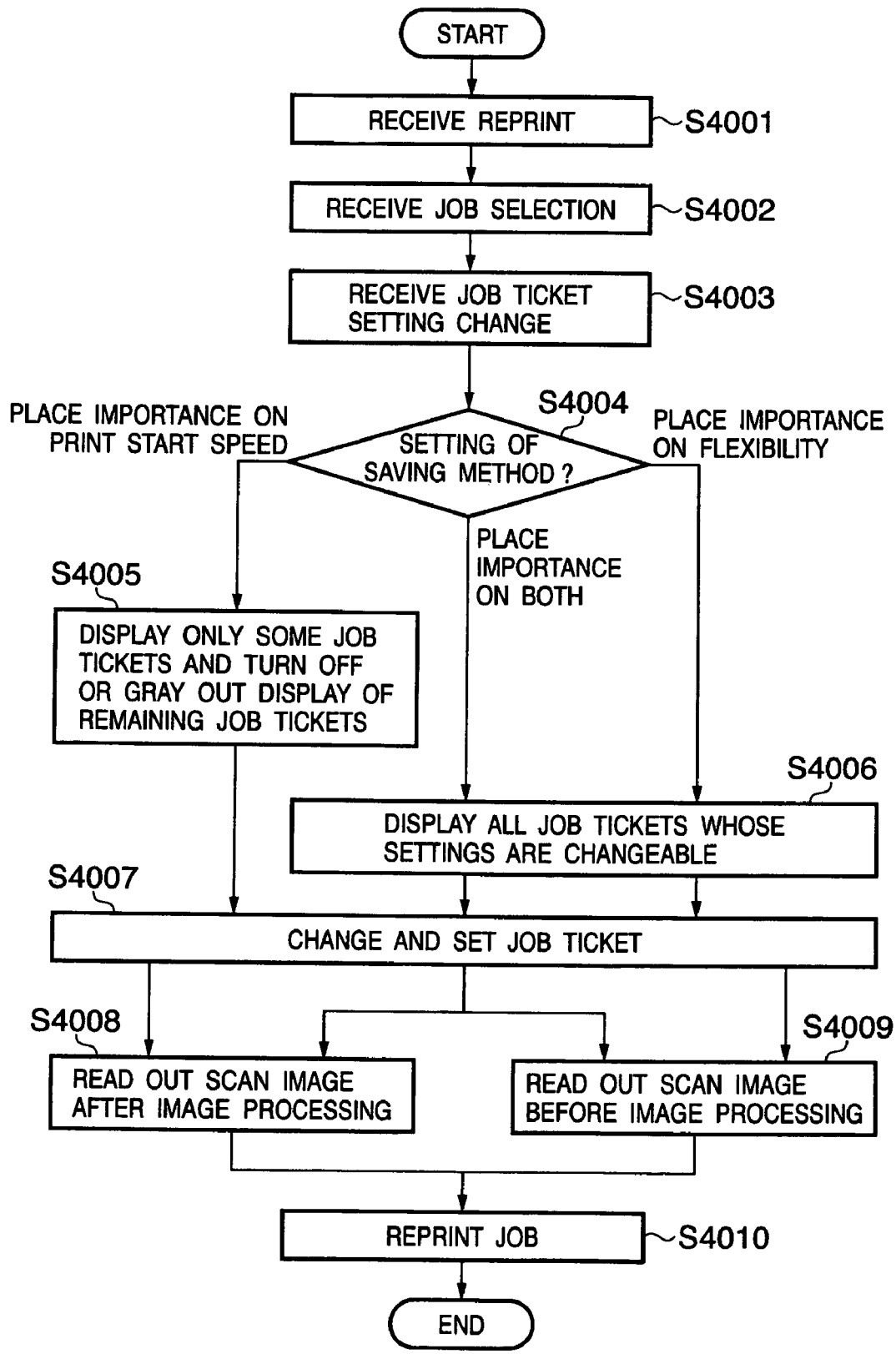
FIG. 40 is a flowchart showing an example of processing of reprinting the job of a scan image saved in a memory.

FIG. 40 is a flowchart showing an example of processing of reprinting the job of the scan image saved in the memory 16. This processing is executed by the MFP controller when reprint is instructed.

Figure 41:
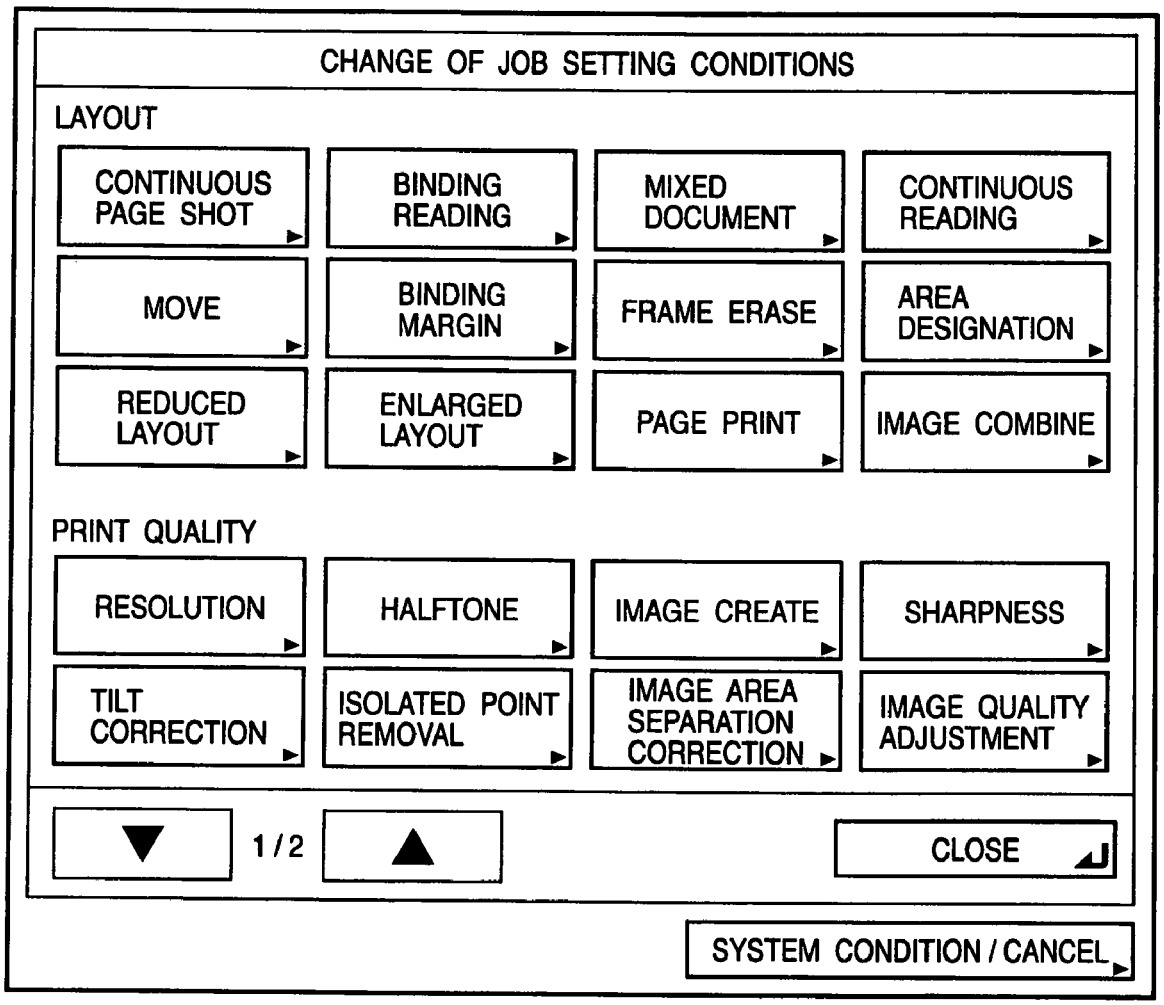
FIG. 41 is a view showing a display example of a job ticket setting change window.
Figure 42:
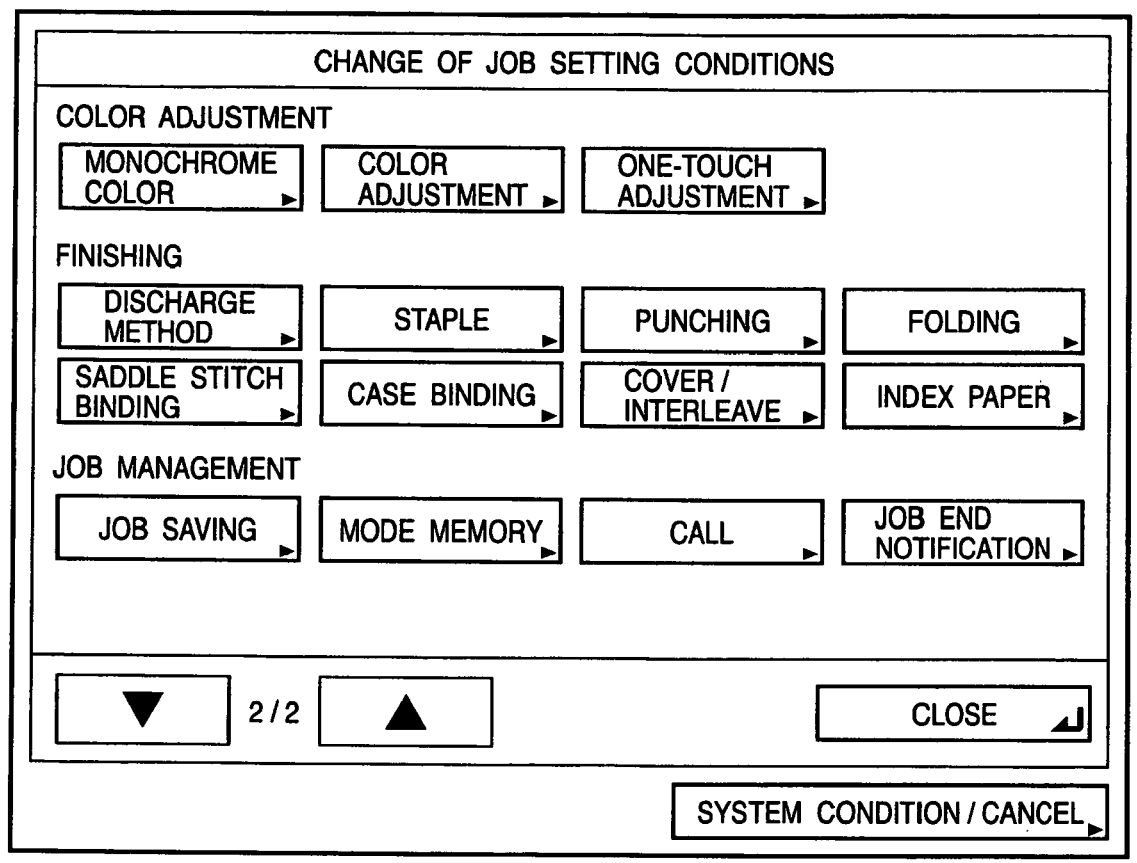
FIG. 42 is a view showing a display example of the job ticket setting change window.

Assume that the user selects, e.g., a document R of a scan image and presses a "Print" button in the user box window shown in FIG. 31. In response to this, the MFP controller receives reprint and document selection instructions and displays a print window shown in FIG. 32 on an operating unit 14 (S4001 and S4002). When a user B presses a "Change Job Setting Conditions" button, the MFP controller receives the job ticket setting change (S4003) and displays a job ticket setting change window shown in FIG. 41 or 42. The user B can change the contents of the job ticket by using the job ticket setting change window. The setting change windows shown in FIGS. 41 and 42 can alternately be displayed by "Δ" and "∇" buttons at the lower left portion. When a "Close" button is pressed, the setting change window is closed, and the print window shown in FIG. 32 is displayed.

Figure 43:
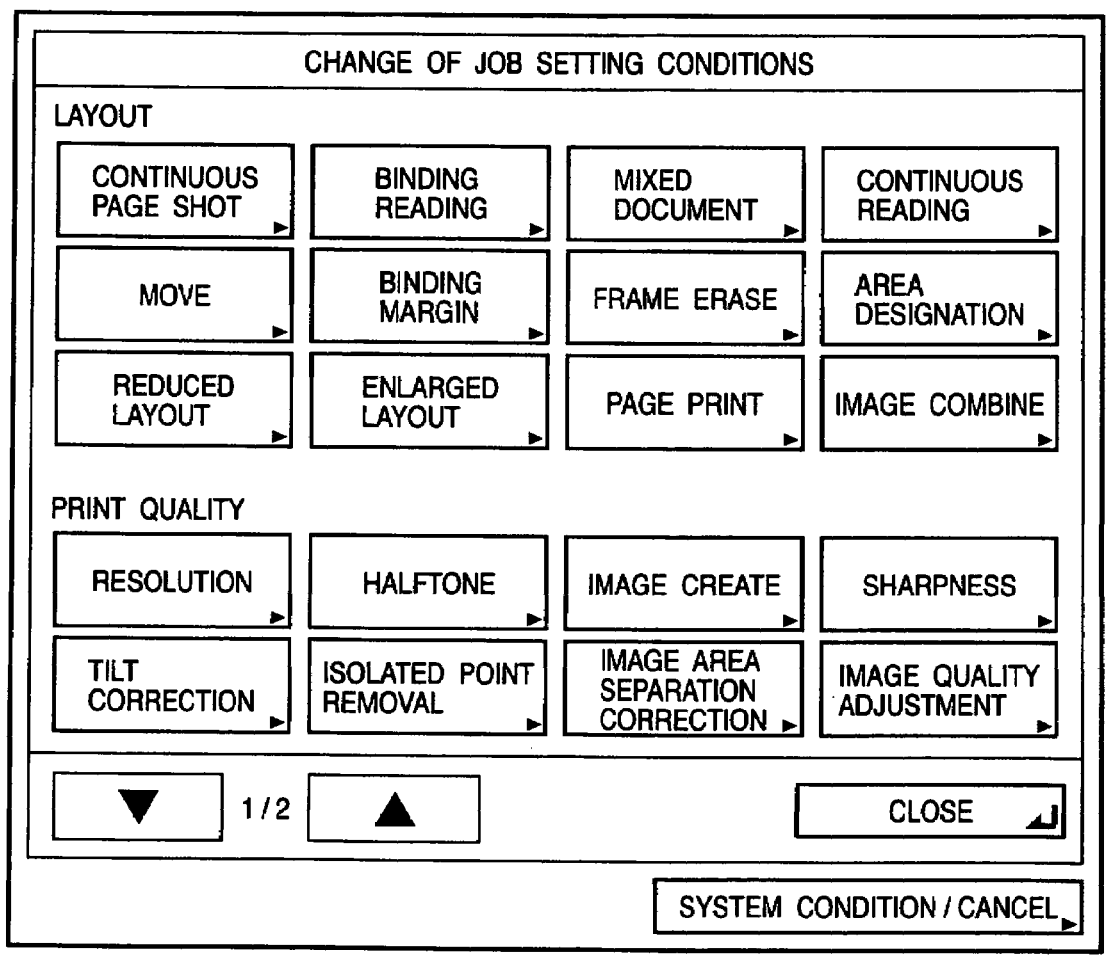
FIG. 43 is a view showing a display example of the job ticket setting change window.

The MFP controller reads out, from a predetermined area of the memory 16, the saving method setting in storing the job in the memory 16 and discriminates the saving method (S4004). If (1) is selected, the setting change window shown in FIG. 43 is displayed (S4005). If "(2) Place Importance on Print Setting Flexibility" or "(3) Place Importance on Both" is selected, the setting change window shown in FIG. 44 is displayed (S4006).

Figure 44:
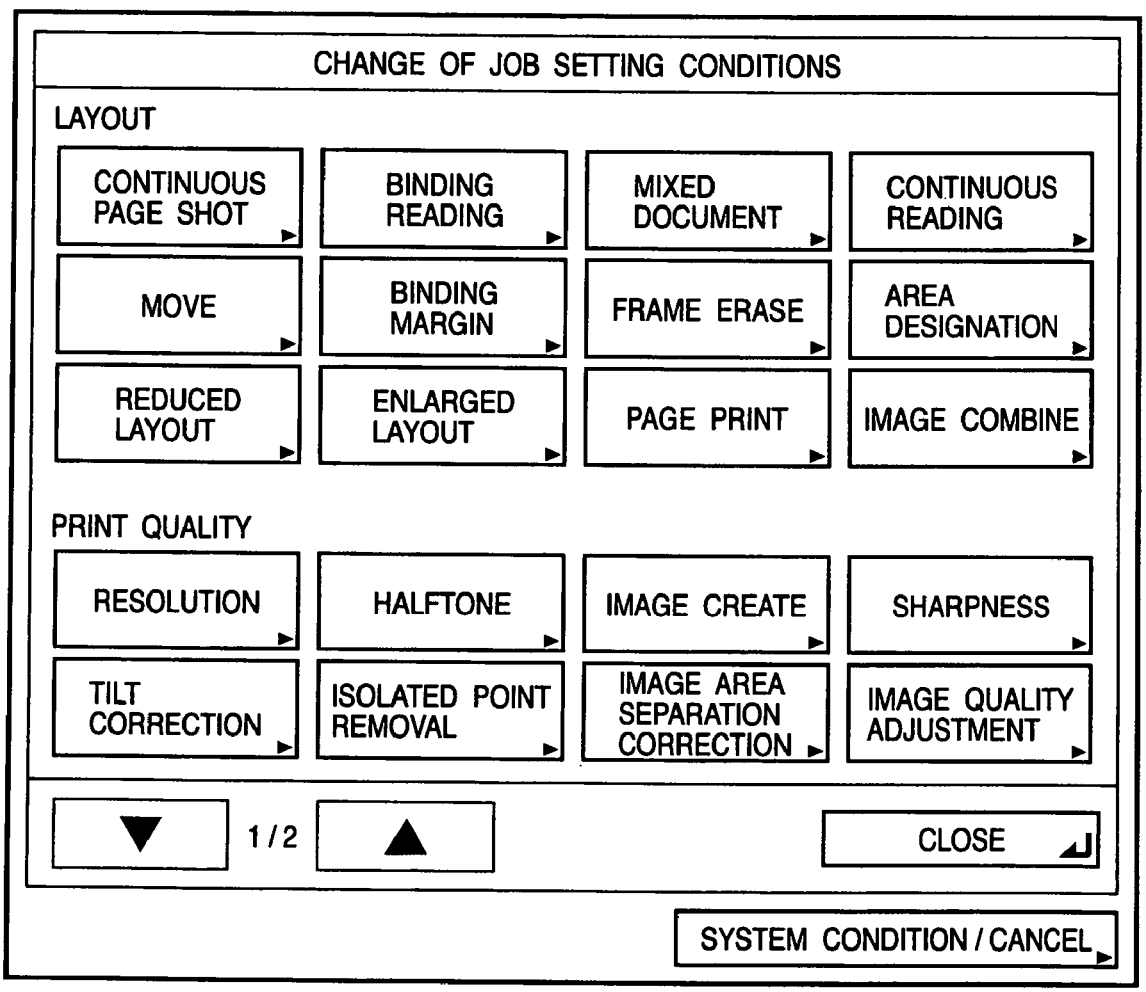
FIG. 44 is a view showing a display example of the job ticket setting change window.

Image processing corresponding to each button grayed out in the setting change window shown in FIG. 44 is, e.g., setting for the document in executing scan and can be implemented only when scan is executed again. Image processing corresponding to each button which is grayed out in FIG. 43 but not in FIG. 44 corresponds to the processing of the image processing/RIP unit 17 shown in FIG. 2. This image processing cannot be executed for the processed scan image saved in the memory 16b. Examples of image processing of the image processing/RIP unit 17 are tilt correction shown in FIG. 45 and isolated point removal shown in FIG. 46.

Figure 45:
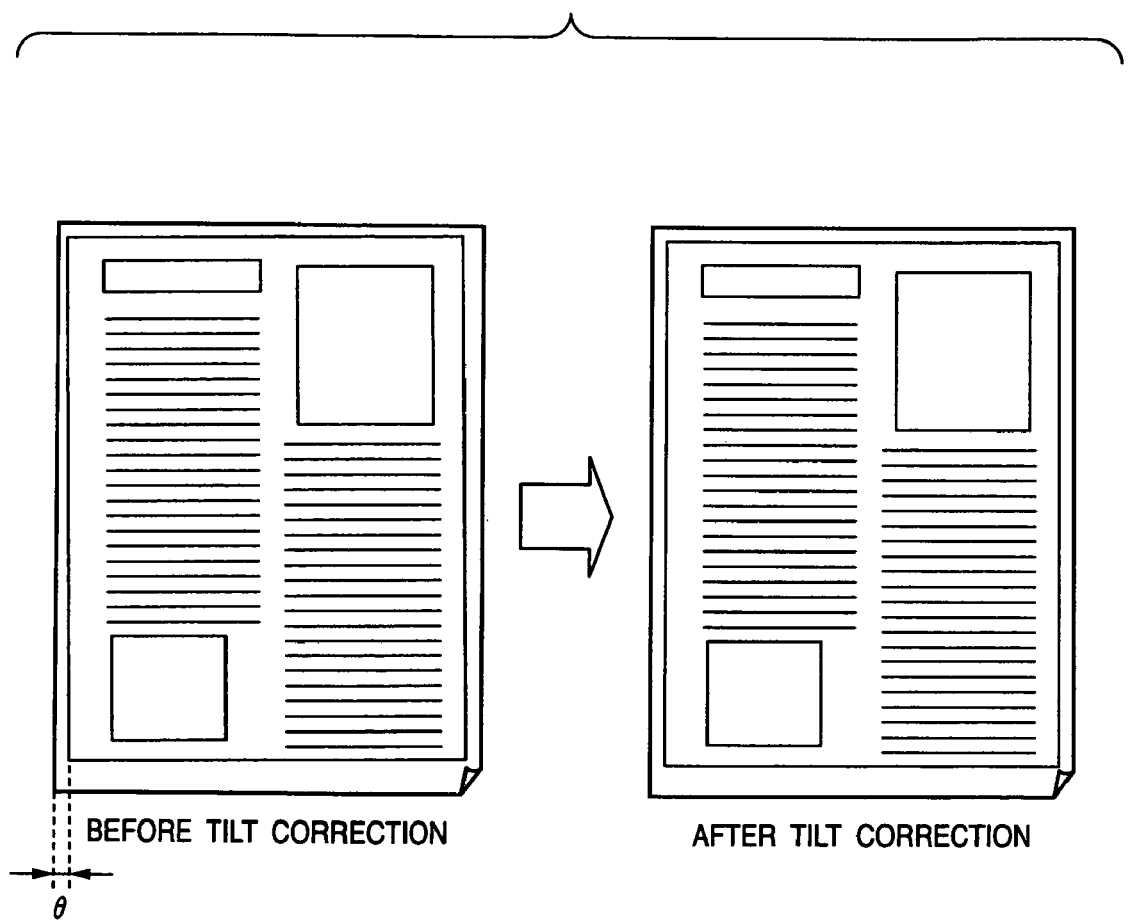
FIG. 45 is a view for explaining tilt correction.

A scan image before tilt correction, which is shown on the left side of FIG. 45, has a tilt of an angle θ with respect to the sheet. To correct this tilt, a job A (scan image before image processing) saved in the memory 16a is read out. Affine transformation represented by $$\begin{bmatrix} X' \\ Y' \end{bmatrix} = \begin{bmatrix} a1 & b1 \\ a2 & b2 \end{bmatrix} \begin{bmatrix} X \\ Y \end{bmatrix} + \begin{bmatrix} d1 \\ d2 \end{bmatrix} \quad (1)$$

is executed, and a scan image whose tilt is corrected, which is shown on the right side of FIG. 45, must be stored in the memory 16b.

A scan image before isolated point removal is shown on the left side of FIG. 46. When shadows of punch holes remain, the quality of the scan image is poor, or a document which is repeatedly copied is scanned, the image needs to undergo so-called dust removal because of a number of unnecessary isolated points as indicated by the enlarged portion of "ABC". Even in this case, the job A saved in the memory 16a is read out, and isolated point candidates are found. A scan image from which the isolated points are removed must be stored in the memory 16b. In a POD market, in deleting isolated point candidates, a user interface which causes the operator to determine whether each isolated point is dust and delete it without full automatic processing is preferably used.

Third Embodiment

Image processing according to the third embodiment of the present invention will be described below. The same reference numerals as in the first and second embodiments denote essentially the same components in the third embodiment, and a detailed description thereof will be omitted.

In the first and second embodiments, "(1) Place Importance on Print Start Speed", "(2) Place Importance on Print Setting Flexibility", or "(3) Place Importance on Both" is selected for each job as a job saving method. However, considering a case to repeatedly use the same saving method, the operability can be improved by selecting one of the saving methods in advance as default setting.

Figure 47:
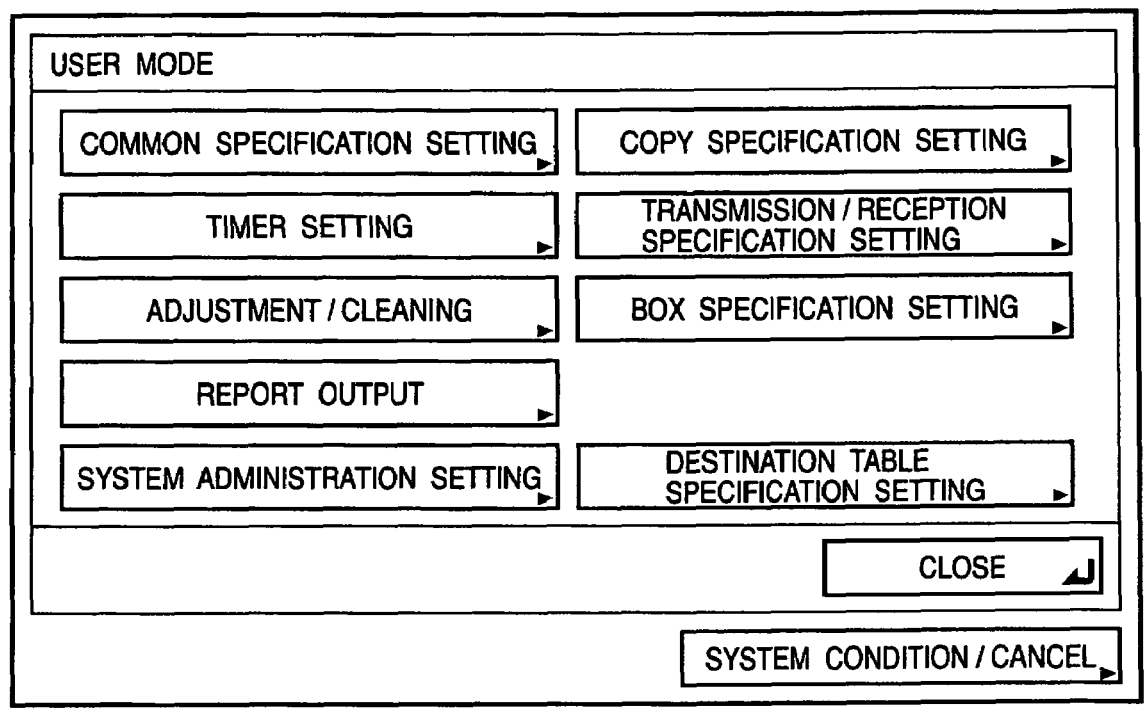
FIG. 47 is a view showing a display example of a user mode window.

When a user mode key shown in FIG. 11 is pressed, an MFP controller displays a user mode window shown in FIG. 47 on an operating unit 14. The user can set same setting conditions for all jobs in advance by the user mode window. When a "Set Common Specifications" button is pressed, the MFP controller displays a common specification setting window shown in FIG. 48 on the operating unit 14. When a "Designate Print Data Saving Form" button is pressed, the MFP controller displays a saving method selection window shown in FIG. 49 on the operating unit 14. The user can set a default saving method for all jobs in advance by the saving method selection window.

Fourth Embodiment

Image processing according to the fourth embodiment of the present invention will be described below. The same reference numerals as in the first to third embodiments denote essentially the same components in the fourth embodiment, and a detailed description thereof will be omitted.

[Job Ticket Table of PDL Job]

FIGS. 50 and 51 are views showing tables representing whether setting items are valid or invalid for data before and after RIP in "changing job setting condition" in the first embodiment. These tables are stored in, e.g., a memory 16. The MFP controller determines the enable/disable state of "change of job setting condition" of each setting item in reprint by using the tables. The "description of item" column shown in FIGS. 50 and 51 is an entry to explain the set contents of each item and may be omitted in an actual table.

Basically, since data before RIP are associated with setting of "(2) Place Importance on Print Setting Flexibility", almost all setting items are valid "○" so that the job setting conditions can be changed.

On the other hand, data after RIP are associated with setting of "(1) Place Importance on Print Start Speed". Hence, settings used for RIP are already processed, and the setting items are invalid "x". Display of these items is grayed out or turned off so the job tickets cannot be changed. However, after reading out the data after RIP saved in a memory 16b, changeable setting items become valid "○". Even when "(1) Place Importance on Print Start Speed" is set, the job tickets can be changed.

When "(3) Place Importance on Both" is set, data before and after RIP are held. Hence, when a job ticket related to a setting item that is valid "○" for both data before and after RIP is changed, output can be done with the same performance as in "(1) Place Importance on Print Start Speed" by using the data after RIP. However, when a setting item that is invalid "x" for the data after RIP is to be changed, the data before RIP is read out, and the setting as the target of the change instruction is changed. Then, after RIP is executed again, the data is output.

In setting of "Job Saving" of job management shown in FIG. 51, when saving of data before RIP or saving of data after RIP is instructed, the data is saved again in accordance with the new setting.

[Job Ticket Table of Scan Job]

FIGS. 52 and 53 are views showing job ticket tables for a scan image. For the jobs A and B saved in the memories 16a and 16b, setting items for which "change of job setting condition" is valid have "○", and setting items for which "change of job setting condition" is invalid have "x". These values are stored in, e.g., the memory 16. The MFP controller determines the enable/disable state of "change of job setting condition" of each setting item in reprint by using the tables. The "description of item" column shown in FIGS. 52 and 53 is an entry to explain the set contents of each item and may be omitted in an actual table.

Hence, for setting items that are invalid "x" in both the memories 16a and 16b, the setting conditions cannot be changed by using the jobs saved in the memories, and the scan operation must be executed again. Setting items which are "○" in the memory 16a and invalid "x" in the memory 16b, represented by image processing described in the second embodiment, can be processed only by using the data saved in the memory 16a. Setting items which are "○" in both memories are processed by reading out the job B from the memory 16b if the job setting condition is changed.

If the job setting conditions are changed for a plurality of setting items, and at least one data after RIP (or data saved in the memory 16b) is "x", processing is performed by reading out data before RIP (or data saved in the memory 16a). These conditions are common to the job ticket table of a PDL job and the job ticket table of a scan job.

Fifth Embodiment

Image processing according to the fifth embodiment of the present invention will be described below. The same reference numerals as in the first to fourth embodiments denote essentially the components in the fifth embodiment, and a detailed description thereof will be omitted.

[Job Setting Condition Change by Web Browser]

FIG. 54 is a view showing a state wherein job setting conditions temporarily saved in a box are changed by using a submit tool by the above-described Web application. FIG. 54 shows a window in changing job setting conditions on the basis of, e.g., the job ticket table shown in FIG. 50 when data after RIP is saved, and exemplifies, for example, a job ticket of settings related to "print quality".

In "Device Name", "Box Name", and "File Name" input fields, the MFP, box, and document as targets are designated or selected from the Web browser. If the previous job ticket is saved, a job ticket name (JobTicket-A1 in FIG. 54) registered previously is displayed in a "Job Ticket" field.

Of the print quality items shown in FIG. 50, setting items with "○" for data after RIP are normally displayed to indicate that they are changeable. However, display of setting items with "x" is grayed out to indicate that they are unchangeable.

Sixth Embodiment

Image processing according to the sixth embodiment of the present invention will be described below. The same reference numerals as in the first to fifth embodiments denote essentially the components in the sixth embodiment, and a detailed description thereof will be omitted.

[Workflow by Job Ticket]

A flow closed in the image processing apparatus has been described above. However, the processing need not always be closed in an MFP. Job setting information (job ticket) is sometimes input (or imported) from the outside of the MFP together with a job or output (or exported) from the MFP to the outside as a job ticket.

A workflow by JDF (Job Definition Format) using a MIS (Management Information System) server will be examined. When an ordered job is issued to the MIS server, the operator creates JDF data corresponding to a job ticket, in which operation instructions in the workflow are described, by a JDF create application installed in the MIS server.

When the created JDF data is transferred to a print server 2, the print server 2 causes a JDF parser to interpret the JDF data and execute the job for the system. For example, properties such as an output printing paper size and double-/single-sided printing or N-up printing are designated in the JDF data. In accordance with the contents of the JDF data, the JDF parser causes a PDL controller to process PDL data such as PDF/PS referred to by the JDF data and executes printing in an MFP through a printer interface.

When the created JDF data is transferred to a post press server, the post press server causes a JDF parser to interpret the JDF data and execute the job for the post press unit. For example, properties such as case binding, saddle stitch binding, and cutting are designated in the JDF data. In accordance with the contents of the JDF data, post processing is executed for a finisher A and a finisher B through a finisher A interface and a finisher B interface.

Hence, designation of the saving form set in the first to third embodiments can also be reflected on the JDF data used for communication with an external device. The designation here can also change coping with an offline finisher or near-line finisher.

[Mechanism of File Server]

A file server stores customer information of end users and received jobs to prepare for reorders of same documents from end users. The end user customer information contains a name, where to make contact, and the account number of a credit. A received job contains a document/image file to be printed, print condition settings for the file, and other print request information, or the scan image of a document to be copied, copy condition settings for the document, and other copy request information.

The pieces of stored information are invoked when a reprint request is received later so that quick deal with the request is executed by collating and referring to the customer information and previous job.

As the file format, one or more of application file data, PDL data, print ready data, and intermediate data between them can be stored in accordance with the application purpose. Print ready data is data after RIP and can have a bitmap file format or a compressed format such as a tiff file. Intermediate data indicates data with an intermediate format between, e.g., PDL data and print ready data and no final output data such as a display list.

In storing data, print ready data has a large size and can therefore be recorded in another storage medium (an optical or magnetooptical disk such as a DVD-ROM, CD-ROM, or MO). Old PDL data or PDL data with a large size can be stored in another medium. The data can be returned together with the final output on reception of a user's request.

As described above, every time a reprint request is received from an end user, the file server executes control to read out the job data of the user from the storage medium and reprint it under desired print output conditions.

In some cases, a user restores stored data and requests reprint. For example, an order reception server preferably stores the document/image file of a print job received from a client PC in an end user environment in a memory such as a hard disk provided in a file server as an original document and hold it for a predetermined period. With this arrangement, when a reorder of a print job of the same document is received from the end user, the reorder reception can be processed without causing the end user to transmit the document/image file again.

In addition, it is preferable that the document of a copy job received from an end user be scanned and received as a scan image file and then stored in a memory such as a hard disk provided in a file server and held for a predetermined period. With this arrangement, when a reorder of a copy job of the same document is received from the end user, the reorder reception can be processed without causing the end user to transmit the document again.

It is also preferable that a print job or copy job be processed in an output form desired by an end user, and a final document/image file before printing, which is edited and processed by the operator, or final print data after print processing be stored in a memory provided in a file server and held for a predetermined period. The above-described output form indicates print condition settings and other print request information or copy condition settings and other copy request information. With this arrangement, the work in the post process upon receiving a reorder from the display list generator again can be reduced.

As described above, the MFP of the embodiment executes the following processing upon receiving a job (image data and a job ticket). The MFP holds, in a memory, data before image processing (PDL data or scan image) and/or data after image processing (data after RIP, a compressed image thereof, or print ready file) in accordance with the designated job saving method and associates the data with each other.

In the job management tool, in selecting a job to be reprinted and editing the job ticket, an icon can be displayed in three patterns indicating "re-RIP is unnecessary", "re-RIP is necessary", and "reprint is disabled" for each job ticket. At this time, the icon is preferably displayed on the user interface (the operating unit 14 of the MFP and the screen of the client PC 3) in different colors such that the change enable/disable state of a job ticket can be discriminated. The display form is discriminated on the basis of the type of job ticket, type of held data, and transmission method used for transmission.

The system is preferably able to cope with not only print data but also a copy (or scan and print) job. In this case, one or both of a scanned input image and an image which has undergone image processing (especially time-consuming processing such as tilt correction and dust removal) are held and associated.

In changing settings at the time of reprint, setting items for which image processing is unnecessary, setting items for which image processing must be executed again, and setting items for which scan is necessary again can selectively be operated from the user interface (the operating unit 14 of the MFP and the window of the client PC 3).

As described above, in reprinting each job, changeable setting items and whether the change is time-consuming (e.g., re-RIP is necessary) are displayed to reliably notify the MFP user of advantages and disadvantages depending on the saving method of data before and after RIP. The user can efficiently execute reprint by grasping the advantages and disadvantages. Display of the unchangeable setting items is turned off or grayed out on the user interface not to confuse the user.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

This application claims the benefit of Japanese Patent Application No. 2005-104358 filed on Mar. 31, 2005, which is hereby incorporated by reference herein in its entirety.

What is claimed is:

1. A printing apparatus comprising:
   an input unit configured to input a job containing image data and property information of the image data;
   a first memory configured to store the job input by said input unit;
   an image processing unit configured to process the image data of the job in accordance with the property information of the input job;
   a second memory configured to store the job processed by said image processing unit;
   an output unit configured to output the job in accordance with the property information of the processed job;
   a setting unit configured to set saving of the input job in said first memory and saving of the processed job in said second memory; and
   a control unit configured to control saving of the input job and the processed job in accordance with a saving method set by said setting unit and, in outputting the saved job, indicating an enable/disable state of change of the property information in accordance with the saving method and receiving change of the property information.

2. The apparatus according to claim 1, wherein said setting unit selectively provides save setting to allow flexible change of the property information, save setting to advance a start of output of the saved job, and save setting to allow flexible change of the property information and advance the start of output.

3. The apparatus according to claim 1, wherein said control unit determines the saving method on the basis of storage states of the jobs in said first memory and said second memory.

4. The apparatus according to claim 1, further comprising a user interface to receive change of the property information, wherein said control unit normally displays changeable property information on the user interface and grays out display of unchangeable property information.

5. The apparatus according to claim 1, further comprising a user interface to receive change of the property information, wherein said control unit normally displays changeable property information on the user interface and does not display unchangeable property information.

6. The apparatus according to claim 1, wherein the input job is a job input from a client computer.

7. The apparatus according to claim 1, wherein the input job is a job input from a scanner which reads a document image.

8. The apparatus according to claim 1, wherein the property information is information input together with the image data.

9. The apparatus according to claim 1, wherein the property information is recorded in a setting information file which is separately input in association with the image data.

10. The apparatus according to claim 9, wherein the setting information file is described in JDF.

11. The apparatus according to claim 1, further comprising a user interface to input a whole or a part of the property information.

12. The apparatus according to claim 1, wherein said image processing unit includes a PDL data rasterizing function.

13. The apparatus according to claim 12, wherein said first memory stores data before the rasterizing, and said second memory stores data after the rasterizing.

14. The apparatus according to claim 1, wherein said image processing unit includes a function of manipulating scanned image data.

15. The apparatus according to claim 14, wherein said first memory stores the scanned image data, and said second memory stores data after the manipulation.

16. A control method of a printing apparatus having an input unit configured to input a job containing image data and property information of the image data, a first memory configured to store the job input by the input unit, an image processing unit configured to process the image data of the job in accordance with the property information of the input job, a second memory configured to store the job processed by the image processing unit, and an output unit for outputting the job in accordance with the property information of the processed job, comprising the steps of:
   setting saving of the input job in the first memory and saving of the processed job in the second memory;
   controlling saving of the input job and the processed job in accordance with the set saving method; and
   indicating an enable/disable state of change of the property information in accordance with the saving method and receiving change of the property information in outputting the saved job.

17. A program for controlling a printing apparatus having a processor executing the program, an input unit configured to input a job containing image data and property information of the image data, a first memory configured to store the job input by the input unit, an image processing unit configured to process the image data of the job in accordance with the property information of the input job, a second memory configured to store the job processed by the image processing unit, and an output unit for outputting the job in accordance with the property information of the processed job, the program comprising code for performing the following steps of:
   setting saving of the input job in the first memory and saving of the processed job in the second memory;
   controlling saving of the input job and the processed job in accordance with the set saving method; and
   indicating an enable/disable state of change of the property information in accordance with the saving method and receiving change of the property information in outputting the saved job.

18. A recording medium which records the program of claim 17.

* * * * *